US011995657B2

(12) United States Patent
Shannon, III et al.

(10) Patent No.: US 11,995,657 B2
(45) Date of Patent: May 28, 2024

(54) ASSESSING RISK OVER A CONTINGENT ASSET LIFECYCLE

(71) Applicant: Rebate Assets, LLC, Rockford, IL (US)

(72) Inventors: Peter M. Shannon, III, Western Springs, IL (US); Gary W. Grube, Barrington Hills, IL (US)

(73) Assignee: Rebate Assets, LLC, Rockford, IL (US)

( * ) Notice: Subject to any disclaimer, the term of this patent is extended or adjusted under 35 U.S.C. 154(b) by 156 days.

(21) Appl. No.: 17/723,660

(22) Filed: Apr. 19, 2022

(65) Prior Publication Data

US 2022/0343331 A1    Oct. 27, 2022

Related U.S. Application Data

(60) Provisional application No. 63/180,411, filed on Apr. 27, 2021.

(51) Int. Cl.
| | |
|---|---|
| *G06Q 20/40* | (2012.01) |
| *G06Q 20/12* | (2012.01) |
| *G06Q 30/0601* | (2023.01) |
| *H04L 9/00* | (2022.01) |
| *H04L 9/32* | (2006.01) |
| *H04L 9/40* | (2022.01) |

(52) U.S. Cl.
CPC ....... *G06Q 20/4016* (2013.01); *G06Q 20/123* (2013.01); *G06Q 30/0619* (2013.01); *H04L 9/3247* (2013.01); *H04L 9/50* (2022.05); *G06Q 2220/00* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 8,655,720 B2 | 2/2014 | Woodward | |
| 10,423,993 B2 | 9/2019 | Metnick | |
| 10,546,277 B2 | 1/2020 | Metnick | |
| 10,679,267 B2 | 6/2020 | Metnick | |
| 10,832,298 B2 * | 11/2020 | Bousis | G06Q 30/0643 |
| 10,922,728 B2 | 2/2021 | McGregor | |
| 10,943,275 B2 | 3/2021 | Metnick | |
| 2018/0253702 A1 * | 9/2018 | Dowding | H04L 63/123 |
| 2020/0090280 A1 * | 3/2020 | Roth | G06Q 20/108 |

* cited by examiner

*Primary Examiner* — Bennett M Sigmond
*Assistant Examiner* — Bhavin D Shah
(74) *Attorney, Agent, or Firm* — Gary W. Grube

(57) ABSTRACT

A method includes a computing entity interpreting digital records representing a multitude of contingent assets to produce a set of contingent asset sale requests. A first contingent asset of a first contingent asset sale request assigns a potential first liability of a first payer to a first seller.
The method further includes interpreting a first authenticity indicator associated with the first contingent asset sale request to produce a first contingent asset risk level. When the first contingent asset risk level is greater than a contingency risk threshold level, the method further includes establishing first available terms for the first contingent asset based on the first contingent asset sale request, generating a first smart contract to indicate availability of the first contingent asset to include the first available terms, and causing generation of a non-fungible token to represent the first smart contract in an object distributed ledger.

4 Claims, 41 Drawing Sheets

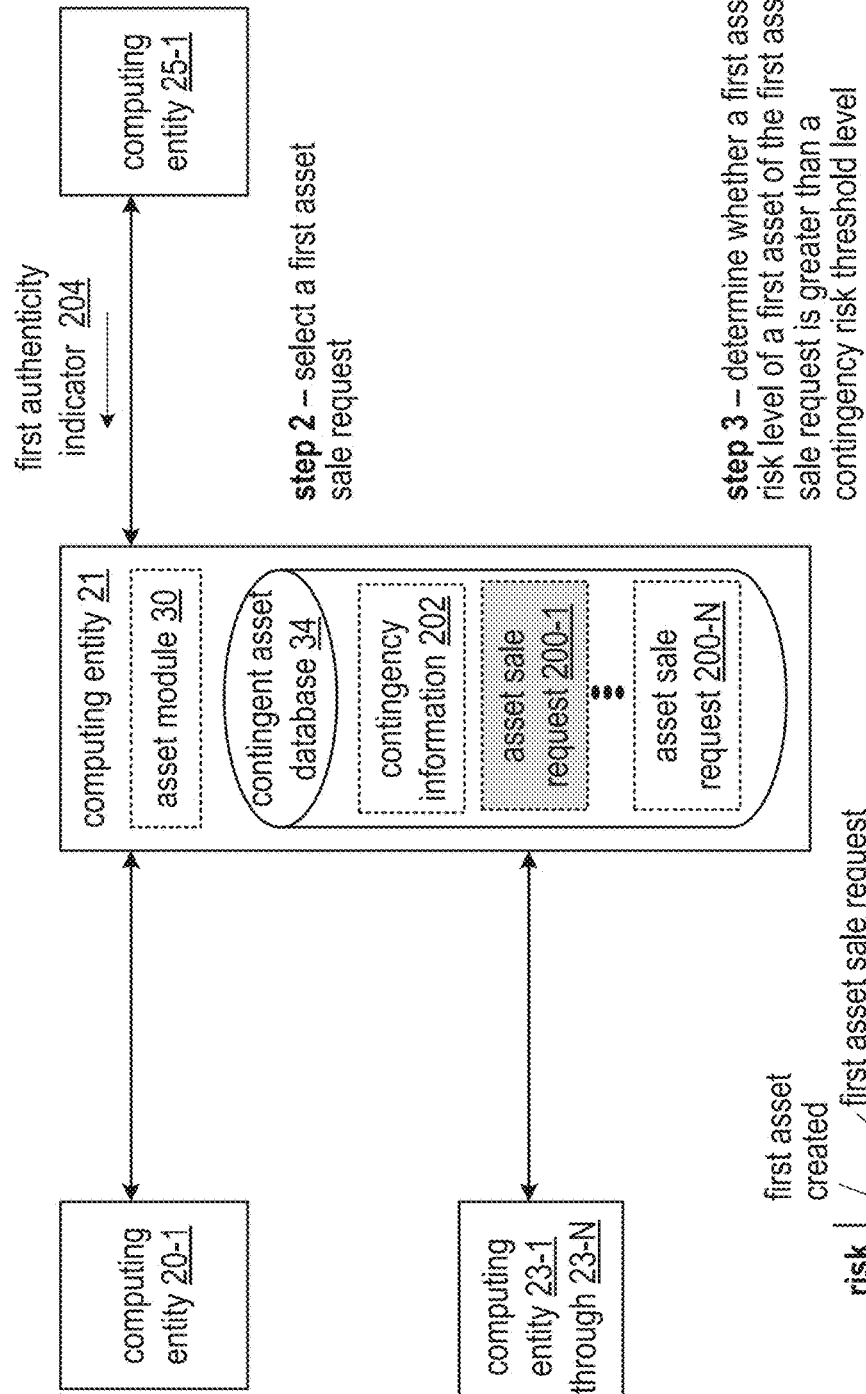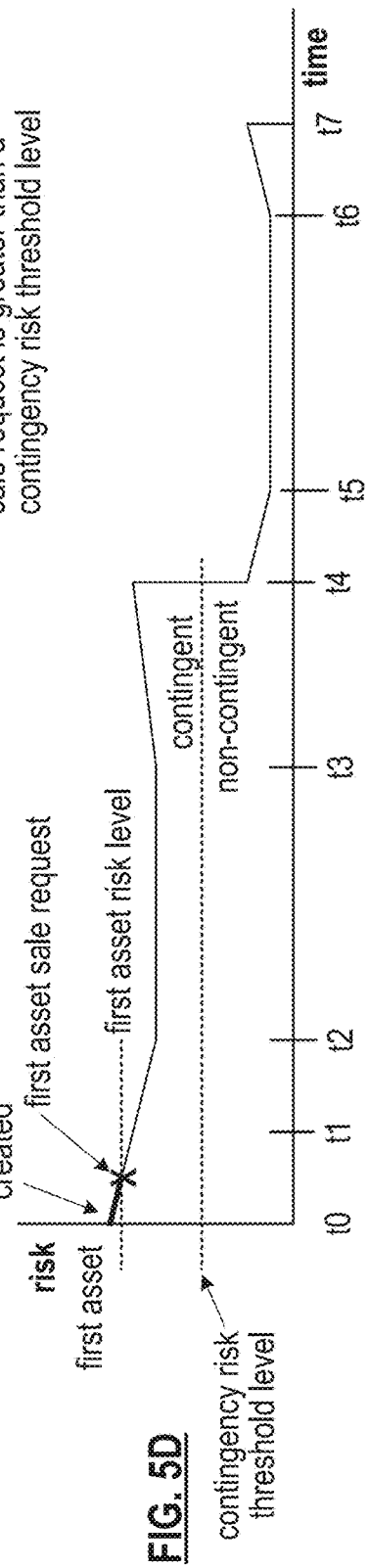

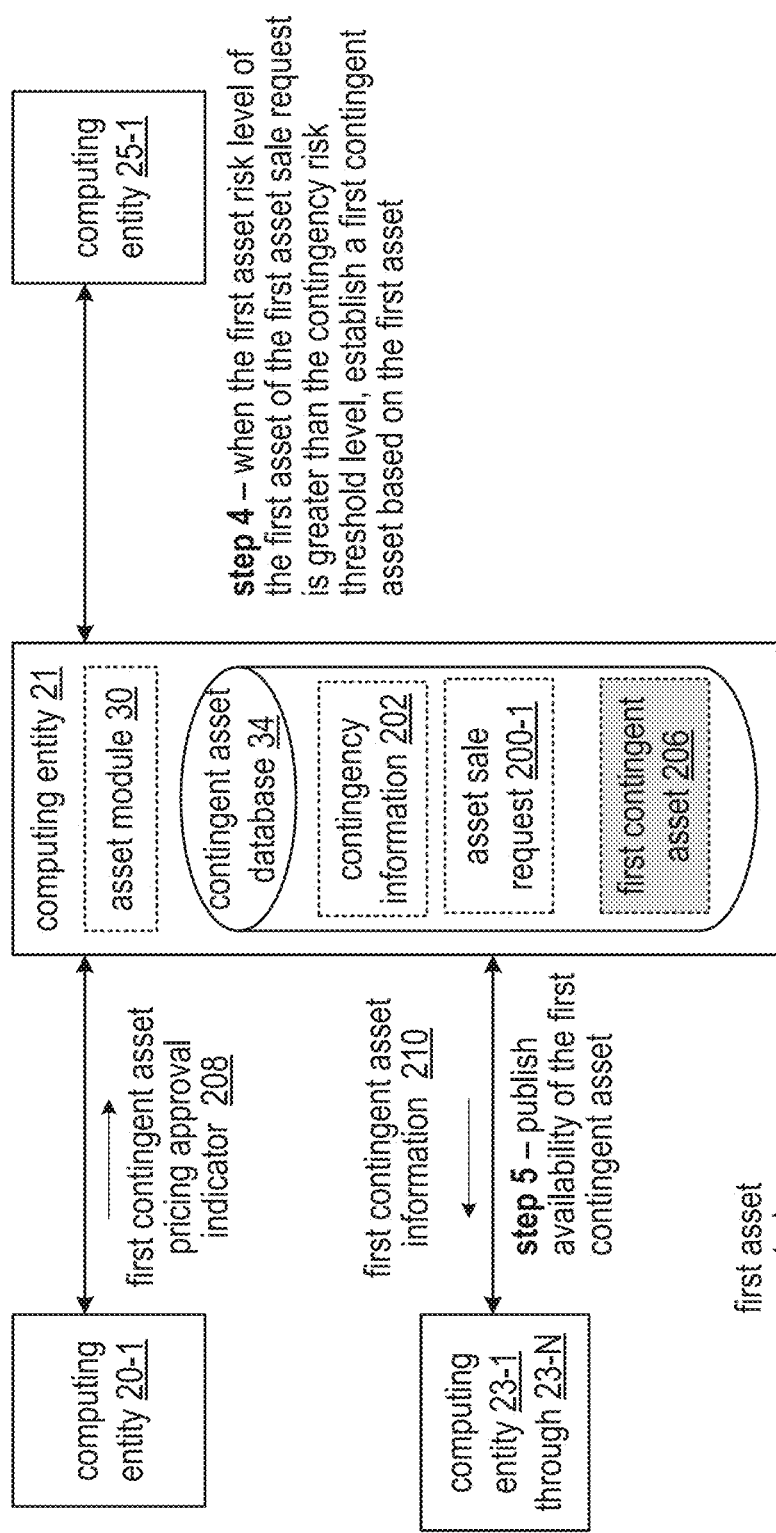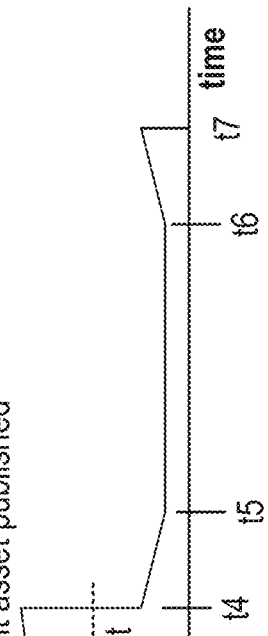

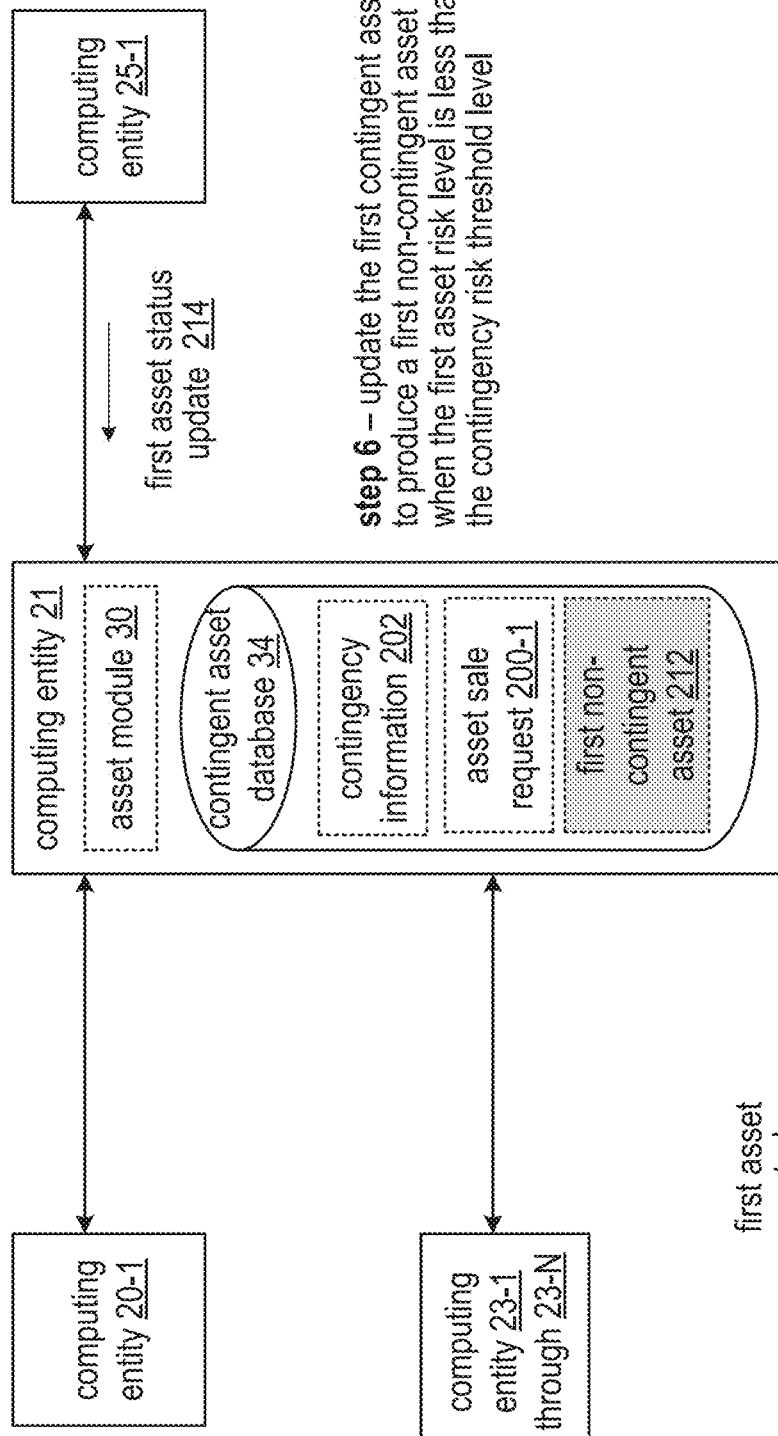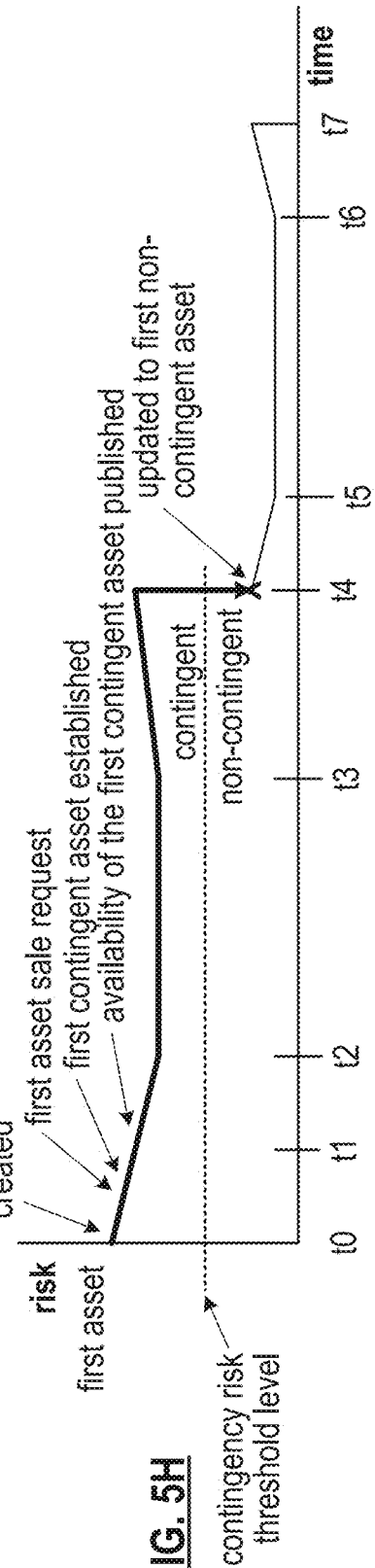

step 4 – when the first contingent asset purchase request is approved, obtain payment for purchase of the first available contingent asset from a first buyer associated with the first contingent asset purchase request

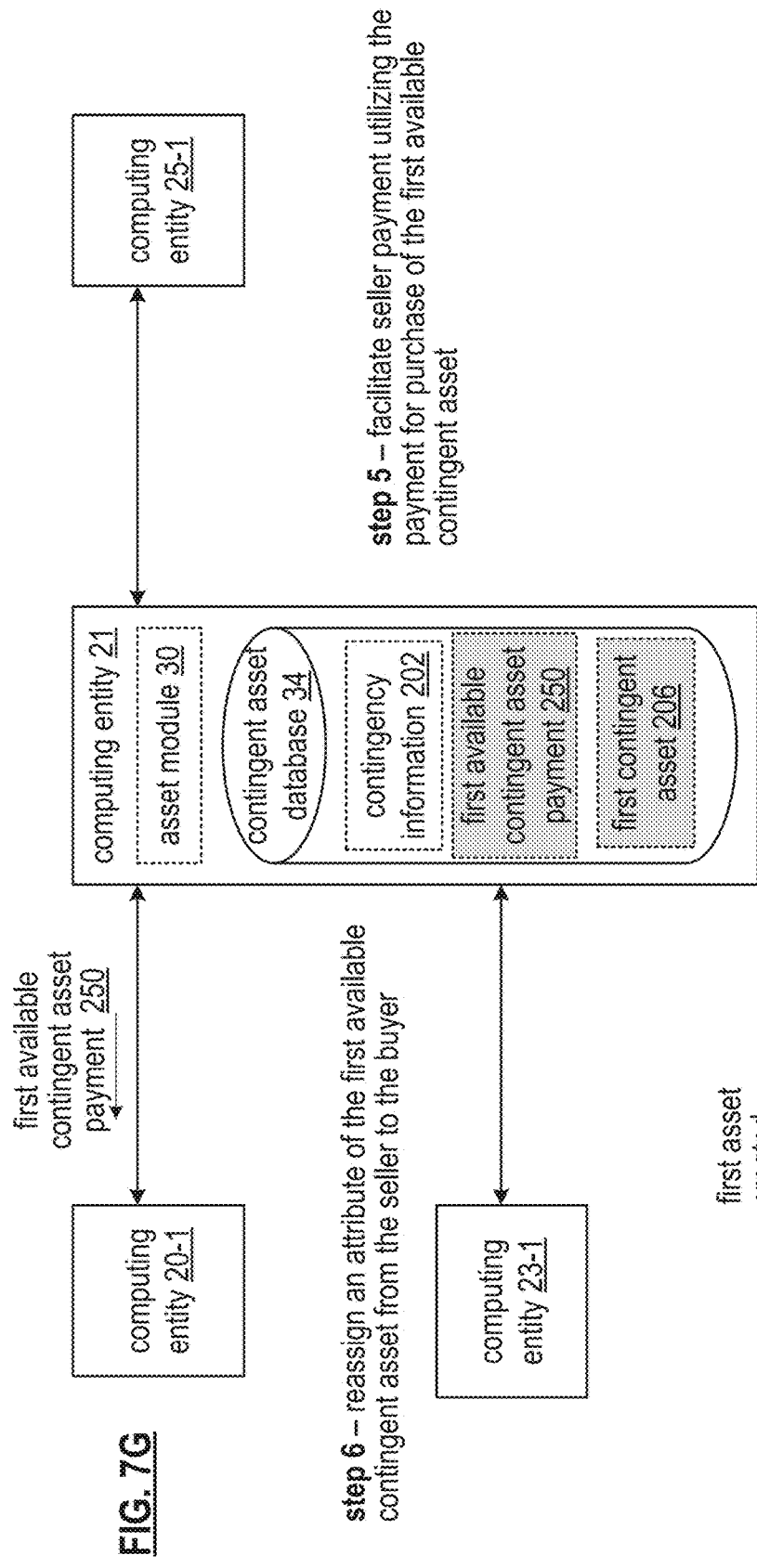
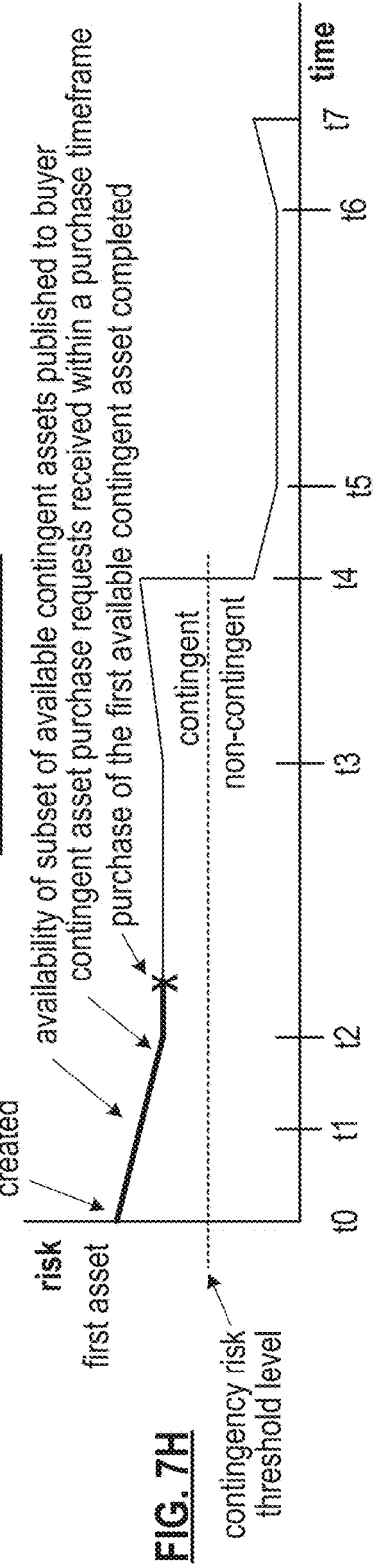

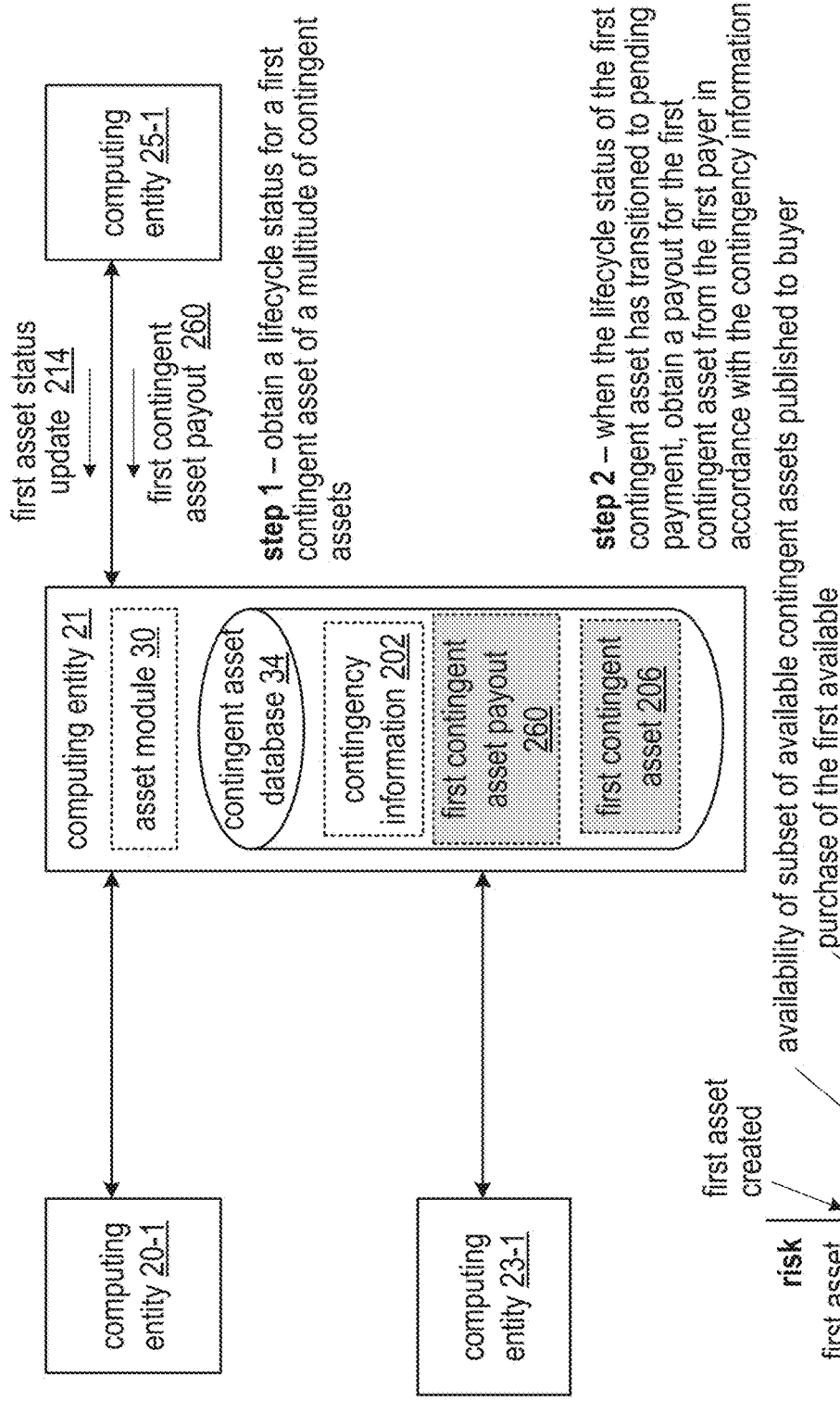

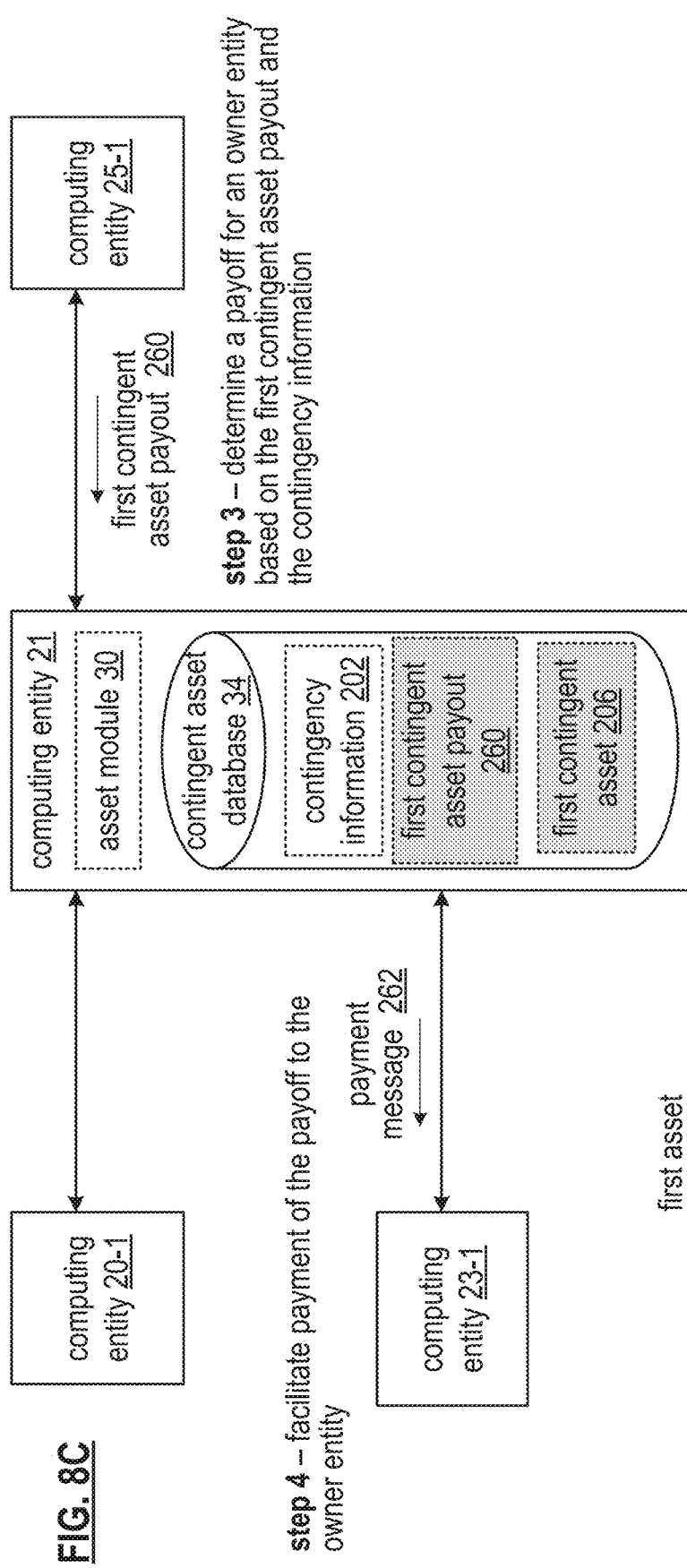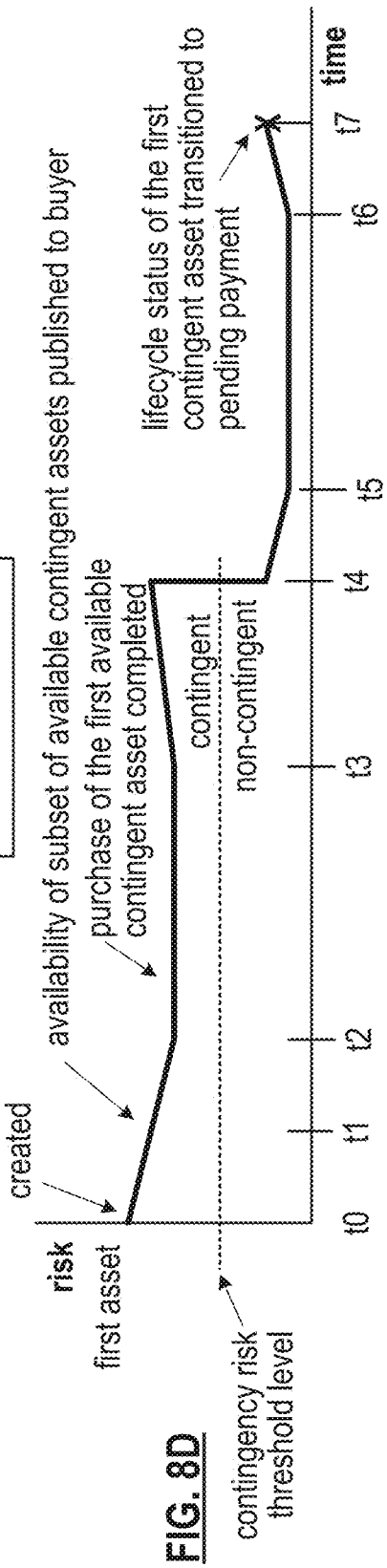

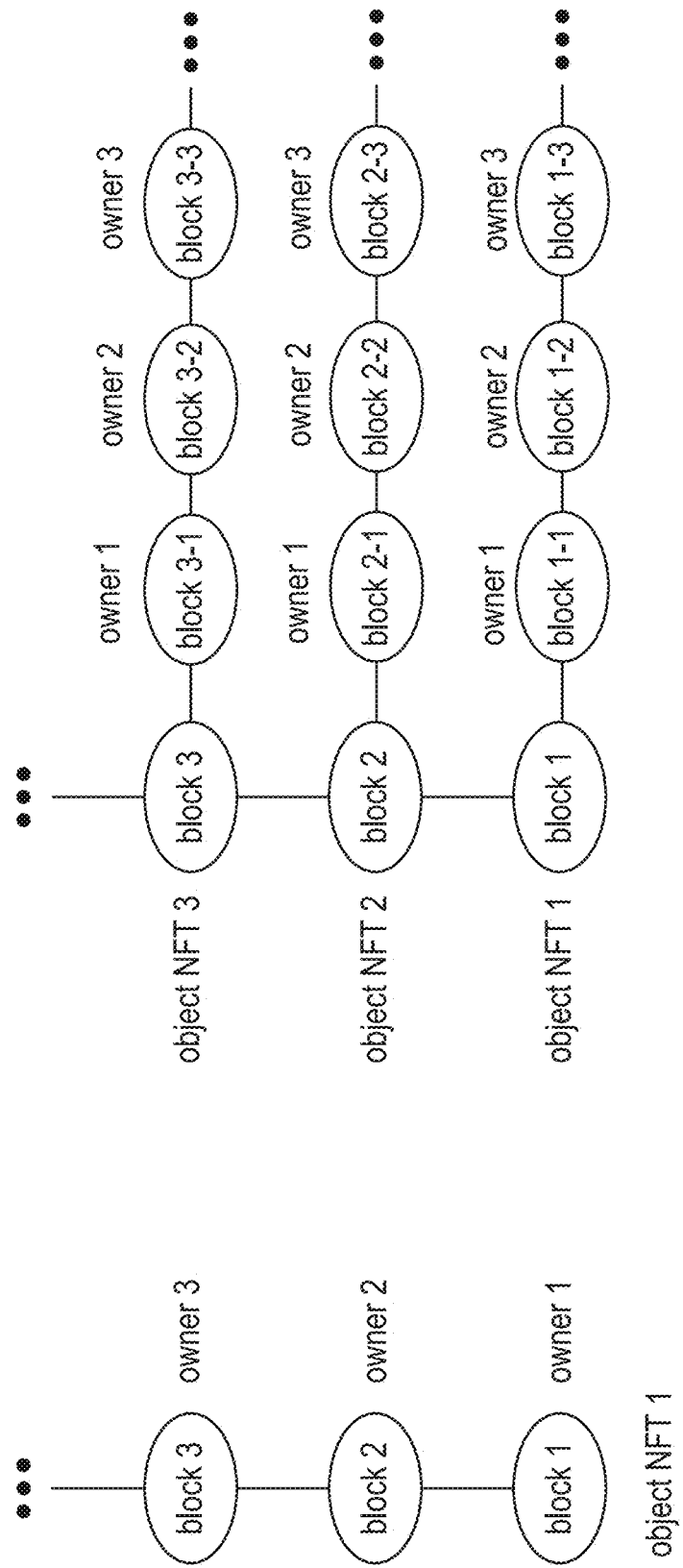

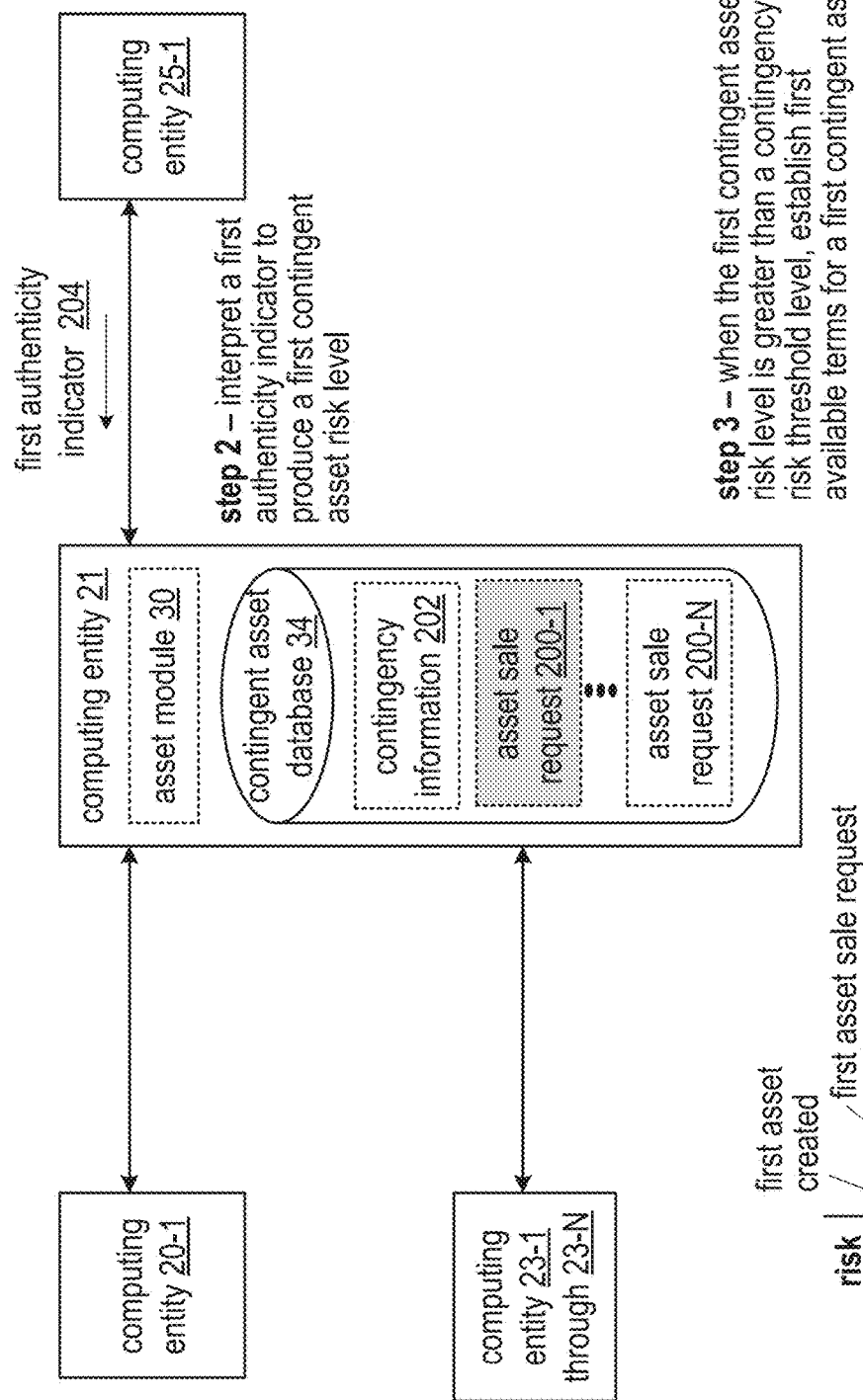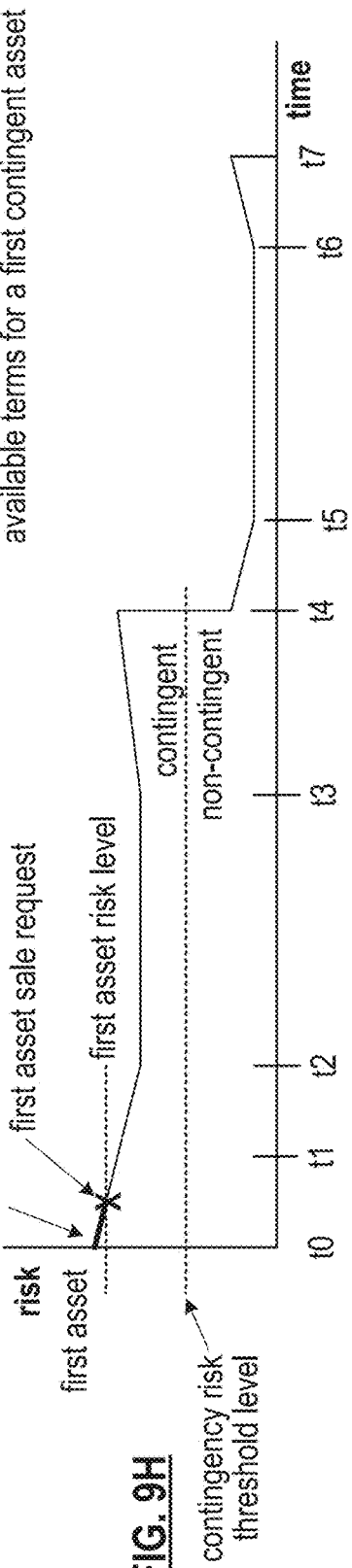

step 4 – when the first contingent asset purchase request is approved, obtain payment for purchase of the first available contingent asset from a first buyer associated with the first contingent asset purchase request

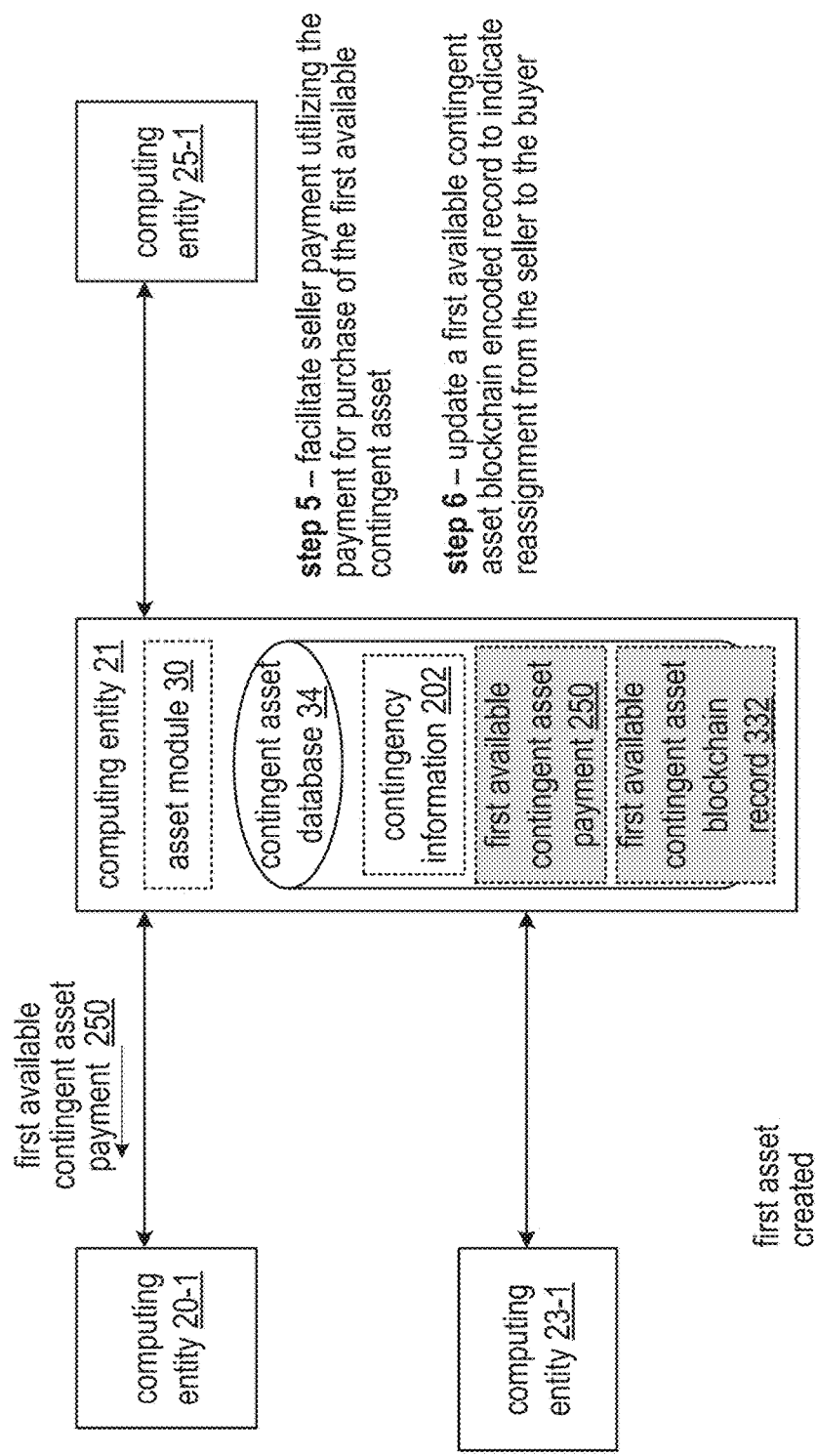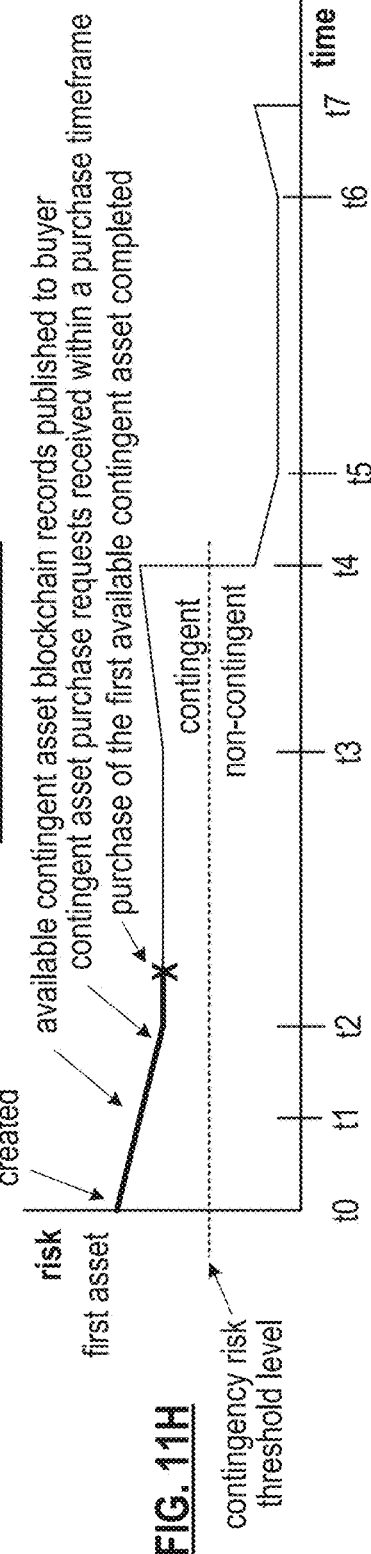

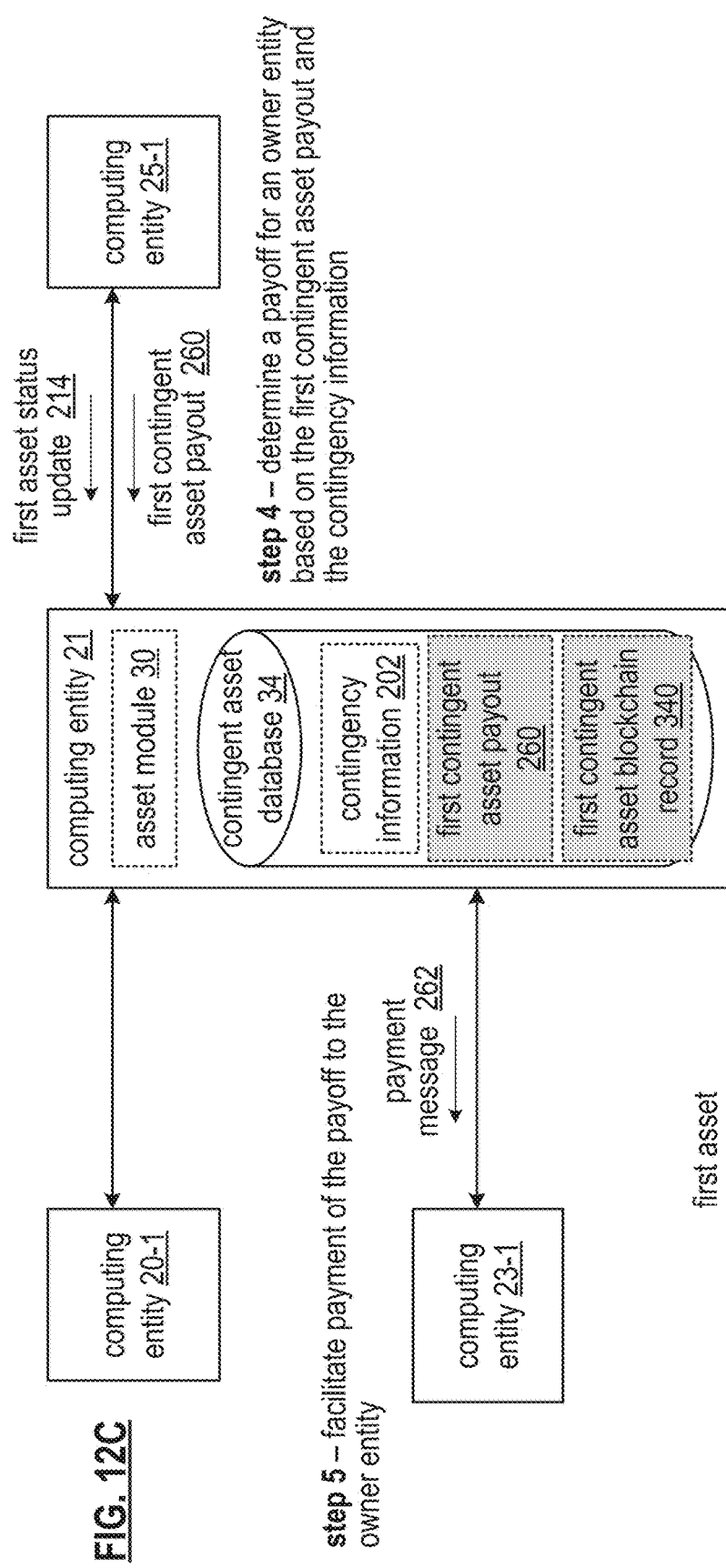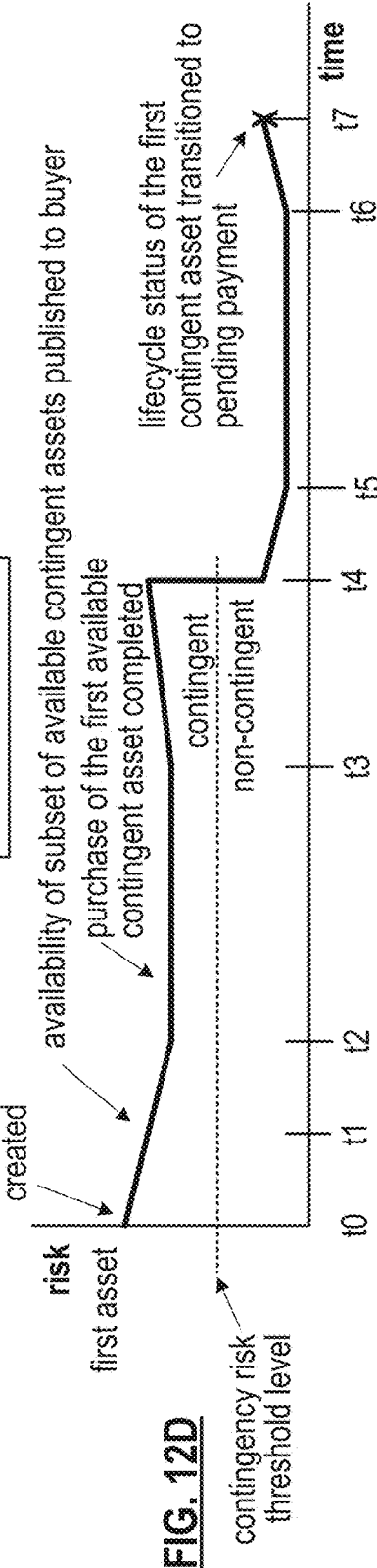

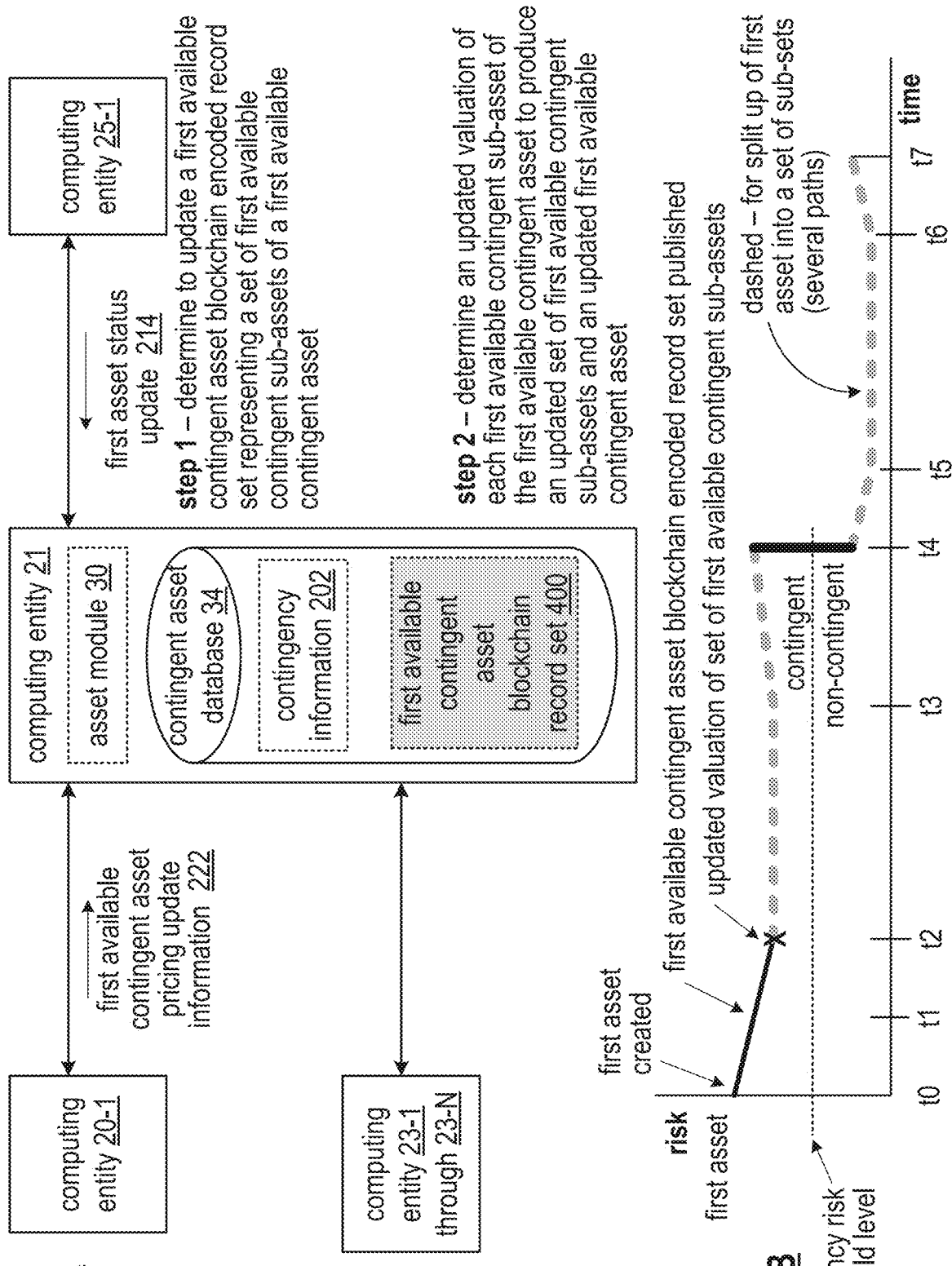

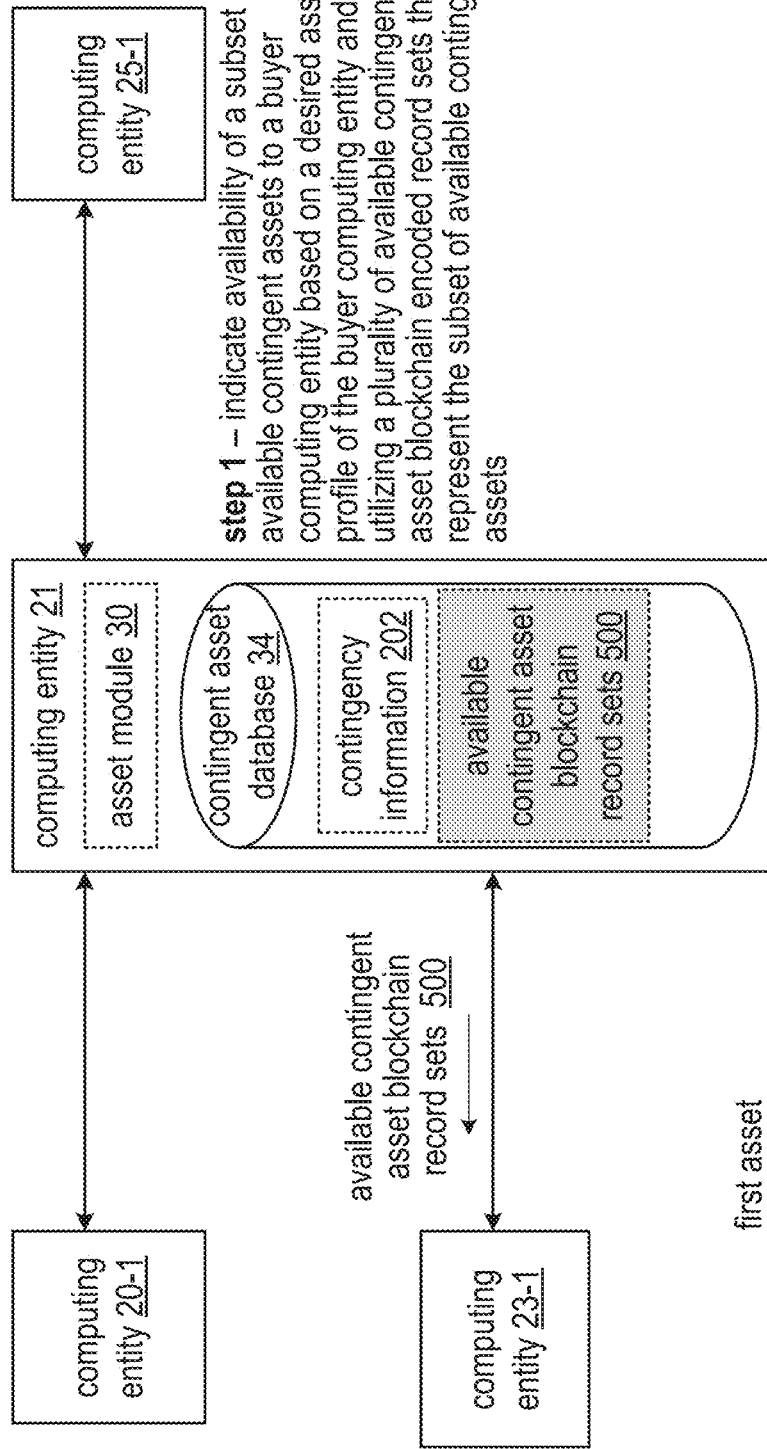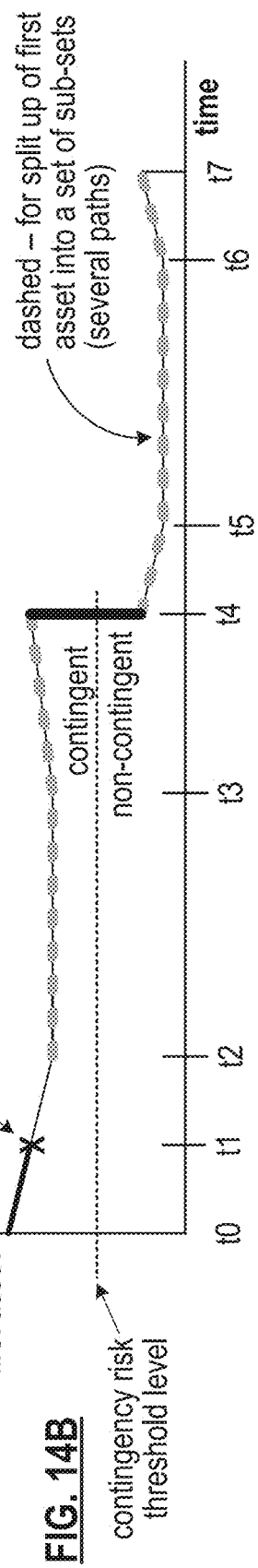

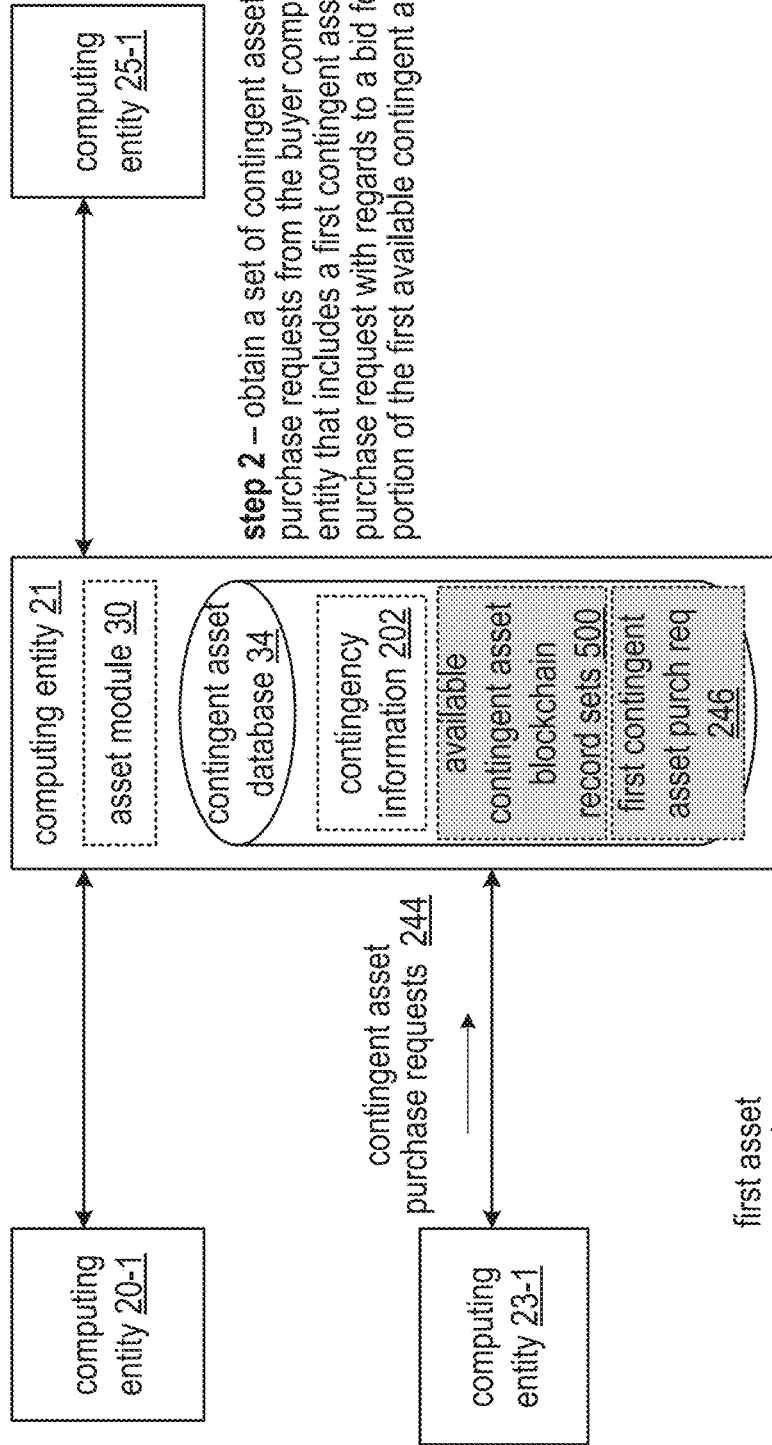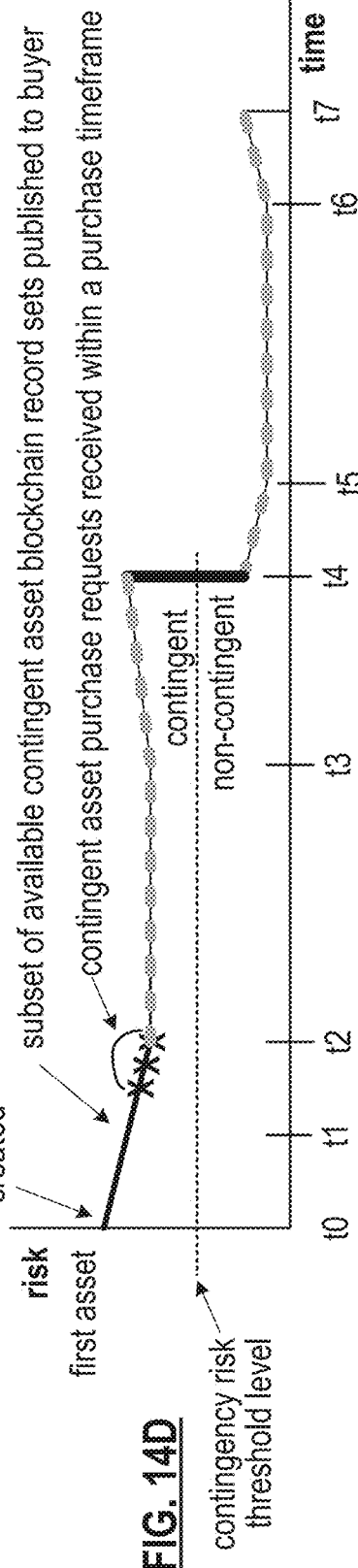

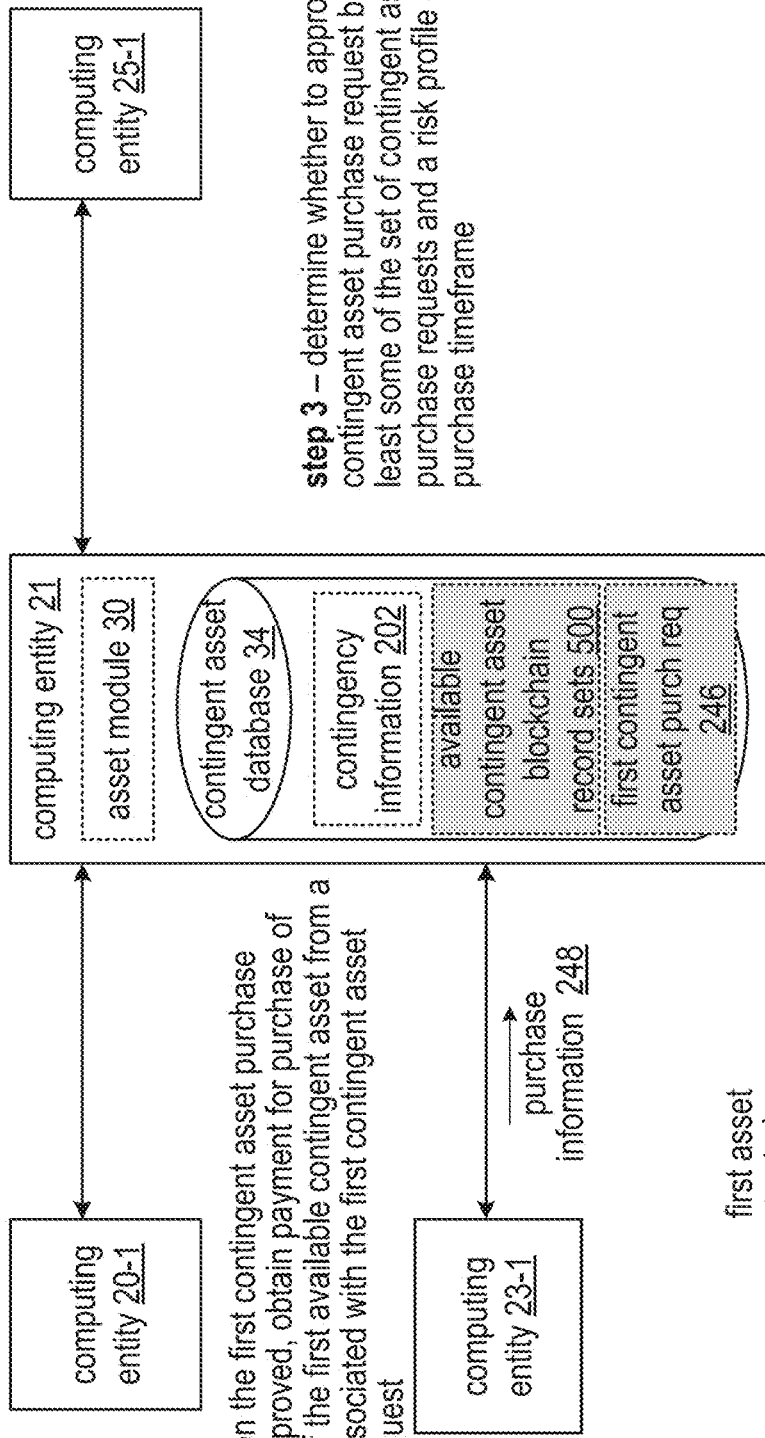

FIG. 14E step 4 – when the first contingent asset purchase request is approved, obtain payment for purchase of the portion of the first available contingent asset from a first buyer associated with the first contingent asset purchase request step 3 – determine whether to approve the first contingent asset purchase request based on at least some of the set of contingent asset purchase requests and a risk profile during the purchase timeframe

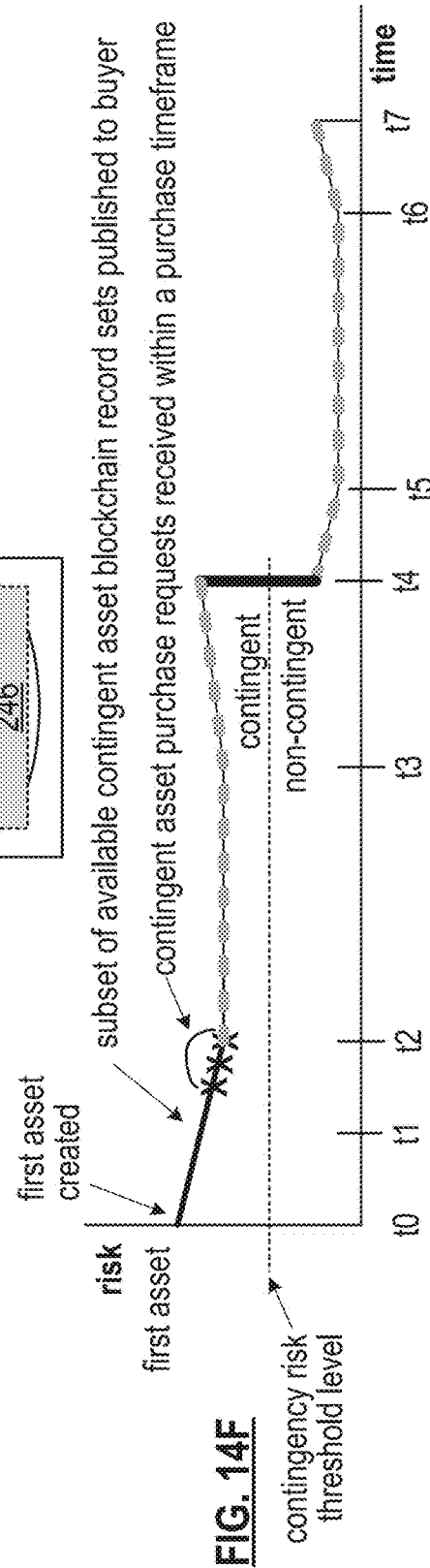

FIG. 14F

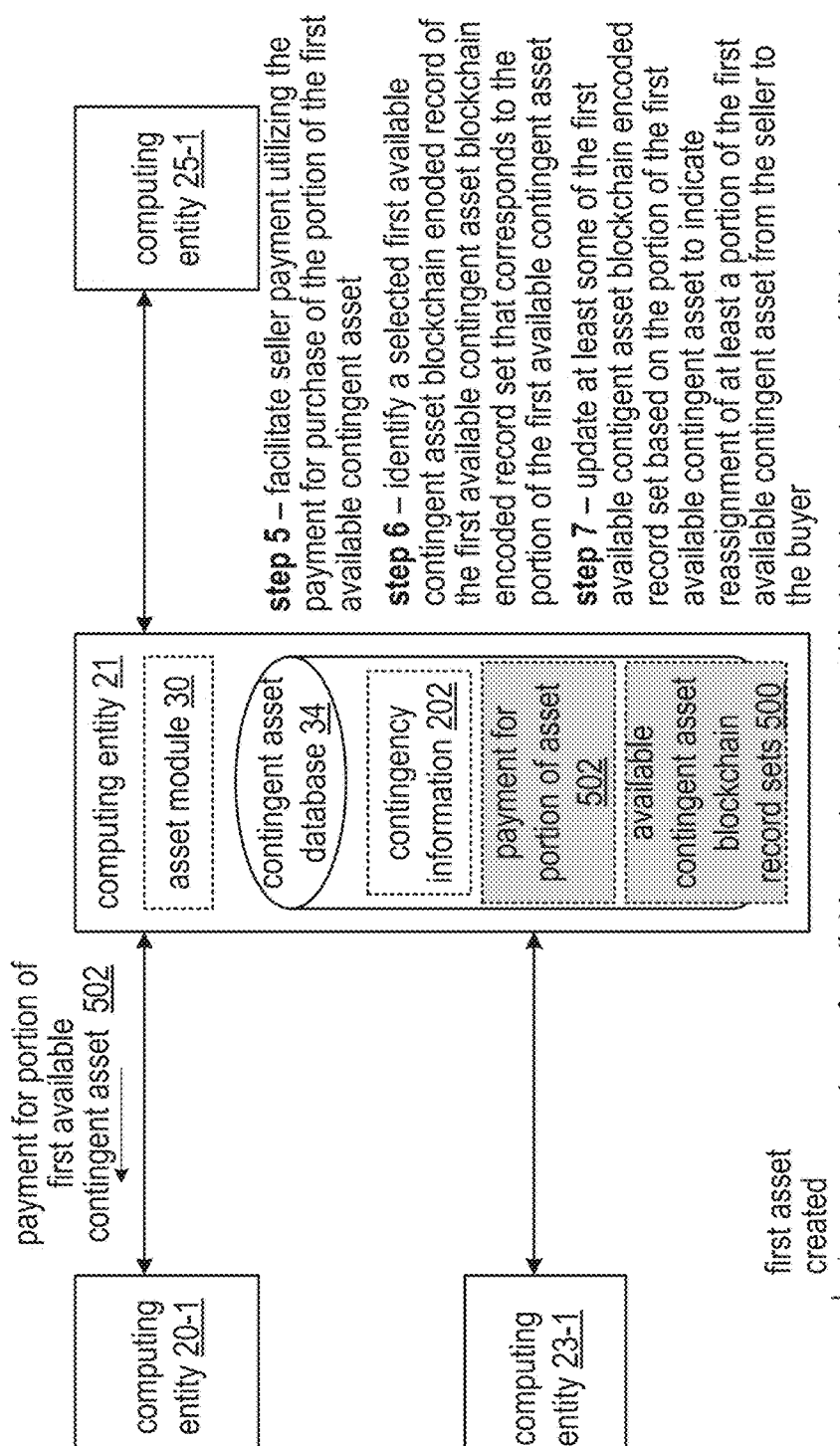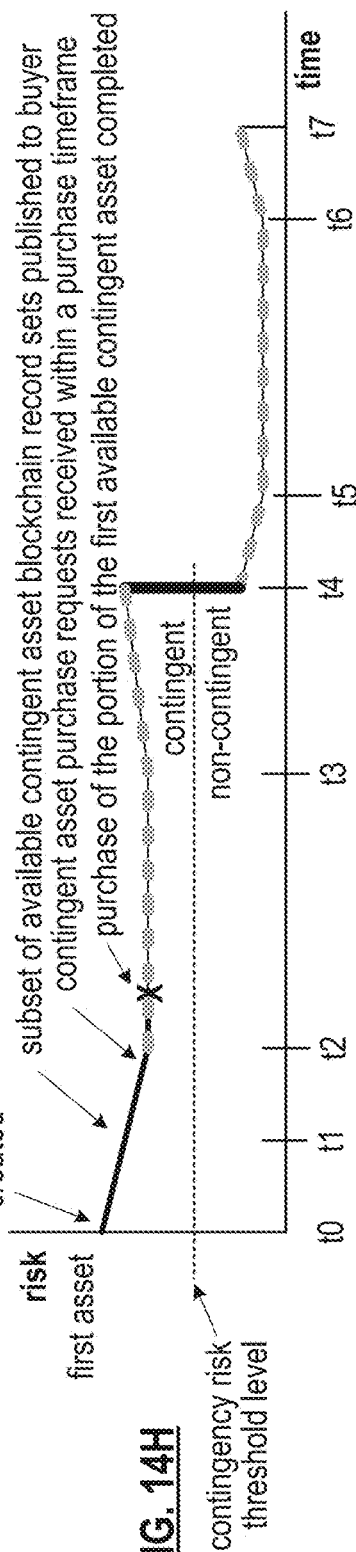

ASSESSING RISK OVER A CONTINGENT ASSET LIFECYCLE

CROSS-REFERENCE TO RELATED APPLICATIONS

The present U.S. Utility Patent Application claims priority pursuant to 35 U.S.C. § 119(e) to U.S. Provisional Application No. 63/180,411, entitled "ASSESSING RISK OVER A CONTINGENT ASSET LIFECYCLE", filed Apr. 27, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer systems and more particularly to computer systems providing risk analysis.

Description of Related Art

Computer systems communicate data, process data, and/or store data. Such computer systems include computing devices that range from wireless smart phones, laptops, tablets, personal computers (PC), work stations, personal three-dimensional (3-D) content viewers, and video game devices, to data centers where data servers store and provide access to digital content. Some digital content is utilized to represent various aspects of assets. Examples of representations includes an asset type, an asset value, a value guarantee, an asset owner identifier, etc.

A variety of asset computing systems utilize asset listing and asset transaction techniques when asset valuation is not subject to a contingency. For example, a stock asset is offered on an exchange at a market price and is sold to a buyer. As another example, a receivable asset is offered on another exchange at another market price and is sold to another buyer.

BRIEF DESCRIPTION OF THE SEVERAL VIEWS OF THE DRAWING(S)

FIGS. 5A-5H are schematic block diagrams of another embodiment of a computing system and a contingent asset risk chart illustrating an example of listing a contingent asset for sale in accordance with the present invention;

FIGS. 7A-7H are schematic block diagrams of another embodiment of a computing system and a contingent asset risk chart illustrating an example of executing a sale of a contingent asset to a buyer from a seller in accordance with the present invention;

FIGS. 8A-8D are schematic block diagrams of another embodiment of a computing system and a contingent asset risk chart illustrating an example of facilitating payment from a payer to a buyer for a contingent asset in accordance with the present invention;

FIGS. 9B and 9C are schematic block diagrams of organization of object distributed ledgers in accordance with the present invention;

FIGS. 9E-9M are schematic block diagrams of another embodiment of a computing system, contingent asset risk charts, and a blockchain record illustrating an example of listing a contingent asset for sale utilizing an object distributed ledger in accordance with the present invention;

FIGS. 11A-11H are schematic block diagrams of another embodiment of a computing system and a contingent asset risk chart illustrating an example of executing a sale of a contingent asset to a buyer from a seller utilizing a blockchain record in accordance with the present invention;

FIGS. 12A-12D are schematic block diagrams of another embodiment of a computing system and a contingent asset risk chart illustrating an example of facilitating payment from a payer to a buyer for a contingent asset utilizing a blockchain record in accordance with the present invention;

FIGS. 13A-13F are schematic block diagrams of another embodiment of a computing system and a contingent asset risk chart illustrating an example of updating a listing for a contingent asset for sale utilizing a split blockchain record in accordance with the present invention; and FIGS. 14A-14H are schematic block diagrams of another embodiment of a computing system and a contingent asset risk chart illustrating an example of executing a sale of a portion of a contingent asset to a buyer from a seller utilizing a split blockchain record in accordance with the present invention.

DETAILED DESCRIPTION OF THE INVENTION

Figure 1:
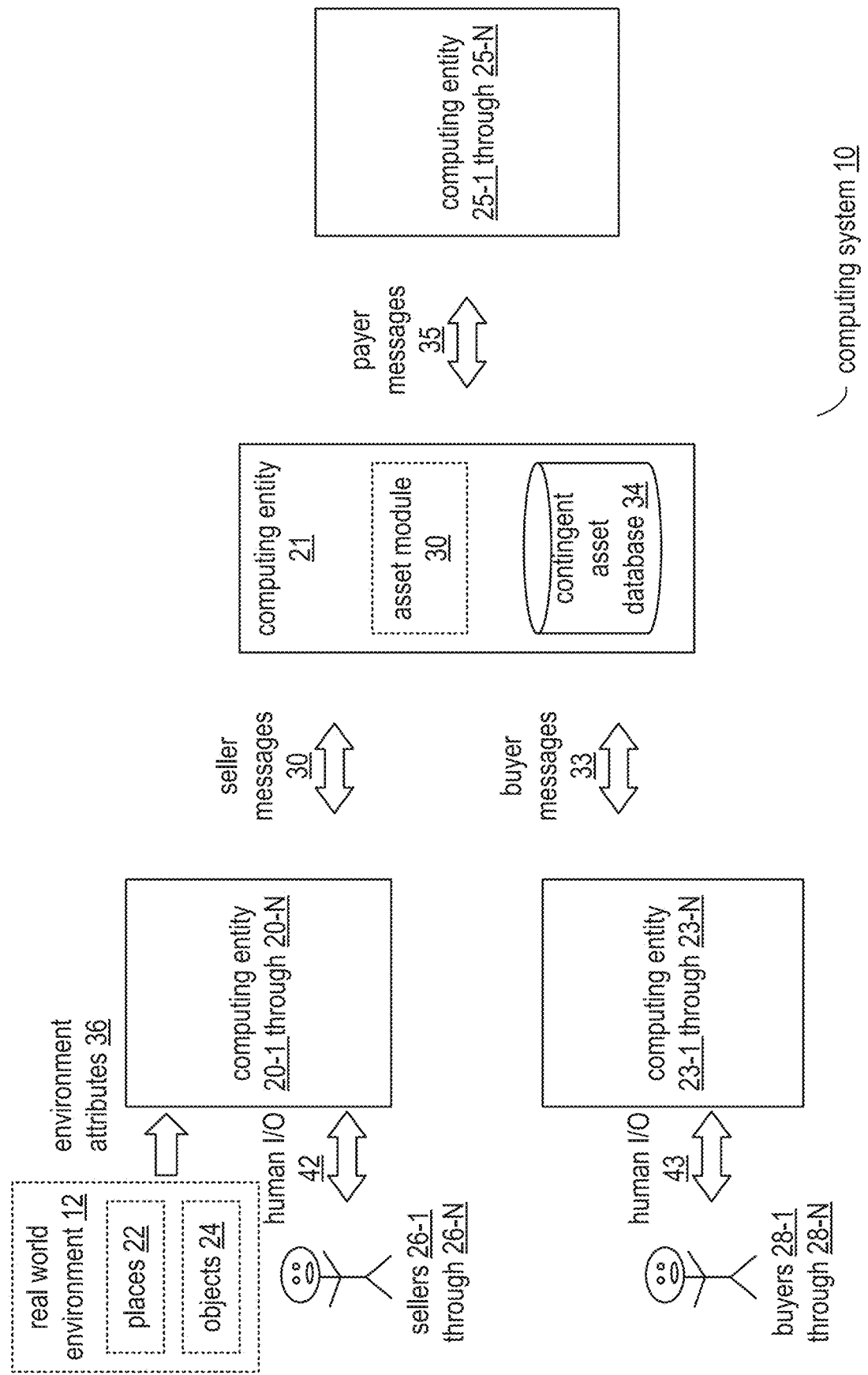
FIG. 1 is a schematic block diagram of an embodiment of a computing system in accordance with the present invention.

FIG. 1 is a schematic block diagram of an embodiment of a computing system 10 that includes a real world environment 12, computing entities 20-1 through 20-N, a computing entity 21, computing entities 23-1 through 23-N, and computing entities 25-1 through 25-N. The real-world environment 12 includes places 22 and objects 24. The computing entity 21 includes an asset module 30, and a contingent asset database 34. In an embodiment, the computing entity 21 serves as an exchange computing entity. In another embodiment, the computing entity 21 serves as a marketplace computing entity and/or device. In an embodiment, the computing entities 25-1 through 25-N serve as an asset authenticity computing entity (e.g., where tasks include authenticating validity and information with regards to a contingent asset). In an embodiment, the computing entities 23-1 through 23-N serve as blockchain nodes and/or as object ledger computing entities and/or object ledger computing devices of an object distributed ledger and/or computing entities associating with buyers of contingent assets.

The places 22 includes any physical area. Examples of places 22 includes a room, a series of rooms, an entire building, a portion of a building, an outdoor space, a neighborhood, a city, etc. The objects 24 includes things within the places. Examples of objects 24 includes people, equipment, lights, heating and air conditioning systems, building materials, furniture, personal items, tools, and representations of information (i.e., video recordings, audio recordings, captured text, etc.).

In an example of operation of the computing system 10, the computing entity 20-1 communicates with seller 26-1 of a plurality of sellers 26-1 through 26-N utilizing human input/output (I/O) 42. The computing entity 20-1 (e.g., an object owner computing entity) interprets the human I/O 42 and environment attributes 36 from the real world environment 12 to produce a seller message 30, where the seller message 30 is associated with a request to sell a contingent asset. The contingent asset includes a potential liability for a payer to pay an owner of the contingent asset subsequent to a contingency aspect of the contingent asset being satisfied. The contingency aspect includes an approval requirement for the contingent asset. For example, when unapproved the payer is not yet fully liable to pay the owner. As another example, when approved, the payer is liable to pay the owner with regards to the liability in accordance with terms of the liability.

The environment attributes 36 includes detectable measures of the real-world environment 12 to facilitate generation of a multi-dimensional (e.g., including time) representation of the real-world environment 12 in a virtual reality and/or augmented reality environment. For example, the environment attributes 36 includes XYZ position information, place information of the places 22, and object information of the objects 24 (i.e., background, foreground, homeowner, contractor, etc.). The XYZ position information includes portrayal in a world space industry standard format (e.g., with reference to an absolute position). For instance, the environment attributes 36 portrays a representation of recent energy efficiency improvements made to a house.

Having generated the seller message 30, the computing entity 20-1 sends the seller message 30 to the computing entity 21. The asset module 30 of the computing entity 21 generates a contingent asset record associated with the contingent asset. The asset module 30 issues a payer message 35 to the computing entity 25-1, where the payer message 35 includes a request to authenticate the contingent asset.

Having received the payer message 35, the computing entity 25-1 authenticates the contingent asset (e.g., verifies that the contingent asset has been created). The computing entity 25-1 issues another payer message 35 to the computing entity 21, where the other payer message 35 indicates that the contingent asset is favorably authenticated.

When the contingent asset has been favorably authenticated, the computing entity 21 determines a risk level associated with a contingent asset lifecycle of the contingent asset for at least a portion of the lifecycle. The contingent asset lifecycle starts when the contingent asset is created and ends when the liability associated with the contingent asset has been paid out in accordance with the terms of the liability. The contingent asset lifecycle is discussed in greater detail with reference to FIG. 5A.

The determining of the risk level associated with the contingent asset is based on numerous parameters and will ultimately be utilized to determine fair valuation of the contingent asset at any time during the contingent asset lifecycle. As it is the intention of the computing entity 21 to facilitate sale of the contingent asset from the seller 26-1 to at least one buyer of buyers 28-1 through 28-N via the computing entities 23-1 through 23-N, the determining of the risk level associated with the contingent asset includes an aggregate of a plurality of estimated risk levels. The plurality of estimated risk levels includes various risks associated with the seller 26-1, with the buyer, with a payer associated with the computing entity 25-1, and with the contingent asset itself. The determining of the risk level associated with a contingent asset will be discussed in greater detail with reference to FIGS. 5A-5H.

Having determined the risk level associated with the condition asset, the computing entity 21 negotiates aspects of a listing for the contingent asset with the computing entity 20-1 via further seller messages 30 on behalf of the seller 26-1 (e.g., agreed-upon listing price, timeframe, restrictions, etc.). The computing entity 21 communicates a listing for the contingent asset via a buyer messages 33 with the computing entities 23-1 through 23-N associated with the buyers 28-1 through 28-N.

Having received a buyer message 33 with regards to the listing of the contingent asset, the computing entity 23-1 determines whether to offer a bid for the contingent asset on behalf of the buyer 28-1. Alternatively, the computing entity 21 determines whether to offer the bid on behalf of one of the buyers. For example, the buyer 28-1 provides human I/O 43 to the computing entity 23-1 with a bid price and a maximum price to initiate making an offer for the condition asset.

When making a bid, the computing entity 23-1 issues a further buyer message 33 to the computing entity 21 that includes information associated with the bid for the contingent asset. When successful, the computing entity 21 updates the record for the contingent asset to indicate that the buyer 28-1 is now the owner for the contingent asset (e.g., and not the seller 26-1). The updating the record includes disassociating the computing entity 20-1 with the contingent asset and associating the computing entity 23-1 with the contingent asset.

When the computing entity 21 detects that the contingency aspect of the contingent asset has been satisfied, the computing entity 21 updates the record associated with the contingent asset to indicate that a status has changed from contingent to noncontingent for the asset associated with the original contingent asset. For example, the asset module 30 receives another payer message 35 from the computing entity 25-1 that includes the indication that the status has changed to noncontingent, updates the record for the contingent asset, and stores the updated record in the contingent asset database 34. Alternatively, or in addition to, the computing entity 21 publishes the updated status to the computing entities associated with the buyers utilizing the updated record when the asset is available and has not been purchased by one of the buyers.

When the computing entity 21 detects the end of the contingent asset lifecycle (e.g., receiving a payer message 35 from the computing entity 25-1 that indicates that the payer liability is now to be settled), the computing entity 21 facilitates payment to one or more current owners (e.g., the buyer 28-1). For example, the computing entity 21 receives another payer message 35 from the computing entity 25-1 that includes payment information. The computing entity determines payoff information based on the payment information and issues another buyer message 33 to the computing entity 23-1 that includes the payoff information.

Figure 2A:
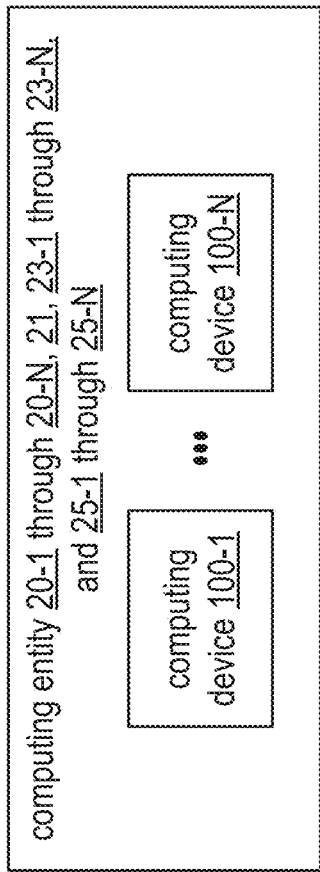
FIG. 2A is a schematic block diagram of an embodiment of a computing entity of a computing system in accordance with the present invention.

FIG. 2A is a schematic block diagram of an embodiment of the computing entity (e.g., 20-1 through 20-N; 21; 23-1 through 23-N; and 25-1 through 25-N) of the computing system 10 of FIG. 1. The computing entity includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
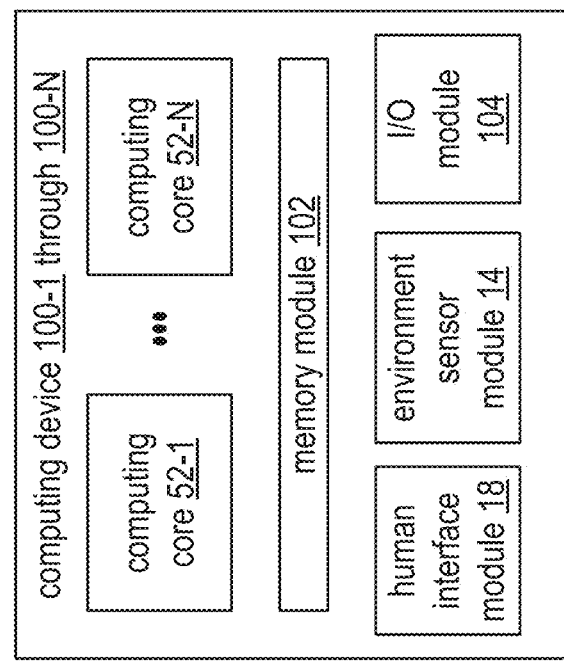
FIG. 2B is a schematic block diagram of an embodiment of a computing device of a computing system in accordance with the present invention.

FIG. 2B is a schematic block diagram of an embodiment of a computing device (e.g., 100-1 through 100-N) of the computing entity of FIG. 2A that includes one or more computing cores 52-1 through 52-N, a memory module 102, a human interface module 18, an environment sensor module 14, and an input/output (I/O) module 104. In alternative embodiments, the human interface module 18, the environment sensor module 14, the I/O module 104, and the memory module 102 may be standalone (e.g., external to the computing device). An embodiment of the computing device is discussed in greater detail with reference to FIG. 3.

Figure 3:
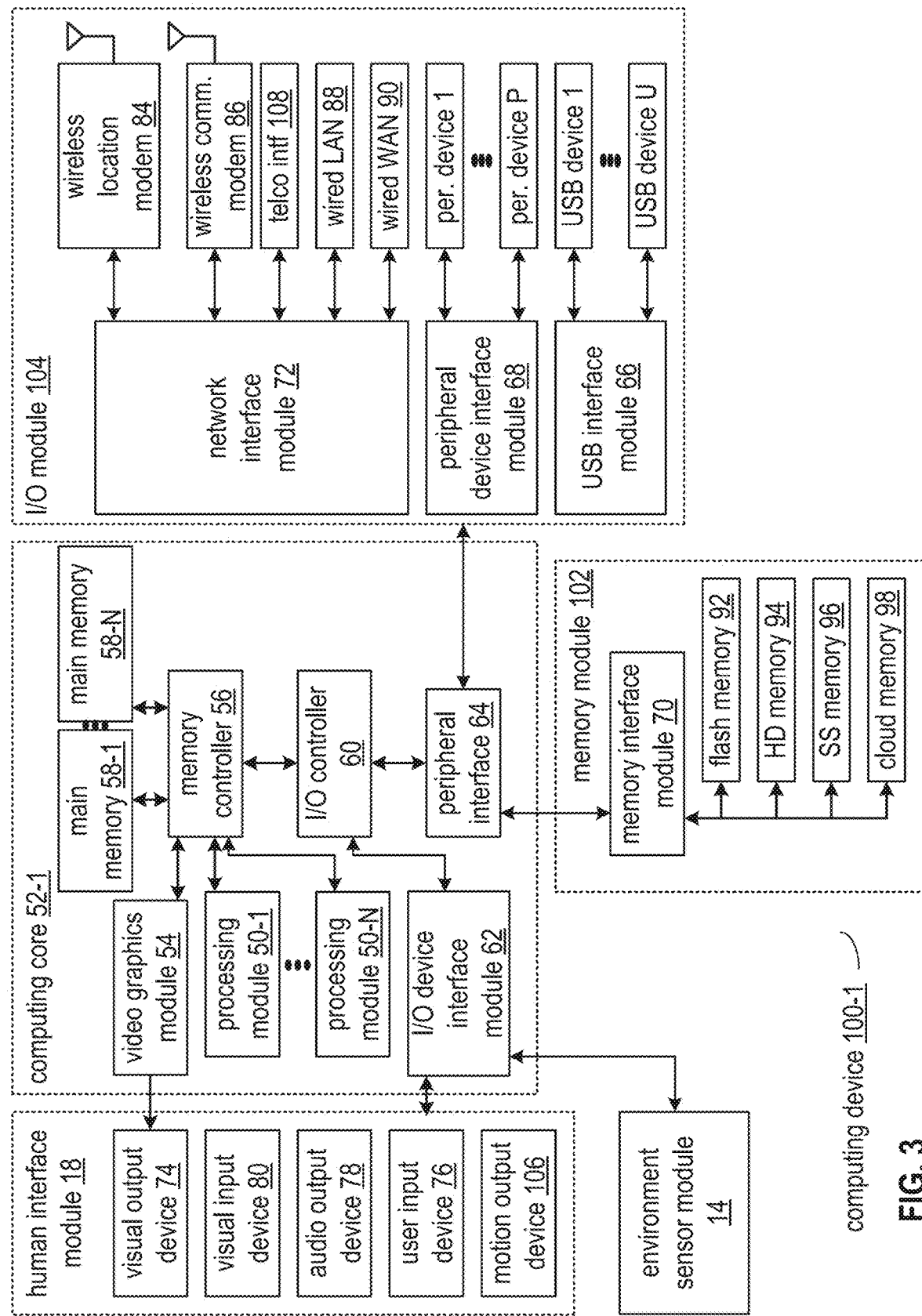
FIG. 3 is a schematic block diagram of another embodiment of a computing device of a computing system in accordance with the present invention.

FIG. 3 is a schematic block diagram of another embodiment of the computing device 100-1 of the computing system 10 that includes the human interface module 18, the environment sensor module 14, the computing core 52-1, the memory module 102, and the I/O module 104. The human interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100-1 may include more or less devices and modules than shown in this example embodiment.

Figure 4:
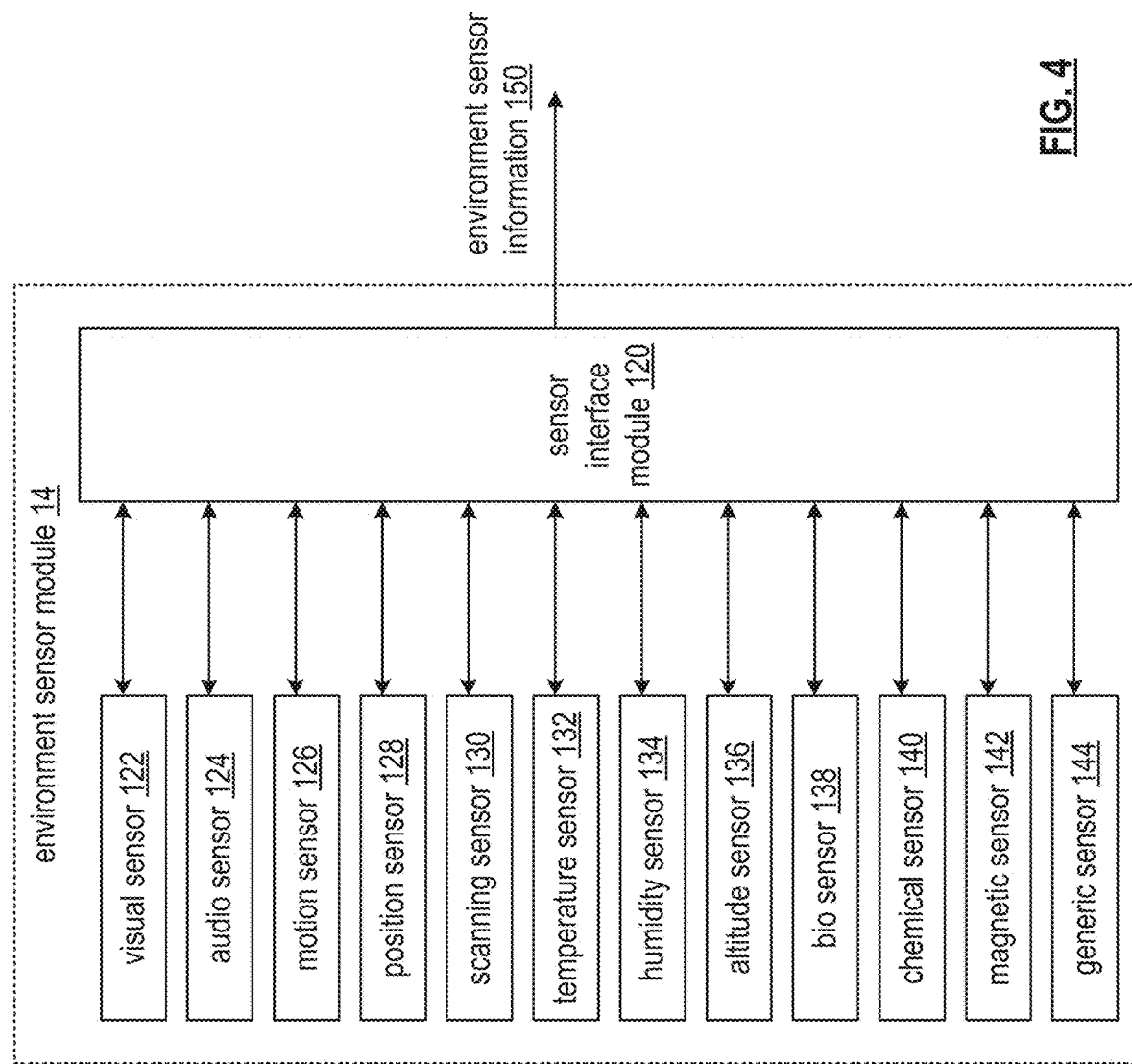
FIG. 4 is a schematic block diagram of an embodiment of an environment sensor module of a computing system in accordance with the present invention.

FIG. 4 is a schematic block diagram of an embodiment of the environment sensor module 14 of the computing device of FIG. 2B that includes a sensor interface module 120 to output environment sensor information 150 based on information communicated with a set of sensors. The set of sensors includes a visual sensor 122 (e.g., to the camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, MRI, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

FIGS. 5A-5H are schematic block diagrams of another embodiment of a computing system and a contingent asset risk chart illustrating an example of listing a contingent asset for sale. The computing system includes the computing entity 20-1 of FIG. 1, the computing entity 21 of FIG. 1, computing entities 23-1 through 23-N of FIG. 1, and the computing entity 25-1 of FIG. 1.

Figure 5A:
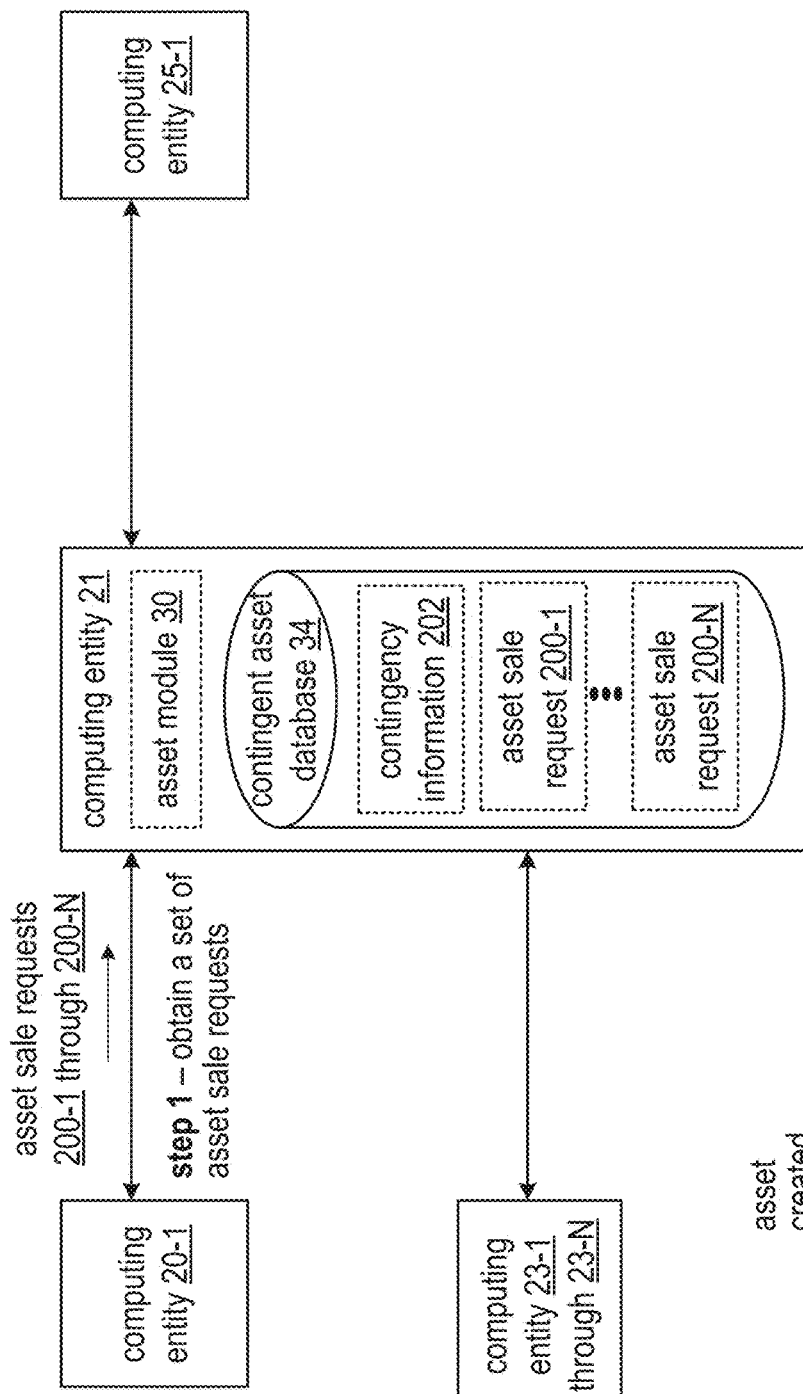

FIG. 5A illustrates an example method of operation of the listing of the contingent asset for sale where in a first step the asset module 30 obtains a set of asset sale requests 200-1 through 200-N from the computing entity 20-1. A first asset of a first asset sale request of the set of asset sale requests assigns a face value level of a potential first liability of a first payer to a first seller associated with the first asset. At least a portion of the face value of the potential first liability is to be paid by the first payer to the first seller in accordance with contingency information and subsequent to completion of a first asset lifecycle of the first asset. The set of asset sale requests are generated within a sales timeframe.

Figure 5B:
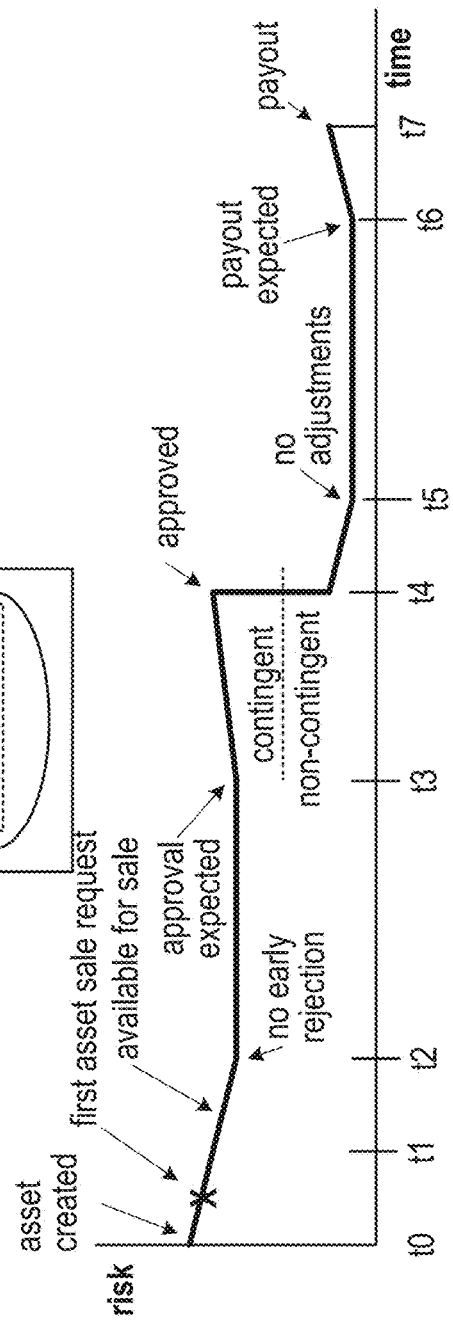

Turning to FIG. 5B where a risk chart represents a portrayal of overall risk of the contingent asset over the lifecycle of the contingent asset, the lifecycle begins at time t0 when the asset is created. For example, the seller requests that the payer acknowledge the potential liability of the payer to the seller in the form of the contingent asset.

The overall risk level is based on an aggregate of risks of all of the entities involved in transactions of the asset or even other associated assets (e.g., assets associated with other asset sale requests within the sales timeframe) and the asset itself. The risks of the asset itself include one or more of a contingent asset program type associated with the payer, a history of payouts for similar assets of similar program types, a face value amount of the asset (e.g., an original requested amount of the potential liability by the seller), and an age of the asset (e.g., time since asset creation along the asset lifecycle).

Subsequent to creation of the asset, the seller generates an asset sale request with the hopes to receive at least some payment in exchange for the asset far before the end of the lifecycle. Subsequent to the asset sale request, the asset becomes available for sale. In the example of the risk level, the risk is gradually decreasing as time goes on since no early rejection by the payer has been generated. Subsequent to the asset sale request, the payer approves the potential liability such that the contingency of approval has been removed and the asset is now associated with the noncontingent status at t4. Prior to approval, the example indicates that the risk is gradually increasing since approval is expected but not yet received.

The example indicates that the risk level drops significantly upon approval of the of the contingency since the liability has greater certainty of a subsequent payout. The example indicates that the risk is gradually falling after approval since no adjustments to an amount of the payout have been received yet from the payer. The example indicates a gradual increase in the risk just prior to the payout when the payout is expected at t7. Lifecycle ends when the payer facilitates the payout of the liability (e.g., from the payer to one or more owners of the asset).

Alternatively, at any time during the lifecycle, the risk jumps significantly when the payer rejects the potential liability of the payer. Further alternatively, the asset is sold such that the seller is disassociated from ownership and that one or more buyers are associated with ownership of the asset. The transitioning of ownership is possible at any time during the lifecycle of the asset but more likely after the asset is made available for sale and before the approval of the liability.

Returning to FIG. 5A, the contingency information for each asset includes a variety of elements that are maintained in the contingent asset database 34 by the asset module 30. The contingency information includes an asset identifier (ID), an ask price (e.g., what the seller would like to receive), a reserve price (e.g., a minimum price that is acceptable), a lifecycle status indicator (e.g., indicating a current association of the asset to the lifecycle such as contingent, noncontingent, pending payment, payment approved, rejected and closed, payment completed and closed, etc.), and ownership information (e.g., one or more identifiers associated with current owners which may include the seller, percentage ownership levels by owner).

The contingency information further includes at least one payer identifier, a percentage of the potential liability assigned to each payer, a payer program identifier (e.g., an energy efficiency rebate program ID, a four new tire purchase rebate program ID, etc.), and time stamp information (e.g., dates and times for each step of any information transfer or transaction associated with the asset). The contingency information further includes a face value of the potential liability (e.g., a rebate amount when 100% of the liability is to be paid), an estimated payout level (e.g., a value less than or equal to the face value which is a function of available funds and/or compliance to the program etc.), an estimated payout timeframe (e.g., t7 of the lifecycle), and bid information (e.g., bid amount, bid timestamp, entity ID associated with the bid). The contingency information further includes risk information (e.g., the overall risk level associated with the asset and component risk levels that make up the overall risk level such as asset risk, seller risk, payer risk, and buyer risk).

The contingency information further includes related asset information, an authenticity indicator, and asset split information. The related asset information includes other asset identifiers associated with the asset, relationships between the asset and the other assets (e.g., same seller, same program, same payer, same buyer, similar risk information, etc.). The authenticity indicator includes an indication of when the asset is deemed authentic (e.g., a verified payer agrees to the potential liability), and unknown authenticity, and a not authentic (e.g., no payer agrees to the potential liability implied by the asset).

The asset split information includes a number of portions of the asset, a percentage of each portion, portion options (e.g., any additional terms to do with transactions associated with the asset such as recourse where the seller agrees to pay to cover downside associated with a rejection of the request for the potential liability from the payer), and pricing information proportion. The pricing information proportion of the asset includes an ask price, a bid price, a bid-ask spread, and a reserve price.

Returning to the first step of the example method of operation, where the computing entity 21 obtains the asset sale request 200-1 associated with the first asset, the asset module 30 obtains the asset sale request 200-1 by at least one of identifying desired assets associated with the computing entity 20-1 (e.g., identify what a seller associated with the computing entity 20-1 should offer for sale), requesting that the computing entity 20-1 issue the sale request, and receiving the sale request from the computing entity 20-1. In an embodiment the computing entity 20-1 is associated with a third party representing one or more sellers.

The asset sale request 200-1 includes one or more of an ask price, a reserve price, recourse information (e.g., terms of the recourse, a credit card number, etc.), an asset ID (e.g., of the first asset), a face value of the potential liability, a payer identifier, and a percentage liability of each of one or more payers when more than one payer is associated with the potential liability. The asset sale request further includes one or more of the lifecycle status, the ownership information, the payer program ID, the timestamp information, the related asset information, and the asset split information.

Each asset sale request of the asset sale request 200-1 through 200-N include similar attributes as described above. In an instance, the set of asset sale requests are related by an intention to sell a block of assets that are all associated with the same payer and same payer program. The risk level associated with the block of similar assets is lower than the individual risk levels if sold separately since the block is generally viewed as more legitimate, especially when the payer actively supports larger blocks of assets.

FIG. 5C further illustrates the example method of operation of the listing of the contingent asset for sale where, having obtained the set of asset sale requests, in a second step the computing entity 21 selects a first asset sale request of the set of asset sale requests based on a first authenticity indicator associated with the first asset sale request. The selecting includes obtaining the first authenticity indicator (e.g., requesting from the payer, determining the authenticity indicator, extracting the authenticity indicator from the first asset sale request when the payer provided the authenticity indicator to the seller, and receiving the authenticity indicator from the payer). For example, the asset module 30 receives a first authenticity indicator 204 from the computing entity 25-1. The selecting further includes interpreting the first authenticity indicator. For instance, the asset module 30 interprets the first authenticity indicator 204 to indicate that the first asset is authentic.

The selecting the first asset sale request further includes determining that the first asset has not yet been listed for sale and identifying an asset of the set of asset sale requests as the first asset when the asset is a most desired asset of assets of the set of asset sale requests. The identifying includes identifying a best fit for the seller to sell, detecting an asset risk level below a maximum risk threshold level, determining that other sales by the seller are associated with risk levels below a maximum seller risk threshold level, verifying that the payer is associated with a risk level below a maximum payer risk threshold level, and verifying that the seller has sold an aggregate of assets that is below a maximum seller cap.

Having selected the first asset sale request, in a third step of the example method of operation of the listing of the contingent asset for sale, the computing entity 21 determines whether a first asset risk level of the first asset of the first asset sale request is greater than a contingency risk threshold level as illustrated in FIG. 5D. The first asset is created by a computing entity associated with the first payer (e.g., the computing entity 25-1, the computing entity 20-1 on behalf of the computing entity 25-1, the computing entity 21 on behalf of the computing entity 25-1).

The determining includes one or more of obtaining risk levels of relevant attributes, calculating the first asset risk level based on the risk levels of the relevant attributes, and comparing the first asset risk level to the contingency risk threshold level. For example, the asset module 30 obtains the risk levels of the relevant attributes to include risks associated with the payer, the seller, the type of asset, parameters of the sale request, and status of the contingent asset (e.g., contingent versus noncontingent and lifecycle status). As a further example, the asset module 30 maps the risk levels of the relevant attributes to the first asset risk level for comparison to the contingency risk threshold level to determine that the first asset risk level is greater than the contingency risk threshold level.

FIG. 5E further illustrates the example method of operation of the listing of the contingent asset for sale where, having determined whether the first asset risk level is greater than the contingency risk threshold level, in a fourth step, when the first asset risk level of the first asset of the first asset sale request is greater than the contingency risk threshold level, the computing entity 21 establishes a first contingent asset based on the first asset of the first asset sale request. The establishing the first contingent asset includes a series of sub-steps.

A first sub-step includes generating a record for the first contingent asset to include the first asset ID, the seller ID, the payer ID, and seller desired pricing and or timing. A second sub-step includes determining pricing information based on risks and the seller desired pricing. For example, the asset module 30 generates the pricing information based on one or more of a desired sale price from the seller, an estimated probability of payer approval, expected payment timeframe, and expected payment level, an expected rate of return either on the asset or on an annualized basis, recent bid prices for similar assets, and recent bid-ask spreads for pools of similar assets.

Having determined the pricing information, a third sub-step includes verifying the pricing information with the seller. For example, the asset module 30 receives a first contingent asset pricing approval indicator 208 from the computing entity 20-1 to verify the pricing information with the seller.

A fourth sub-step includes updating the record for the first contingent asset to further include the pricing information. For example, the asset module 30 modifies the first contingent asset 206 within the contingent asset database 34 to include the updated record.

Having established the first contingent asset, a fifth step of the example method of operation of listing of a contingent asset for sale includes the computing entity 21 publishing availability of the first contingent asset to a plurality of other computing entities (e.g., to a plurality of potential buyers). The publishing includes one or more of generating first contingent asset information 210 (e.g., an exchange listing) utilizing the updated record, posting the listing on an exchange (e.g., storing the updated record in the contingent asset database 34 and making that portion of the database available to potential buyers), and sending the first contingent asset information 210 to at least some of the computing entities 23-1 through 23-N to reach buyers with the listing.

FIG. 5F illustrates the risk chart where the first contingent asset has been established in step 4 of the example. The chart further illustrates availability of the first contingent asset upon publishing in step 5 of the example.

FIG. 5G further illustrates the example method of operation of the listing of the contingent asset for sale where, having published availability of the first contingent asset, in a sixth step the computing entity 21 updates the first contingent asset to produce a first non-contingent asset as illustrated on the risk chart of FIG. 5H, when the first asset risk level of the first contingent asset is less than the contingency risk threshold level providing desired certainty for parties associated with ownership of the first asset during the first asset lifecycle. The updating includes determining the first asset risk level, comparing the first asset risk level to the contingency risk threshold level, and updating the record associated with the first contingent asset to indicate the first non-contingent asset has been created.

The determining of the first asset risk level includes obtaining the status of the first asset. The obtaining includes one or more of interpreting a first asset status update 214 from the computing entity 25-1 (e.g., indicating one of a payment approval status, approval pending, or approval rejected), receipt has seen the risk information associated with the first asset including updating a probability that the payer will pay at the end of the asset lifecycle.

The updating of the record associated with the first contingent asset includes one or more of changing a status from contingent to non-contingent, determining an updated price (e.g., raising the price when the asset is unsold and the payer has approved a subsequent payout), and generating a first non-contingent asset 212 to include the updated record. Alternatively, or in addition to, the asset module 30 further publishes the updated record by sending the first non-contingent asset 212 to the computing entities 23-1 through 23-N when the first asset has not been sold.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 6A-6F are schematic block diagrams of another embodiment of a computing system and a contingent asset risk chart illustrating an example of updating a listing of a contingent asset for sale. The computing system includes the computing entity 20-1 of FIG. 1, the computing entity 21 of FIG. 1, computing entities 23-1 through 23-N of FIG. 1, and the computing entity 25-1 of FIG. 1.

Figure 6A:
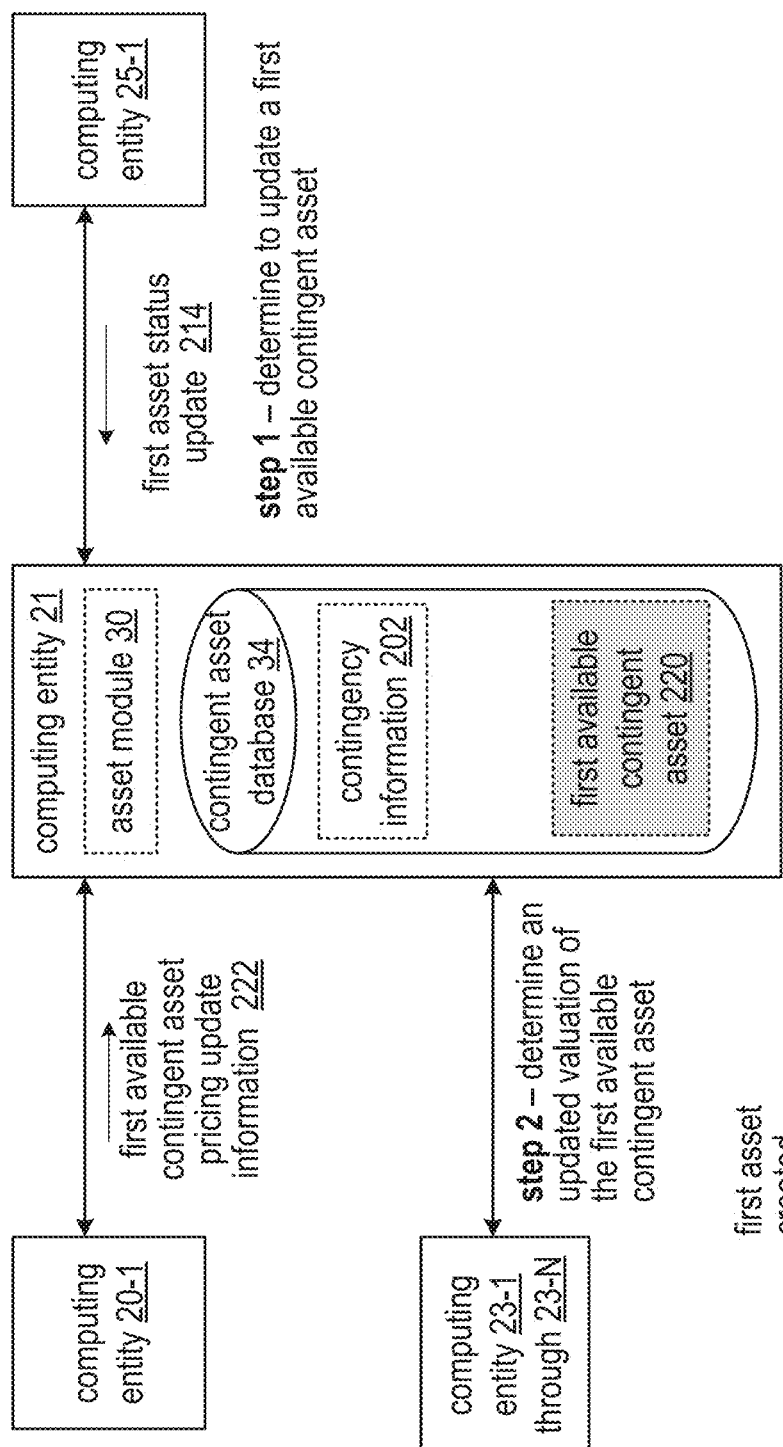
FIGS. 6A-6F are schematic block diagrams of another embodiment of a computing system and a contingent asset risk chart illustrating an example of updating a listing of a contingent asset for sale in accordance with the present invention.

FIG. 6A illustrates an example method of operation of the updating of the listing of the contingent asset for sale where a first step includes the computing entity 21 determining to update a first available contingent asset 220 of a multitude of available contingent assets. The first available contingent asset 220 assigns a potential first liability of a first payer to a first seller associated with the first available contingent asset. At least a portion of the potential first liability is to be paid by the first payer to the first seller in accordance with contingency information 202 and subsequent to completion of a first asset lifecycle, as illustrated in FIG. 6B, of the first available contingent asset.

The determining to update the first available contingent asset 220 includes a variety of approaches. A first approach includes the asset module 30 detecting that an update time frame has elapsed. A second approach includes the asset module 30 interpreting a first asset status update 214 from the computing entity 25-1 (e.g., from the payer). A third approach includes the asset module 30 interpreting first available contingent asset pricing update information 222 from the computing entity 20-1 (e.g., from the seller). For instance, the seller requests a lower asking price. As another instance, the seller requests more time to sell the first asset.

A fourth approach includes the asset module 30 detecting that value has changed on a pool of related assets. A fifth approach includes the asset module 30 determining that a price change for the first asset is required to hit a desired rate of return. A sixth approach includes the asset module 30 detecting that bids for the first asset are under the asking price by more than a maximum difference threshold level (e.g., suggesting the first asset has been overpriced).

Figure 6B:
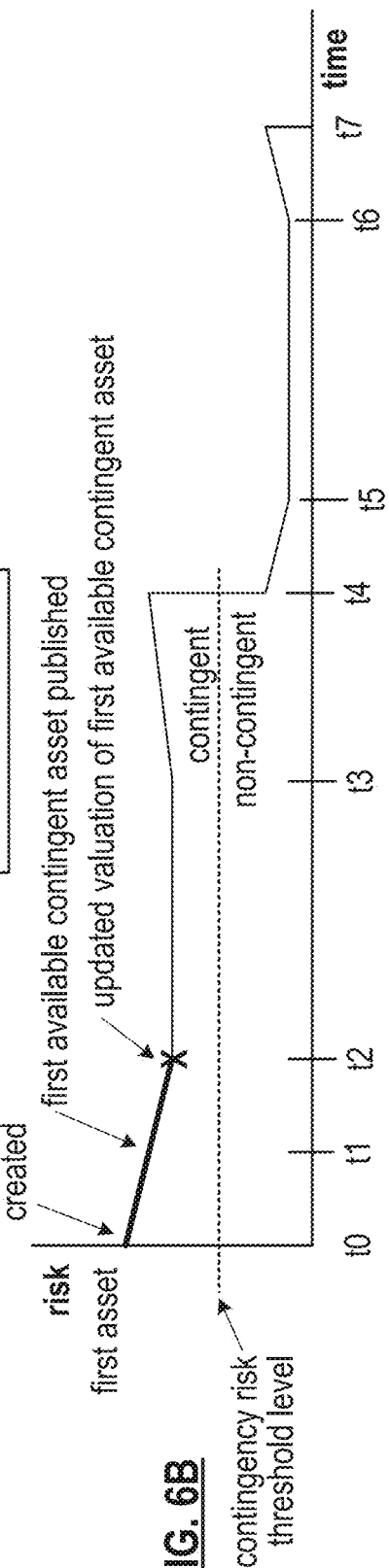

Having determined to update the first available contingent asset, a second step of the example method of operation of the updating of the listing of a contingent asset for sale includes the computing entity 21 determining an updated valuation of the first available contingent asset as depicted at t2 on the risk chart of FIG. 6B. The determining includes the asset module 30 reassessing the risk associated with the first asset and recalculating the value of the first available contingent asset based on one or more of a new estimate of the probability of payer approval, an updated expected payment, updated expected payment timing, an updated expected rate of return, recent bid prices for the first asset, and recent bid-ask spreads for other pools of similar assets.

Figure 6C:
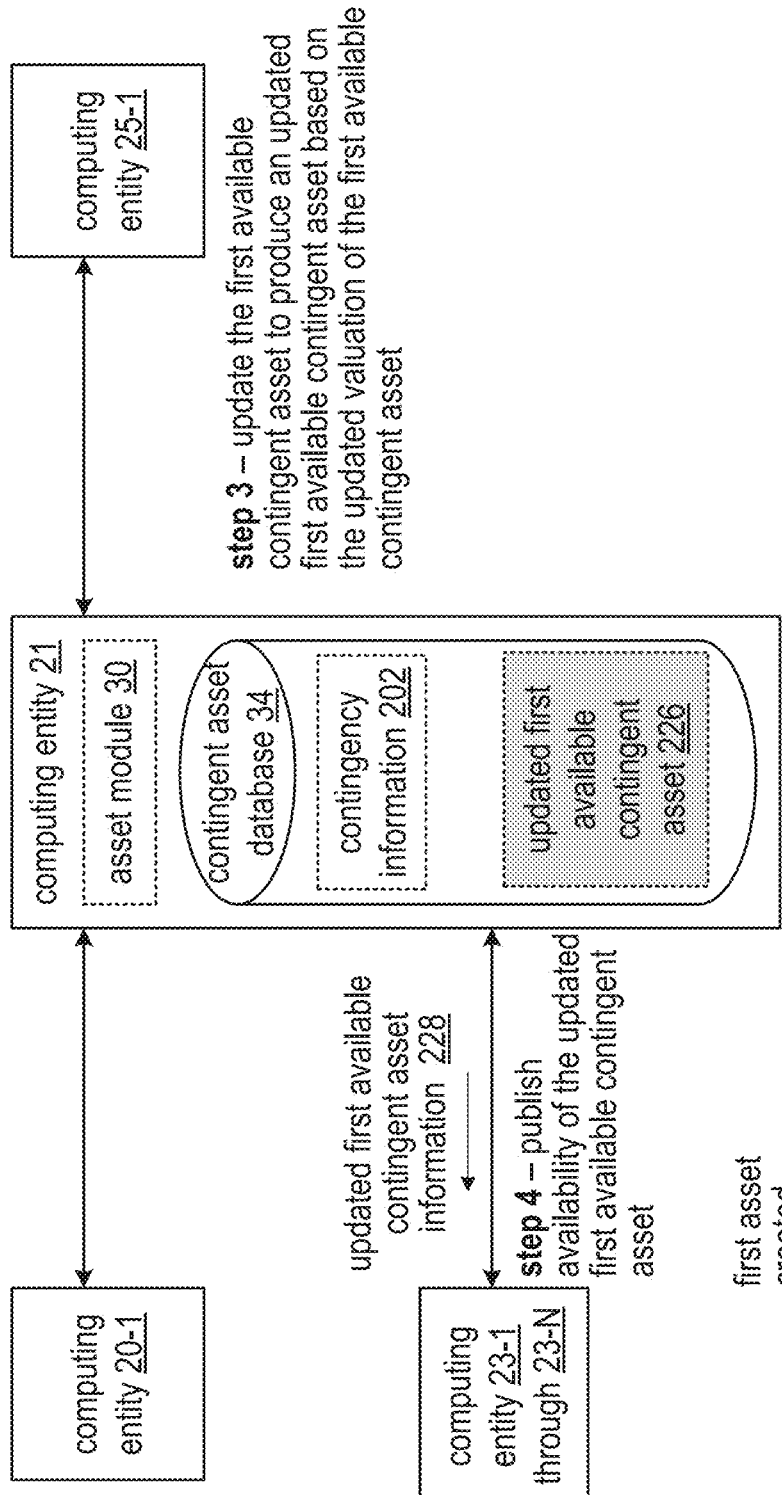

FIG. 6C further illustrates the example method of operation of the updating of the listing of the contingent asset for sale where, having determined the updated valuation of the first available contingent asset, the computing entity 21 updates the first available contingent asset to produce an updated first available contingent asset 226 based on the updated valuation of the first available contingent asset. For example, the asset module 30 updates the record of the first available contingent asset to produce the updated first available contingent asset 226 utilizing the updated valuation. Alternatively, or in addition to, the asset module 30 updates aspects of the contingency information 202 as a function of the new valuation.

Figure 6D:
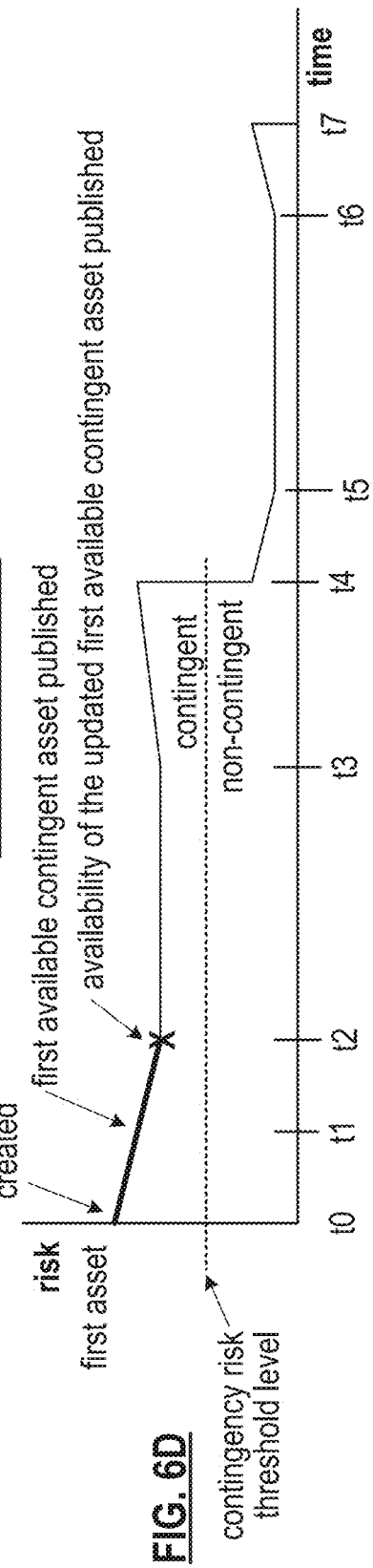

Having updated the first available contingent asset, a fourth step of the example method of operation of the updating of the listing of the contingent asset for sale includes the computing entity 21 publishing availability of the updated first available contingent asset 226 to a plurality of other computing entities 23-1 through 23-N (e.g., to buyers) as illustrated in FIG. 6D. The publishing includes the asset module 30 performing one or more of generating an exchange listing, posting the exchange listing on an exchange, generating a record that includes updated first contingent asset information as updated first available contingent asset information 228, sending the updated first available contingent asset information 228 (e.g., the record of the updated first contingent asset) to a plurality of other computing entities (e.g., to the computing entities 23-1 through 23-N).

Figure 6E:
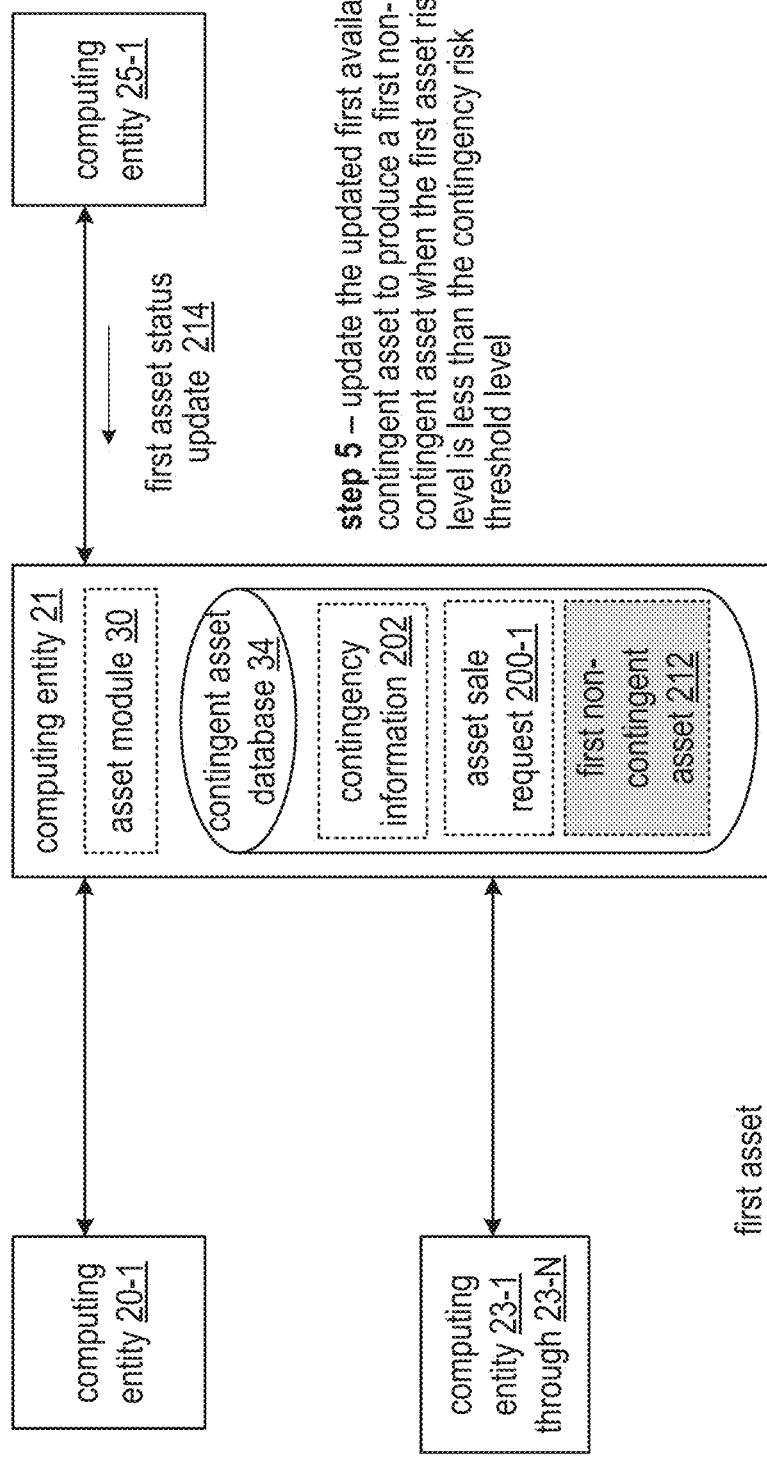
Figure 6F:
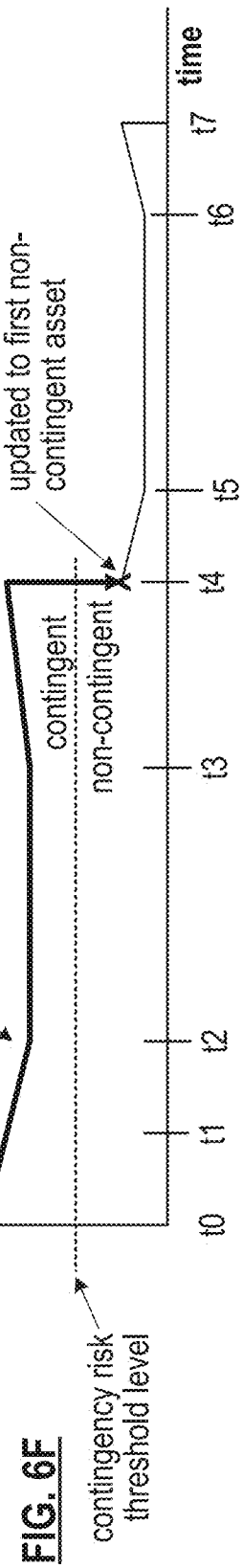

FIG. 6E further illustrates the example method of operation of the updating of the listing of the contingent asset for sale where, having published the availability of the updated first available contingent asset, the computing entity 21 updates the updated first available contingent asset to produce a first non-contingent asset 212 when a first asset risk level of the updated first available contingent asset is less than a contingency risk threshold level. The transitioning to the non-contingent status provides desired certainty for parties associated with ownership of the first asset during and later portion of first asset lifecycle as illustrated in FIG. 6F.

The updating of the updated first available contingent asset to produce the first non-contingent asset 212 by the computing entity 21 includes a series of sub-steps. In a first sub-step the asset module 30 obtains status of the first asset (e.g., interpret a first asset status update 214 from the computing entity 25-1). In a second sub-step the asset module 30 reassesses risk information of the contingency information 202 to produce an updated probability of the payer paying the payout at the end of the asset lifecycle even when the payer has approved the payment. A third sub-step includes the asset module 30 modifying status of the record of the first asset to indicate the non-contingent status. A fourth sub-step includes the asset module 30 repricing the first asset when the first asset is still for sale (e.g., at least the portion of the first asset is still for sale during the asset lifecycle). A fifth sub-step includes the asset module 30 republishing the record for the first non-contingent asset 212 (e.g., to the computing entities 23-1 through 23-N) when the first asset is still available for sale.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 7A-7H are schematic block diagrams of another embodiment of a computing system and a contingent asset risk chart illustrating an example of executing a sale of a contingent asset to a buyer from a seller. The computing system includes the computing entity 20-1 of FIG. 1, the computing entity 21 of FIG. 1, the computing entity 23-1 of FIG. 1, and the computing entity 25-1 of FIG. 1.

Figure 7A:
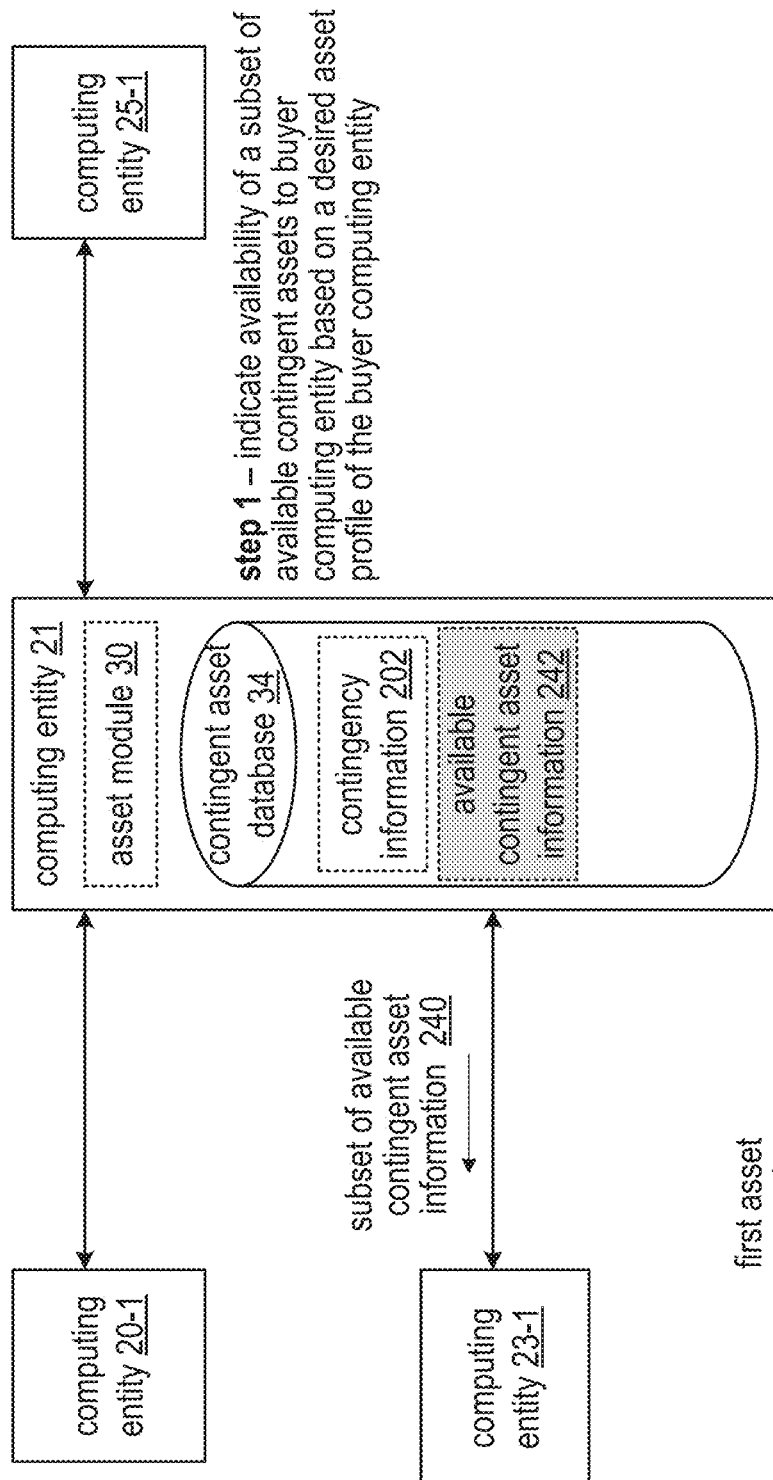
Figure 7B:
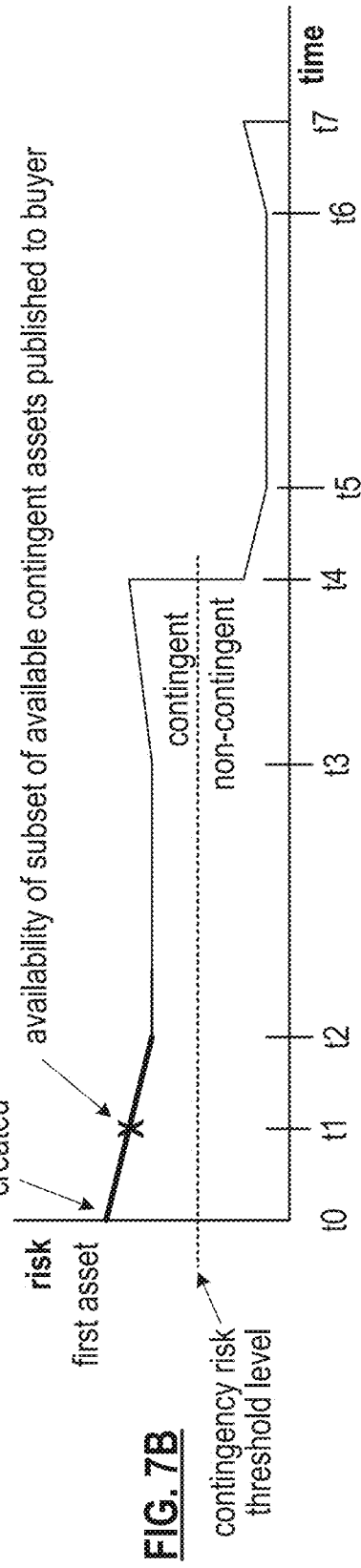

FIG. 7A illustrates an example method of operation of the executing of the sale of the contingent asset to the buyer from the seller, where a first step includes the computing entity 21 indicating availability of a subset of available contingent assets of a multitude of available contingent assets to the computing entity 23-1 at t1 of the risk chart for the asset lifecycle in FIG. 7B, based on a desired asset profile of the computing entity 23-1. A first available contingent asset of the subset of available contingent assets assigns a potential first liability of a first payer to a first seller associated with the first available contingent asset. At least a portion of the potential first liability is to be paid by the first payer to the first seller in accordance with contingency information and subsequent to completion of a first asset lifecycle of the first available contingent asset.

The indicating availability of the subset of available contingent assets includes a series of sub steps. A first sub-step includes the asset module 30 identifying assets desired by the computing entity 23-1 (e.g., the buyer) as the subset of available contingent assets. For example, the asset module 30 compares the desired asset profile of the computing entity 23-1 to assets of available contingent asset information 242 to select those assets that substantially satisfy the desired asset profile. A second sub-step includes the asset module 30 generating subset of available contingent asset information 240 utilizing the selected assets. A third sub-step includes the asset module 30 sending the subset of available contingent asset information 242 the computing entity 23-1. Alternatively, or in addition to, the asset module 30 publishes the available contingent asset information 242 on an exchange and/or sends the available contingent asset information 242 to other computing entities associated with even more buyers.

Figure 7C:
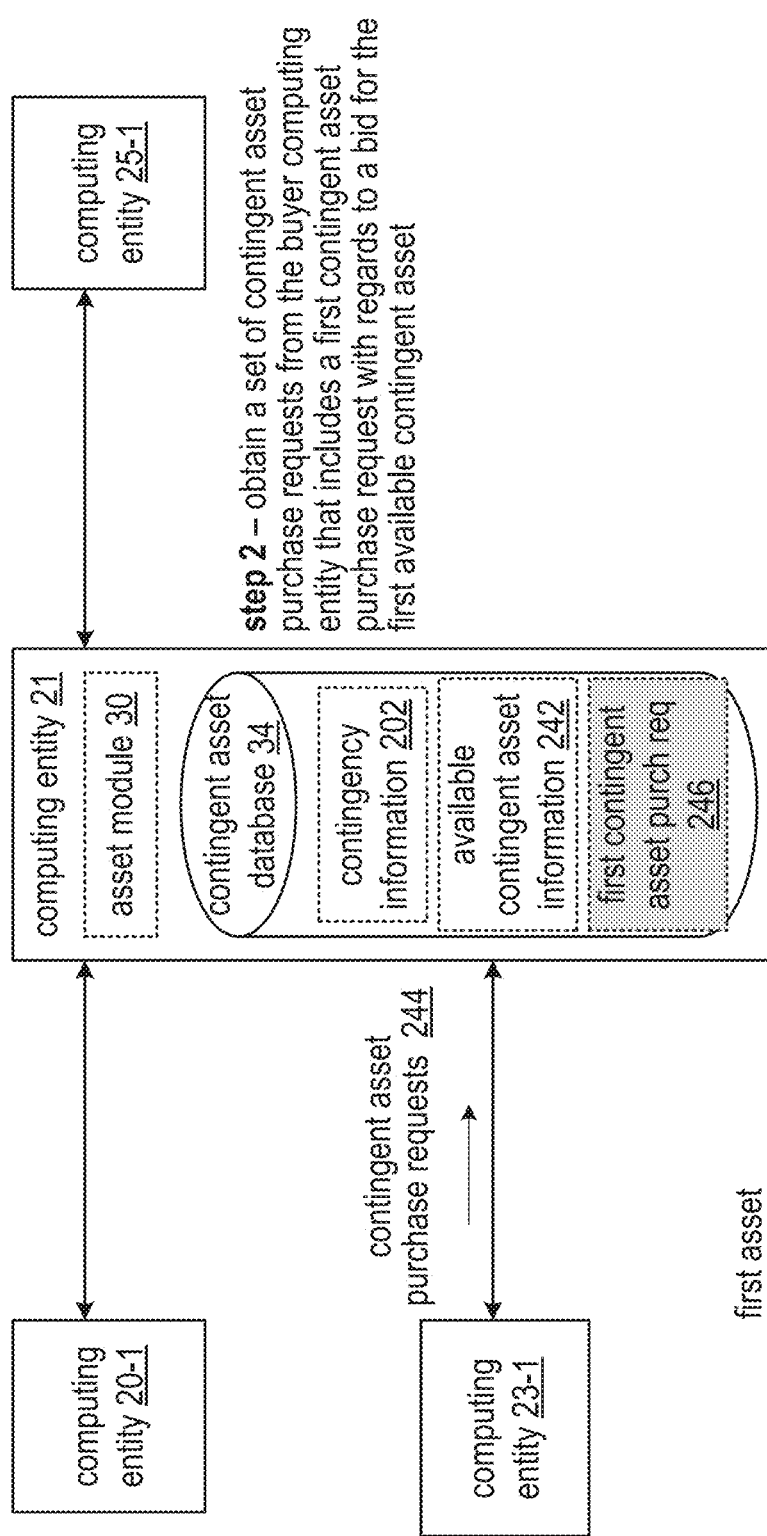
Figure 7D:
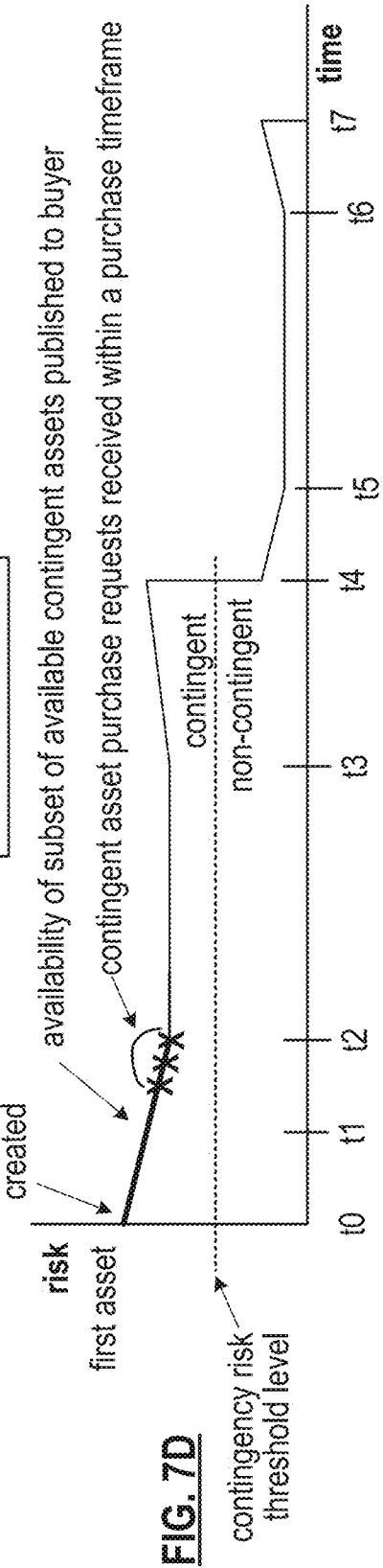

FIG. 7C further illustrates the example method of operation of the executing of the sale of the contingent asset to the buyer from the seller, where, having indicated the availability of the subset of available contingent assets to the buyer computing entity, in a second step the computing entity 21 obtains a set of contingent asset purchase requests 244 from the computing entity 23-1 (e.g., the buyer). The set of contingent asset purchase requests 244 includes a first contingent asset purchase request 246 with regards to a bid for the first available contingent asset. The set of contingent asset purchase requests are generated within a purchase timeframe as illustrated near t2 of the timeline of the risk chart of the first asset lifecycle of FIG. 7D.

The first contingent asset purchase request 246 includes one or more of the identifier (ID) of the first asset, a buyer ID, a bid price for the first asset, a bid price range as a function of one or more conditions (e.g., higher and of the range when risk of the first asset is lower), and settlement information (e.g., an account to debit upon purchase, a credit instrument to utilize for payment, payment timing, etc.). The conditions of the bid price range include risk, number of similar assets currently available for sale, number of similar assets currently held by the buyer, number of similar assets associated with the payer that still have an active lifecycle, or any other condition that can reasonably affect pricing to create an efficient market.

The obtaining of the set of contingent asset purchase requests 244 by the computing entity 21 includes a variety of approaches. A first approach includes the asset module 30 issuing a request for a bid message to the computing entity 23-1 (e.g., that includes an indication that assets of the subset of available contingent asset information 240 includes assets that substantially satisfied the desired asset profile of the buyer of the computing entity 23-1). A second approach includes the asset module 30 receiving the set of contingent asset purchase request 244 from the computing entity 23-1.

A third approach includes the asset module 30 determining an auto-order outcome based on the desired asset profile of the buyer computing entity. For example, the asset module 30 interprets the desired asset profile to identify the assets to include in auto-generating the contingent asset purchase request 244 on behalf of the buyer computing entity. A fourth approach includes the asset module receiving one or more contingent asset purchase requests from one or more other computing entities.

Figure 7E:
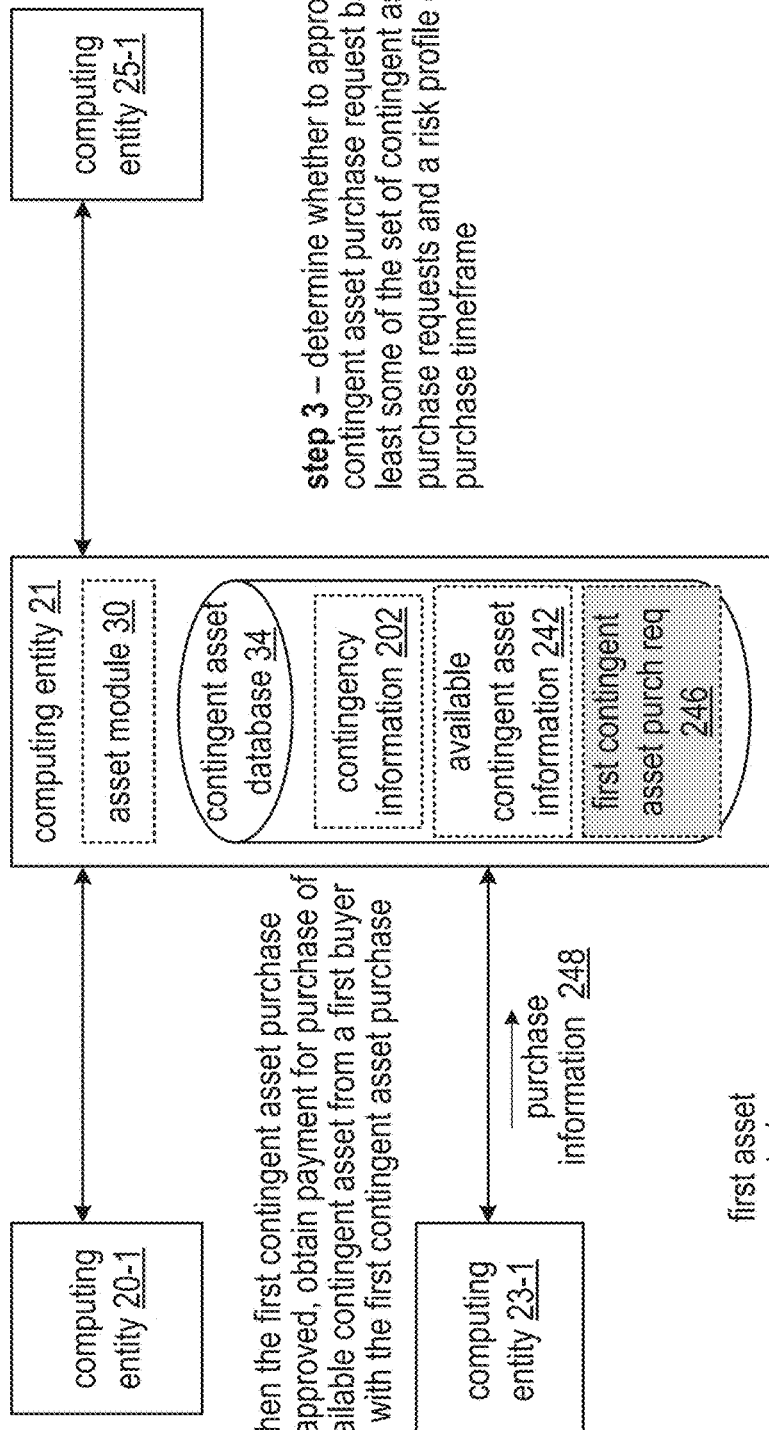
Figure 7F:
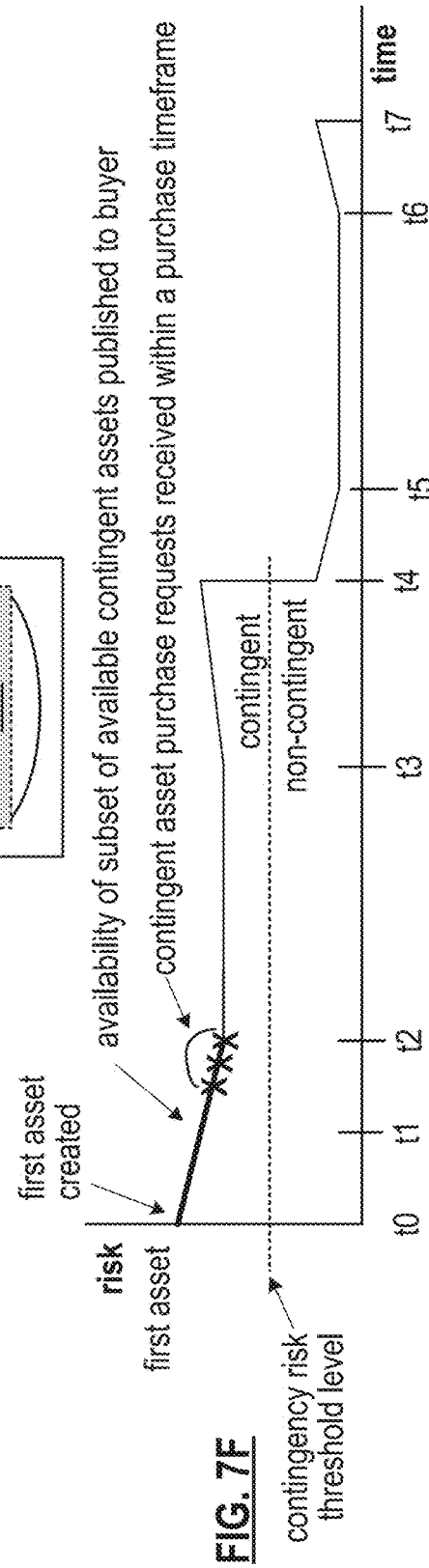

FIG. 7E further illustrates the example method of operation of the executing of the sale of the contingent asset to the buyer from the seller, where, having obtained the set of contingent asset purchase requests from the buyer computing entity, a third step includes the computing entity 21 determining whether to approve the first contingent asset purchase request based on at least some of the set of contingent asset purchase requests and a risk profile during the purchase timeframe after t2 of the risk chart for the asset lifecycle of FIG. 7F. The asset module 30 determines whether to approve the first contingent asset purchase requests based on one or more of face value of the first asset, a listed price by the seller, a minimum acceptable bid price set by the seller, a bid price from the buyer, a history of bid-ask spreads, other bid acceptances of the set of contingent asset purchase requests, a risk profile associated with the buyer, the risk level of the asset, an assessment to the impact of the buyer's portfolio, and an assessment of the impact to the available contingent assets.

As an example of the determining whether to approve the first contingent asset purchase request, the asset module 30 indicates approval when the risk level of the asset is below a maximum desired asset risk level, the risk profile associated with the buyer is below a buyer maximum risk threshold level, and the bid price from the buyer is greater than the minimum acceptable bid price set by the seller. As another example, the asset module 30 indicates disapproval when the risk level of the buyer is greater than the buyer maximum risk threshold level. As yet another example, the asset module indicates approval when the risk level of the buyer is greater than the buyer maximum risk threshold level and the bid price from the buyer is greater than the listed price by the seller by more than a minimum difference bid-ask spread level.

When the first contingent asset purchase request is approved, a fourth step of the example method of operation to execute the sale of a contingent asset includes the computing entity 21 obtaining payment for purchase of the first available contingent asset from a first buyer associated with the first contingent asset purchase request 246. The obtaining of the payment for purchase includes a series of sub-steps. A first sub-step includes the asset module 30 determining an execution price based on the approval. The determining includes one or more of establishing a base selling price at the bid price and making an adjustment associated with risk and/or transaction fees.

A second sub-step includes the asset module 30 issuing a request for payment to the computing entity 23-1, where the request for payment includes the execution price. A third sub-step includes the asset module 30 receiving purchase information 248 from the computing entity 23-1, where the purchase information 248 includes information to execute the sale including payment (e.g., including instructions such as immediate payment and/or deducting payment from an account associated with the buyer).

FIG. 7G further illustrates the example method of operation of the executing of the sale of the contingent asset to the buyer from the seller, where, having obtained the payment for the purchase of the first available contingent asset 206, a fifth step includes the computing entity 21 facilitating seller payment utilizing the payment for purchase of the first available contingent asset to complete the purchase as illustrated in the risk chart of the asset timeline of FIG. 7H. The facilitating includes the asset module 30 determining a seller payment amount from the payment for purchase and based on the contingency information 202 (e.g., recourse, fees, etc.). The facilitating further includes the asset module 30 issuing a first available contingent asset payment 250 to the computing entity 20-1 to satisfy payment to the seller. Alternatively or in addition to, the asset module 30 updates a seller account with a credit for the seller payment amount.

Having facilitated the seller payment, a sixth step of the example method of operation of the executing of the sale of a contingent asset to the buyer from the seller includes the computing entity 21 reassigning the potential first liability of the first available contingent asset from the first seller to an entity associated with the first buyer of the first contingent asset purchase request. For example, the asset module 30 updates the first contingent asset 206 within the contingent asset database 34 to associate an identifier of the buyer with the first contingent asset 206. Alternatively, or in addition to, a risk level associated with the buyer is updated based on the buyer now holding the first contingent asset 206.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 8A-8D are schematic block diagrams of another embodiment of a computing system and a contingent asset risk chart illustrating an example of facilitating payment from a payer to a buyer for a contingent asset. The computing system includes the computing entity 20-1 of FIG. 1, the computing entity 21 of FIG. 1, the computing entity 23-1 of FIG. 1, and the computing entity 25-1 of FIG. 1.

FIG. 8A illustrates an example method of operation of the facilitating payment from the payer to the buyer for the contingent asset, where a first step includes the computing entity 21 obtaining a lifecycle status for a first contingent asset 206 of a multitude of contingent assets. The first contingent asset 206 assigns a potential first liability of a first payer to an owner entity associated with the first contingent asset 206. At least a portion of the potential first liability is to be paid by the first payer to the owner entity in accordance with contingency information and subsequent to completion of a first asset lifecycle of the first contingent asset 206. The lifecycle status includes pending approval, approval for payment (e.g., pending payment at t7 of FIG. 8B), and rejected.

The obtaining of the lifecycle status for the first contingent asset 206 includes a variety of approaches. A first approach includes the asset module 30 detecting a change in a risk level associated with the first contingent asset. A second approach includes the asset module 30 detecting that a transition time frame has elapsed. A third approach includes the asset module 30 receiving a request for an updated status. A fourth approach includes the asset module 30 issuing a status update to the computing entity 25-1 (e.g., the payer). A fifth approach includes the asset module 30 interpreting a first asset status update 214 from the computing entity 25-1.

Having obtained the lifecycle status for the first contingent asset, when the lifecycle status of the first contingent asset has transitioned to pending payment, a second step of the example method of operation to facilitate payment from the payer to the buyer of the contingent asset includes the computing entity 21 obtaining a payout for the first contingent asset from the first payer in accordance with the contingency information 202. The obtaining of the payout includes a series of sub-steps. A first sub-step includes the asset module 30 determining an expected payout based on the contingency information 202 and payout information of the first contingent asset 206. For example, the asset module 30 determines the expected payout to be a committed payout level from the computing entity 25-1.

A second sub-step includes the asset module 30 issuing a payout request to the computing entity 25-1 of the payer, where the payout request includes the expected payout. A third sub-step includes the asset module 30 receiving a first contingent asset payout 260 from the computing entity 25-1. Alternatively, or in addition to, the first contingent asset payout 260 is included in a batch payment from the computing entity 25-1 for a multitude of asset payouts.

FIG. 8C further illustrates the example method of operation of the facilitating payment from the payer to the buyer for the contingent asset, where, when the lifecycle status of the first contingent asset has transitioned to pending payment as illustrated at t7 in FIG. 8D, and having obtained the payout for the first contingent asset from the first payer, a third step includes the computing entity 21 determining a payoff for the owner entity based on the payout and the contingency information 202. For example, when the payout is less than a face value, the asset module 30 calculates the payoff to be the payout minus any fees (e.g., a transaction fee). As another example, when the payout is greater than the face value, the asset module 30 calculates the payoff to be the payout minus the fees and further disposes of an overage (e.g., a difference between the payout and the face value) in accordance with the contingency information 202 (e.g., transfer funds to an account associated with an exchange, credit the buyer for a portion of a future purchase, credit the seller for repurchase of a future sale).

Having determined the payoff for the owner entity, a fourth step of the example method of operation of the facilitating payment from the payer to the buyer includes the computing entity 21 facilitating payment of the payoff to the owner entity. For example, the asset module 30 generates a payment message 262 that includes payment information in accordance with the first contingent asset payout 260. The asset module 30 sends the payment message 262 to the computing entity 23-1 associated with the owner entity. Alternatively, or in addition to, the asset module 30 credits an account associated with the owner entity for the amount of the payoff.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

Figure 9A:
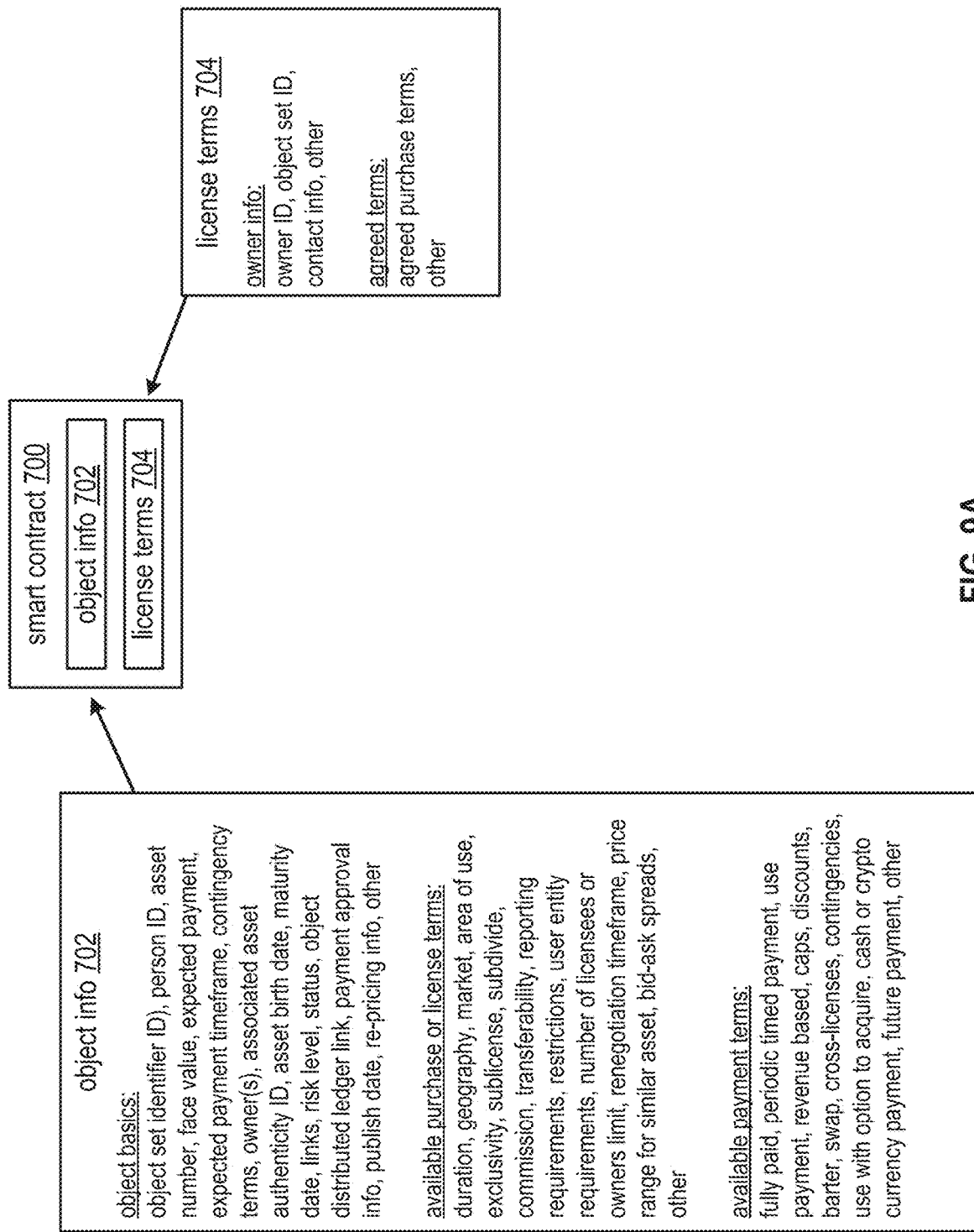
FIG. 9A is a schematic block diagram of a data structure for a smart contract in accordance with the present invention.

FIG. 9A is a schematic block diagram of a data structure for a smart contract 700 that includes object information 702 and license terms 704. The object information 702 includes object basics (e.g., including links to blockchains and electronic assets), available purchase and/or license terms, and available patent terms. FIG. 9A illustrates examples of each category of the object information 702. Examples of an object of the object information 702 that are associated with contingent asset offerings include an object set identifier (e.g., of one or more contingent assets), a face value of a contingent asset, and expected payment timeframe of the contingent asset and further parameters associated with contingent assets as illustrated in FIG. 9A.

The license terms 704 includes owner information and agreed terms for a sale of a contingent asset associated with the smart contract. FIG. 9A further illustrates examples of each of the categories of the license terms 704. Further examples are referenced below.

FIGS. 9B and 9C are schematic block diagrams of organization of object distributed ledgers. FIG. 9B illustrates an example where a single blockchain serves as the object distributed ledger linking a series of blocks of the blockchain, where each block is associated with a different owner (e.g., different owners over time for a particular contingent asset represented by a nonfungible token). FIG. 9C illustrates another example where a first blockchain links a series of blocks of different non-fungible tokens for different sets of contingent assets. Each block forms a blockchain of its own where each further block (e.g., to the right) of its own is associated with a different owner over time for the set of contingent asset objects associated with the non-fungible token.

Figure 9D:
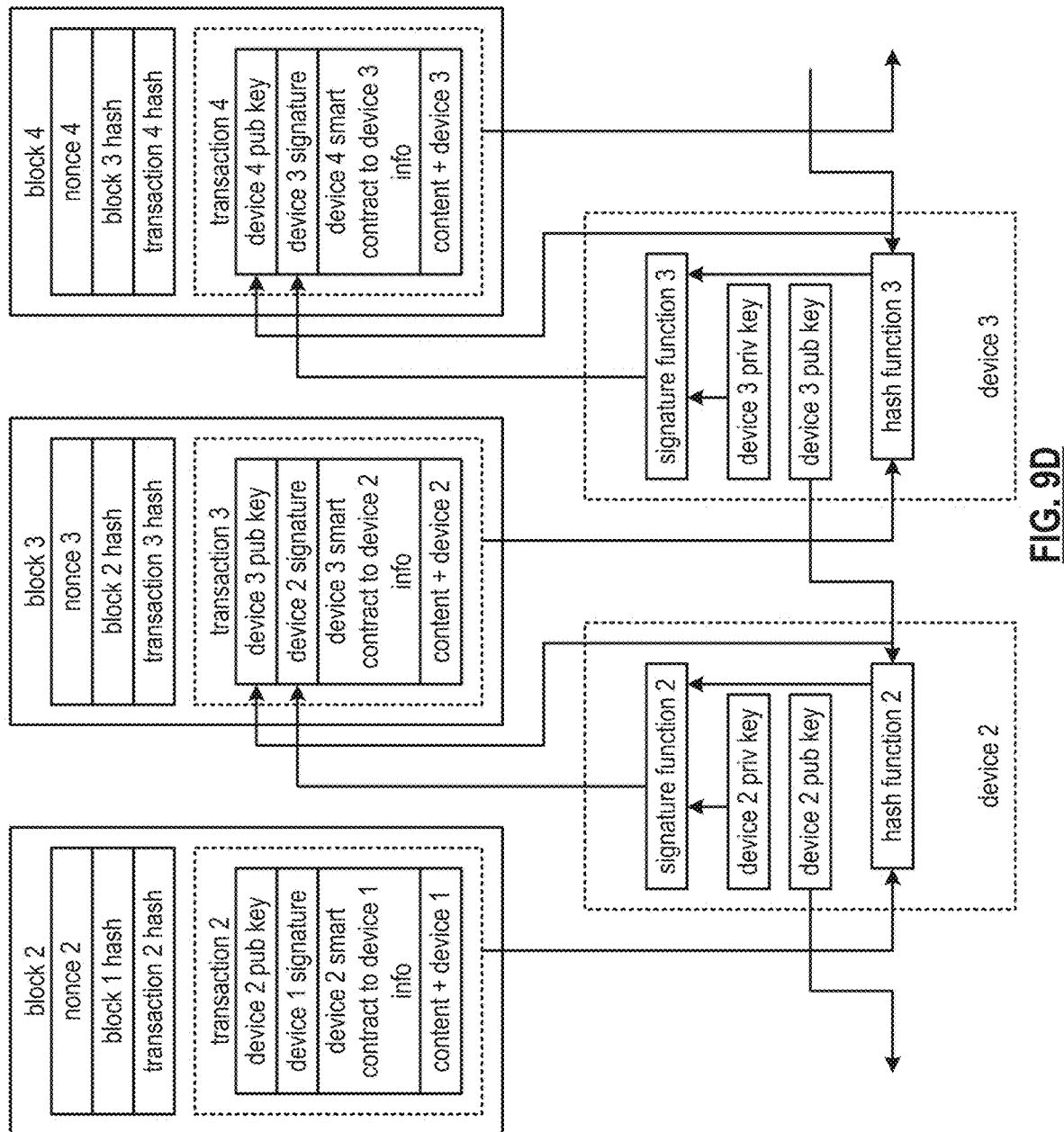
FIG. 9D is a schematic block diagram of an embodiment of a blockchain associated with an object distributed ledger in accordance with the present invention.

FIG. 9D is a schematic block diagram of an embodiment of content blockchain of an object distributed ledger, where the content includes the smart contract as previously discussed. The content blockchain includes a plurality of blocks 2-4. Each block includes a header section and a transaction section. The header section includes one or more of a nonce, a hash of a preceding block of the blockchain, where the preceding block was under control of a preceding device (e.g., a broker computing device, a user computing device, a blockchain node computing device, etc.) in a chain of control of the blockchain, and a hash of a current block (e.g., a current transaction section), where the current block is under control of a current device in the chain of control of the blockchain.

The transaction section includes one or more of a public key of the current device, a signature of the preceding device, smart contract content, change of control from the preceding device to the current device, and content information from the previous block as received by the previous device plus content added by the previous device when transferring the current block to the current device.

FIG. 9D further includes devices 2-3 to facilitate illustration of generation of the blockchain. Each device includes a hash function, a signature function, and storage for a public/private key pair generated by the device.

An example of operation of the generating of the blockchain, when the device 2 has control of the blockchain and is passing control of the blockchain to the device 3 (e.g., the device 3 is transacting a transfer of content from device 2), the device 2 obtains the device 3 public key from device 3, performs a hash function 2 over the device 3 public key and the transaction 2 to produce a hashing resultant (e.g., preceding transaction to device 2) and performs a signature function 2 over the hashing resultant utilizing a device 2 private key to produce a device 2 signature.

Having produced the device 2 signature, the device 2 generates the transaction 3 to include the device 3 public key, the device 2 signature, device 3 content request to 2 information, and the previous content plus content from device 2. The device 3 content request to device 2 information includes one or more of a detailed content request, a query request, background content, and specific instructions from device 3 to device 2 for access to a patent license. The previous content plus content from device 2 includes one or more of content from an original source, content from any subsequent source after the original source, an identifier of a source of content, a serial number of the content, an expiration date of the content, content utilization rules, and results of previous blockchain validations.

Having produced the transaction 3 section of the block 3 a processing module (e.g., of the device 2, of the device 3, of a transaction mining server, of another server), generates the header section by performing a hashing function over the transaction section 3 to produce a transaction 3 hash, performing the hashing function over the preceding block (e.g., block 2) to produce a block 2 hash. The performing of the hashing function may include generating a nonce such that when performing the hashing function to include the nonce of the header section, a desired characteristic of the resulting hash is achieved (e.g., a desired number of preceding zeros is produced in the resulting hash).

Having produced the block 3, the device 2 sends the block 3 to the device 3, where the device 3 initiates control of the blockchain. Having received the block 3, the device 3 validates the received block 3. The validating includes one or more of verifying the device 2 signature over the preceding transaction section (e.g., transaction 2) and the device 3 public key utilizing the device 2 public key (e.g., a re-created signature function result compares favorably to device 2 signature) and verifying that an extracted device 3 public key of the transaction 3 compares favorably to the device 3 public key held by the device 3. The device 3 considers the received block 3 validated when the verifications are favorable (e.g., the authenticity of the associated content is trusted).

FIGS. 9E-9M are schematic block diagrams of another embodiment of a computing system, contingent asset risk charts, and a blockchain record illustrating an example of listing a contingent asset for sale utilizing an object distributed ledger. The computing system includes the computing entity 20-1 of FIG. 1, the computing entity 21 of FIG. 1, computing entities 23-1 through 23-N of FIG. 1, and the computing entity 25-1 of FIG. 1.

Figure 9E:
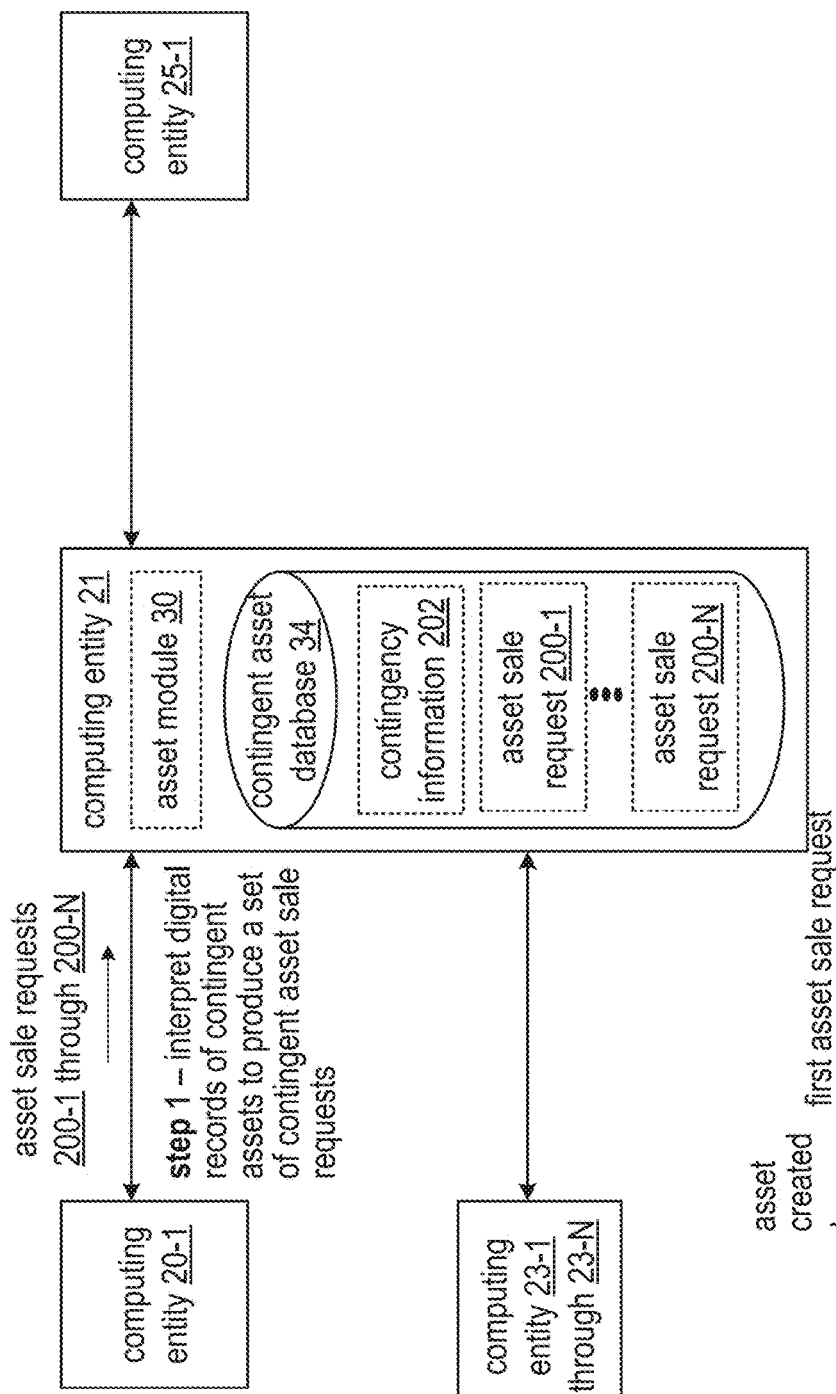
Figure 9F:
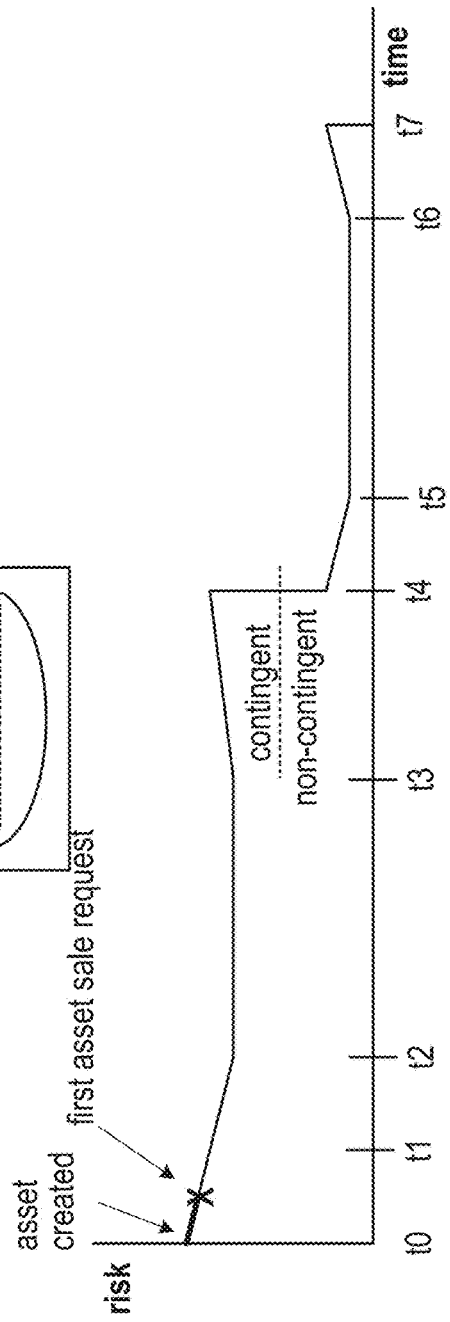

FIG. 9E illustrates an example method of operation of the listing of the contingent asset for sale utilizing the blockchain record where in a first step the asset module 30 obtains a set of asset sale requests 200-1 through 200-N from the computing entity 20-1 as depicted prior to t3 on the risk vs. time chart of FIG. 9F. A first asset of a first asset sale request of the set of asset sale requests assigns a face value level of a potential first liability of a first payer to a first seller associated with the first asset. At least a portion of the face value of the potential first liability is to be paid by the first payer to the first seller in accordance with contingency information and subsequent to completion of a first asset lifecycle of the first asset. The set of asset sale requests are generated within a sales timeframe.

The computing entity 21 obtains the asset sale request 200-1 associated with the first asset by at least one of identifying desired assets associated with the computing entity 20-1 (e.g., identify what a seller associated with the computing entity 20-1 should offer for sale), requesting that the computing entity 20-1 issue the sale request, and receiving the sale request from the computing entity 20-1. Alternatively, or in addition to, the asset sale request 200-1 includes a blockchain record associated with the first asset. In an embodiment the computing entity 20-1 is associated with a third party representing one or more sellers.

The first step further includes the computing entity 21 interpreting a set of digital records representing a multitude of contingent assets to produce a set of contingent asset sale requests. A first contingent asset of a first contingent asset sale request of the set of contingent asset sale requests assigns a potential first liability of a first payer to a first seller associated with the first contingent asset. For example, the asset module 30 interprets the digital record of asset sale request 200-1 to produce the first contingent asset sale request for the first contingent asset. The asset module 30 stores the asset sale requests in the contingent asset database 34.

FIG. 9G further illustrates the example method of operation of the listing of the contingent asset for sale utilizing the blockchain record where, having produced the set of contingent asset sale requests, in a second step the computing entity 21 interpreting a first authenticity indicator 204 associated with the first contingent asset sale request to produce a first contingent asset risk level of the first contingent asset of the first contingent asset sale request. The interpreting of the first authenticity indicator 204 associated with the first contingent asset sale request to produce the first contingent asset risk level of the first contingent asset of the first contingent asset sale request includes a series of sub-steps.

A first sub-step includes identifying an asset authenticity computing entity based on an identifier of the first seller. For example, the asset module 30 interprets the asset sale request 200-1 to extract an identifier of the asset authenticity computing entity as computing entity 25-1.

A second sub-step includes obtaining authenticity information from the asset authenticity computing entity for the first contingent asset. For example, the asset module 30 issues a request for the authenticity information for the first contingent asset to the computing entity 25-1 and receives a response from the computing entity 25-1 that includes the first authenticity indicator 204.

A third sub-step includes the computing entity 21 indicating that the first contingent asset is valid when the authenticity information validates that the potential first liability of the first payer is to the first seller associated with the first contingent asset and that the first payer has not disapproved payment of the potential first liability. For example, the asset module 30 interprets the first authenticity indicator 204 to determine a status of the first contingent asset where the status indicates that the potential first liability of the asset sale request 200-1 is confirmed as associated with the first payer. The asset module 30 further interprets the first authenticity indicator 204 to determine that the status indicates that the potential first liability of the first payer is to be made to the first seller of the asset sale request 200-1. The asset module 30 further interprets the first authenticity indicator 204 to determine that the status indicates that the first payer has not disapproved payment of the potential first liability (e.g., status is either approved or pending approval but not denied).

When the first contingent asset is valid and the authenticity information indicates approval of the payment of the potential first liability by the first payer, a fourth sub-step includes the computing entity 21 establishing the first contingent asset risk level to be less than the contingency risk threshold level. For example, the asset module 30 updates contingency information 202 in the contingent asset database 34 to indicate that the first contingent asset risk level is less than the contingency risk threshold level since the first payer has approved the payment.

Alternatively, when the first contingent asset is valid and the authenticity information indicates pending approval of the payment of the potential first liability by the first payer, a fifth sub-step includes the computing entity 21 establishing the first contingent asset risk level to be greater than the contingency risk threshold level since the first payer has not yet approved the payment implying that it is possible that payment will never be made.

Having produced the first contingent asset risk level, a third step of the example method of operation includes the computing entity 21 determines whether the first contingent asset risk level of the first contingent asset is greater than the contingency risk threshold level as illustrated in FIG. 9H. In an embodiment, the computing entity 21 updates the first contingent asset risk level as interpreted from the first authenticity indicator 204 by obtaining risk levels of relevant attributes, re-calculating the first contingent asset risk level based on the risk levels of the relevant attributes, and comparing the first contingent asset risk level to the contingency risk threshold level. For example, the asset module 30 obtains the risk levels of the relevant attributes to include risks associated with the payer, the seller, the type of contingent asset, parameters of the sale request, and status of the first contingent asset (e.g., contingent versus noncontingent and lifecycle status). As a further example, the asset module 30 maps the risk levels of the relevant attributes to the first contingent asset risk level for comparison to the contingency risk threshold level to determine that the first contingent asset risk level is greater than the contingency risk threshold level. As yet another example, the asset module 30 indicates that the first contingent asset risk level is greater than the contingency risk threshold level when a blockchain record of the first asset (e.g., as received in the asset sale request 200-1 and/or the first authenticity indicator 204) indicates that the payer has not approved the potential liability yet.

When the first contingent asset risk level of the first contingent asset of the first contingent asset sale request is greater than a contingency risk threshold level, the third step of the example method of operation further includes the computing entity 21 establishing first available terms for the first contingent asset based on the first contingent asset sale request. The establishing the first available terms for the first contingent asset based on the first contingent asset sale request includes a series of sub-steps.

A first sub-step includes determining proposed pricing of the first contingent asset based on one or more of a desired sale price from the first seller, an estimated probability of first payer approval, an expected payment timeframe, an expected payment level, an expected rate of return for the first seller, recent bid prices for other contingent assets, and recent bid-ask spreads for the other contingent assets. For example, the asset module 30 determines the proposed pricing of the first contingent asset as the same as the desired sale price from the first seller as indicated in the asset sale request 200-1.

A second sub-step includes determining whether the proposed pricing is acceptable to the first seller. For example, the asset module 30 issues a query to the computing entity 20-1 and receives a query response indicating whether the proposed pricing is acceptable to the first seller. As another example, the asset module 30 recovers acceptable pricing range information for the first seller from the contingency information 202 and indicates whether the proposed pricing is acceptable to the first seller based on interpreting the acceptable pricing range information.

A third sub-step includes establishing the first available license terms to include the proposed pricing of the first contingent asset when the proposed pricing is acceptable to the first seller. For example, the asset module 30 updates the contingency information 202 for the first contingent asset to include the proposed pricing as approved by the first seller.

Figure 9I:
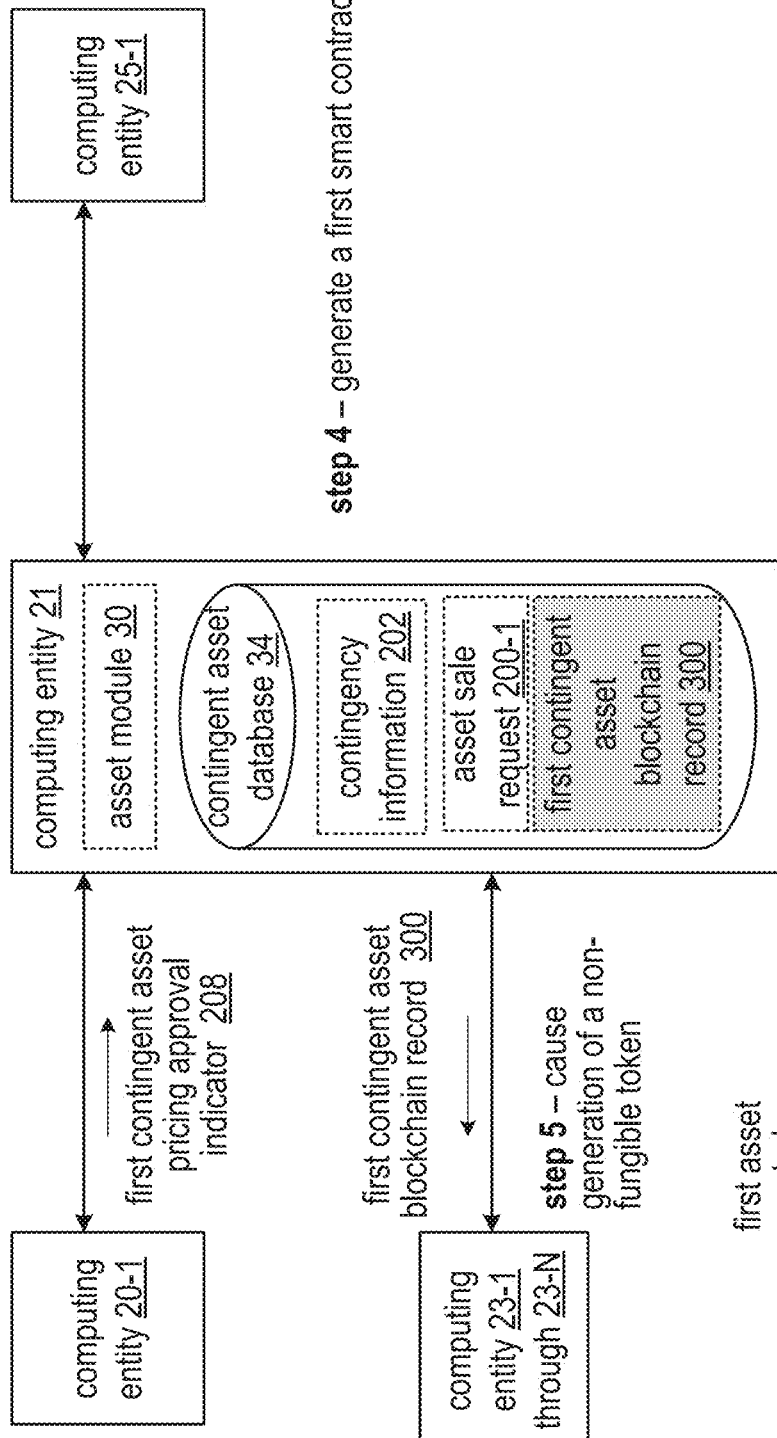

FIG. 9I further illustrates the example method of operation of the listing of the contingent asset for sale utilizing the blockchain record where, having established the first available terms for the first contingent asset, a fourth step includes the computing entity 21 generating a first smart contract to indicate availability of the first contingent asset to include the first available terms and a contingent status. For example, the asset module 30 generates the smart contract 700 as discussed previously to include an indication of availability of the first contingent asset, the first available terms, and a status indicator indicating that the payment by the first payer is still contingent (e.g., not approved yet).

Figure 9J:
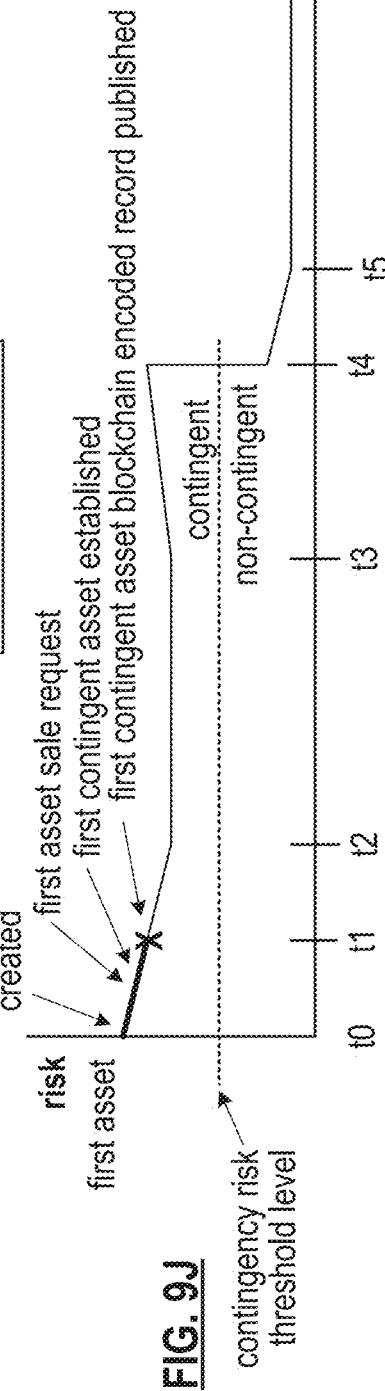

Having generated the first smart contract, a fifth step of the example method of operation includes the computing entity 21 causing generation of a non-fungible token to represent the first smart contract in the object distributed ledger as illustrated in a publishing step along the lifecycle in FIG. 9J. The causing the generation of the non-fungible token associated with the first smart contract in the object distributed ledger includes determining whether to indirectly or directly update the object distributed ledger. For example, the computing entity 21 determines to indirectly update the object distributed ledger when the computing entity 21 does not have a satisfactory direct access to the object distributed ledger (e.g., the computing entity 21 does not serve as a blockchain node). As another example, the computing entity 21 determines to directly update the object distributed ledger when a predetermination stored in the contingent asset database 34 indicates to directly access the object distributed ledger when possible (e.g., a copy of the blockchain is stored in the contingent asset database 34 of the computing entity 21).

When indirectly updating the object distributed ledger, the causing the generation includes the computing entity 21 issuing a non-fungible token generation request to an object ledger computing device serving as a blockchain node of the object distributed ledger. The non-fungible token generation request includes the first smart contract. For example, the computing entity 21 issues a first contingent asset blockchain record 300 to the computing entity 23-1, where the contingent asset blockchain record 300 includes the request and the first smart contract. In response, the computing entity 23-1 adds a new non-fungible token listing to the object distributed ledger (e.g., as illustrated by FIGS. 9B and 9C).

Figure 9K:
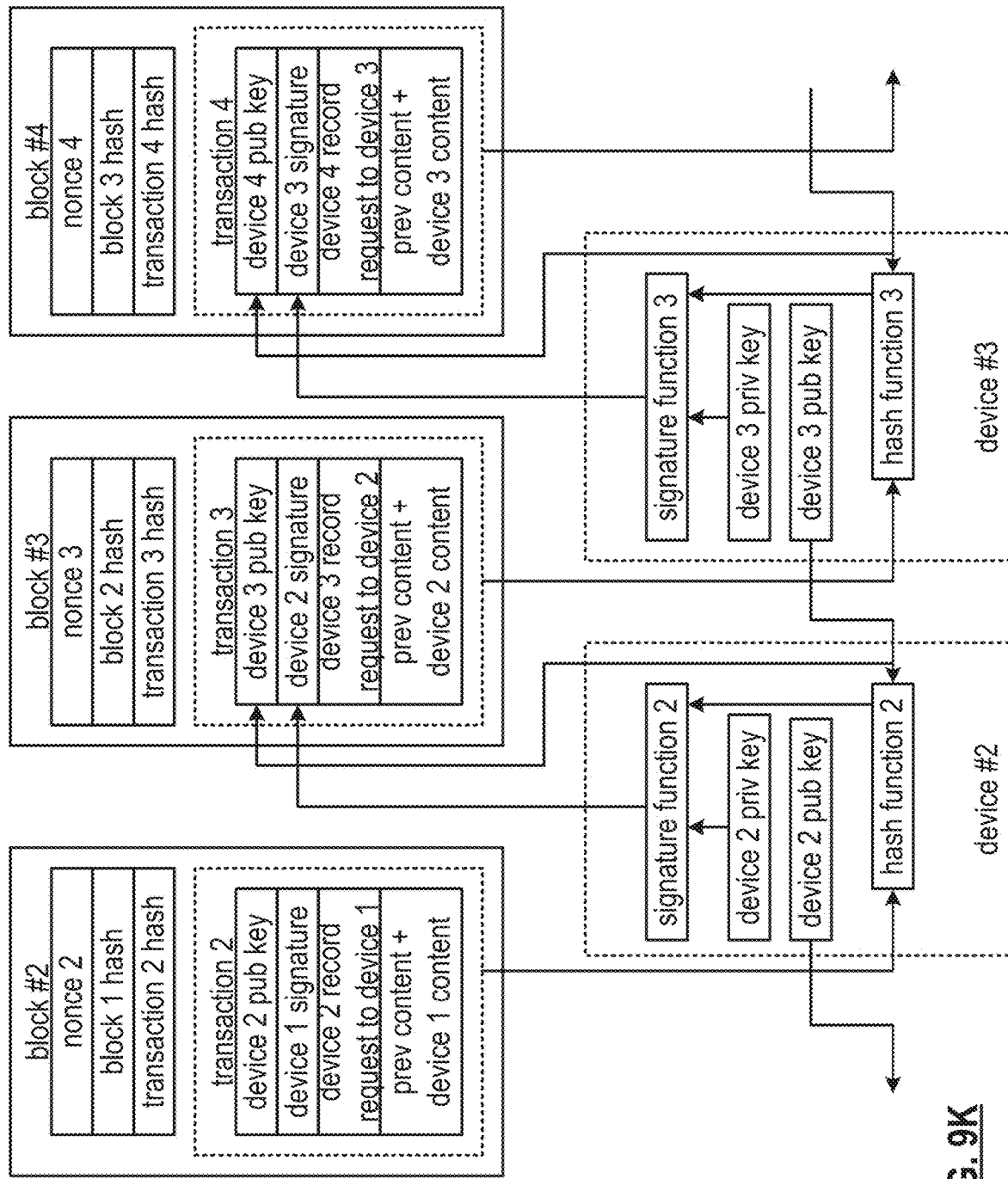

When directly updating the object distributed ledger, the causing the generation includes the computing entity 21 performing a series of sub-steps previously discussed in FIG. 9D and as also discussed in FIG. 9K. A first sub-step includes obtaining a copy of the object distributed ledger. For example, the computing entity 21 extracts the object distributed ledger from a message from computing entity 23-1. As another example, the computing entity 21 recovers the object distributed ledger from the contingent asset database 34.

A second sub-step includes hashing the first smart contract utilizing a receiving public key of the object distributed ledger to produce a next transaction hash value. For example, the computing entity 21 obtains a suitable receiving public key (e.g., from a current version of the blockchain, from a blockchain node, from the computing entity 23-1) and performs the hashing function to produce the next transaction hash value.

A third sub-step includes encrypting the next transaction hash value utilizing a private key of the computing entity 21 to produce a next transaction signature. For example, the computing entity 21 recovers a private key associated with the computing entity 21 and utilizes the recovered private key to encrypt the next transaction hash value to produce the next transaction signature.

A fourth sub-step includes generating a next block of a blockchain of the object distributed ledger to include the first smart contract and the next transaction signature. For example, the computing entity 21 generates the next block as previously discussed with regards to FIG. 9D to include the first smart contract and the next transaction signature.

A fifth sub-step includes causing inclusion of the next block as the non-fungible token in the object distributed ledger. For example, the computing entity 21 appends the next block of the blockchain in the object distributed ledger as previously discussed with reference to FIG. 9D to update the object distributed ledger as illustrated in FIGS. 9B and 9C.

Alternatively, when the first contingent asset risk level of the first contingent asset of the first contingent asset sale request is less than the contingency risk threshold level, the example method of operation includes the computing entity 21 establishing the first available terms for the first contingent asset based on the first contingent asset sale request. The example method of operation further includes the computing entity 21 generating first smart contract to indicate the availability of the first contingent asset to include the first available terms and a non-contingent status (e.g., the first payer has approved the payment). The example method of operation further includes the computing entity 21 causing generation of the non-fungible token to represent the first smart contract in the object distributed ledger as previously discussed.

FIG. 9K illustrates an example of generating a contingent asset blockchain record (e.g., for the first contingent asset blockchain record 300) where, blockchain-encoded records are utilized to securely represent contingent assets through the contingent asset lifecycle of FIG. 5B. In particular, a blockchain of blockchain-encoded records is utilized to record transactions and updates associated with a particular contingent asset. For instance, a new blockchain is created when a contingent asset is created by an associated computing entity on behalf of an initial owner. As another instance, the blockchain is updated when the contingent asset is sold by the original owner to a buyer. As yet another instance, the blockchain is updated when the contingent asset is sold by the buyer to another buyer. As a still further instance, the blockchain is updated when a liability of the contingent asset is paid by a payer to a current owner.

Each block of the blockchain includes various fields associated with the blockchain and a transaction field that includes content associated with the corresponding contingent asset as previously discussed. The content includes anything related to the contingent asset including contingency information and transaction information associated with a current event prompting updating of the blockchain.

The example blockchain includes blocks 2-4. Each block includes a header section and a transaction section. The header section includes one or more of a nonce, a hash of a preceding block of the blockchain, where the preceding block was under control of a preceding computing device (e.g., a computing device of a seller) in a chain of control of the blockchain, and a hash of a current block (e.g., a current transaction section). The current block is under control of a current computing device in the chain of control of the blockchain.

The transaction section includes one or more of a public key of the current computing device, a signature of the preceding computing device, request information regarding a record request and change of control from the preceding computing device to the current computing device, and content information from the previous block as received by the previous computing device plus content added by the previous computing device when transferring the current block to the current computing device.

The example further includes computing devices 2-3 (e.g., devices #2 and #3) to facilitate illustration of generation of the blockchain. Each computing device includes a hash function, a signature function, and storage for a public/private key pair generated by the device.

In an example of operation of the generating of the blockchain, when the device 2 has control of the blockchain and is passing control of the blockchain to the device 3 (e.g., the device 3 is transacting a transfer of content from device 2), the device 2 obtains the device 3 public key from device 3, performs a hash function 2 over the device 3 public key and the transaction 2 to produce a hashing resultant (e.g., preceding transaction to device 2) and performs a signature function 2 over the hashing resultant utilizing a device 2 private key to produce a device 2 signature.

Having produced the device 2 signature, the device 2 generates the transaction 3 to include the device 3 public key, the device 2 signature, device 3 record request to device 2 information, and the previous content plus content from device 2. The device 3 record request to device 2 information includes one or more of the actual record request, a query request, background content, and routing instructions from device 3 to device 2 for access to the content. The previous content plus content from device 2 includes one or more of content from an original source, content from any subsequent source after the original source, an identifier of a source of content, a serial number of the content, an expiration date of the content, content utilization rules, and results of previous blockchain validations.

Having produced the transaction 3 section of the block 3 a processing module (e.g., of the device 2, of the device 3, of a transaction mining computing entity, of a computing device), generates the header section by performing a hashing function over the transaction section 3 to produce a transaction 3 hash, performing the hashing function over the preceding block (e.g., block 2) to produce a block 2 hash. The performing of the hashing function may include generating a nonce such that when performing the hashing function to include the nonce of the header section, a desired characteristic of the resulting hash is achieved (e.g., a desired number of zero's).

Having produced the block 3, the device 2 sends the block 3 to the device 3, where the device 3 initiates control of the blockchain. Having received the block 3, the device 3 validates the received block 3. The validating includes one or more of verifying the device 2 signature over the preceding transaction section (e.g., transaction 2) and the device 3 public key utilizing the device 2 public key (e.g., a re-created signature function result compares favorably to device 2 signature) and verifying that an extracted device 3 public key of the transaction 3 compares favorably to the device 3 public key held by the device 3. The device 3 considers the received block 3 validated when the verifications are favorable (e.g., the authenticity of the associated content is trusted). For instance, the device considers the records intact, valid, and usable to facilitate listing, selling, buying, and paying off the contingent asset of the contingent asset blockchain record.

Figure 9L:
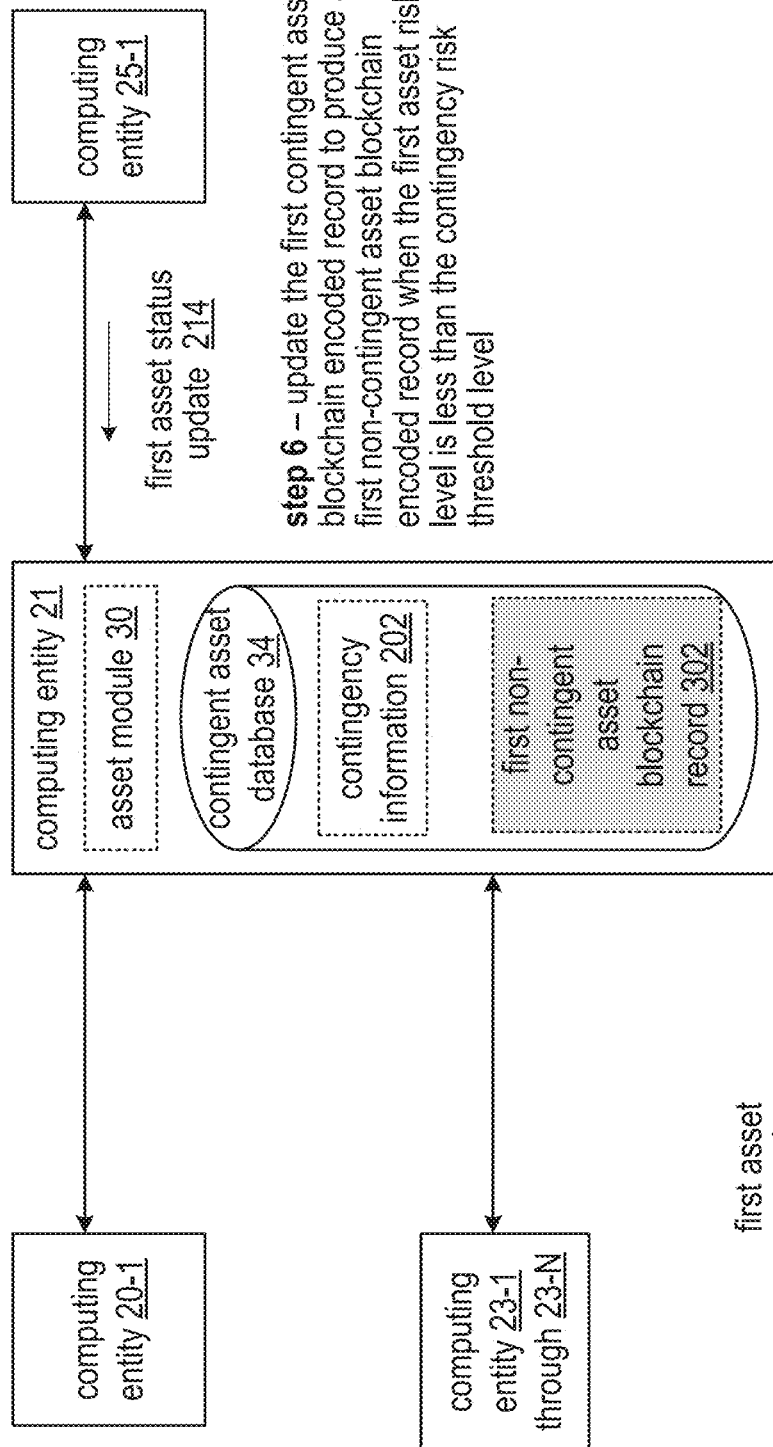

FIG. 9L further illustrates the example method of operation of the listing of the contingent asset for sale utilizing the blockchain record where, having published availability of the first contingent asset utilizing the first contingent asset blockchain encoded record and a nonfungible token, and when subsequent to the generation of the non-fungible token that represents the first smart contract in the object distributed ledger, a sixth step includes the computing entity 21, when the first contingent asset risk level of the first contingent asset of the first contingent asset sale request is less than the contingency risk threshold level (e.g., the first payer approves payment), establishing updated first available terms for the first contingent asset based on the first contingent asset risk level. For example, the asset module 30 redetermines the first contingent asset risk level and establishes repricing information for the smart contract (e.g., a higher price since the risk is lower from the payment approval).

Figure 9M:
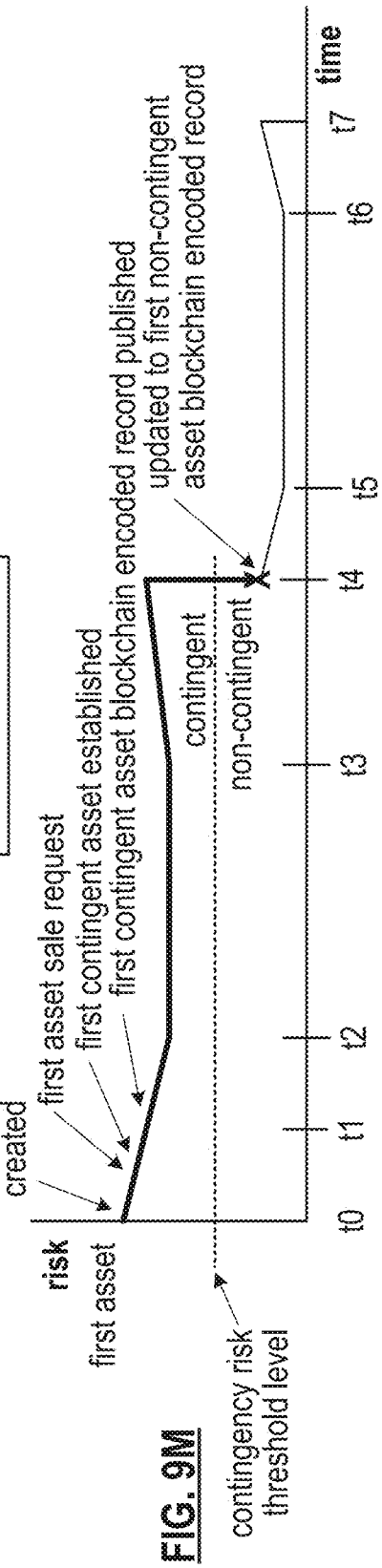

The re-determining of the first contingent asset risk level includes one or more of interpreting a first asset status update 214 from the computing entity 25-1 (e.g., indicating one of a payment approval status, approval pending, or approval rejected), reassess the risk information associated with the first asset including updating a probability that the payer will pay at the end of the asset lifecycle, and interpreting risk information of the content of the blockchain record. In an embodiment, the first asset status update 214 includes a status blockchain. The asset module 30 indicates the first contingent asset risk level to be less than the contingency risk threshold level when the status blockchain from the first asset status update 214 indicates that the payer has approved the potential liability of the first asset when the status blockchain has been verified as previously discussed. The new lowered risk level along the lifecycle is indicated in FIG. 9M.

The sixth step further includes the computing entity 21 generating an updated first smart contract to indicate the availability of the first contingent asset to include the updated first available terms and a non-contingent status (e.g., to include the re-pricing information). The sixth step further includes the computing entity 21 causing modification of the non-fungible token to represent the updated first smart contract in the object distributed ledger and/or updating of the blockchain record.

The updating of the blockchain record associated with the first contingent asset includes one or more of changing a status from contingent to non-contingent, determining an updated price (e.g., raising the price when the asset is unsold and the payer has approved a subsequent payout), and generating the first noncontingent asset blockchain record 302 to include the updated record. Alternatively, or in addition to, the asset module 30 further publishes the updated record by sending the first noncontingent asset blockchain record 302 to the computing entities 23-1 through 23-N when the first asset has not been sold and the computing entities 23-1 through 23-N are associated with potential buyers of the first contingent asset.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 10A-10F are schematic block diagrams of another embodiment of a computing system and a contingent asset risk chart illustrating an example of updating a listing for a contingent asset for sale utilizing a blockchain record. The computing system includes the computing entity 20-1 of FIG. 1, the computing entity 21 of FIG. 1, computing entities 23-1 through 23-N of FIG. 1, and the computing entity 25-1 of FIG. 1.

Figures 10A, 10B:
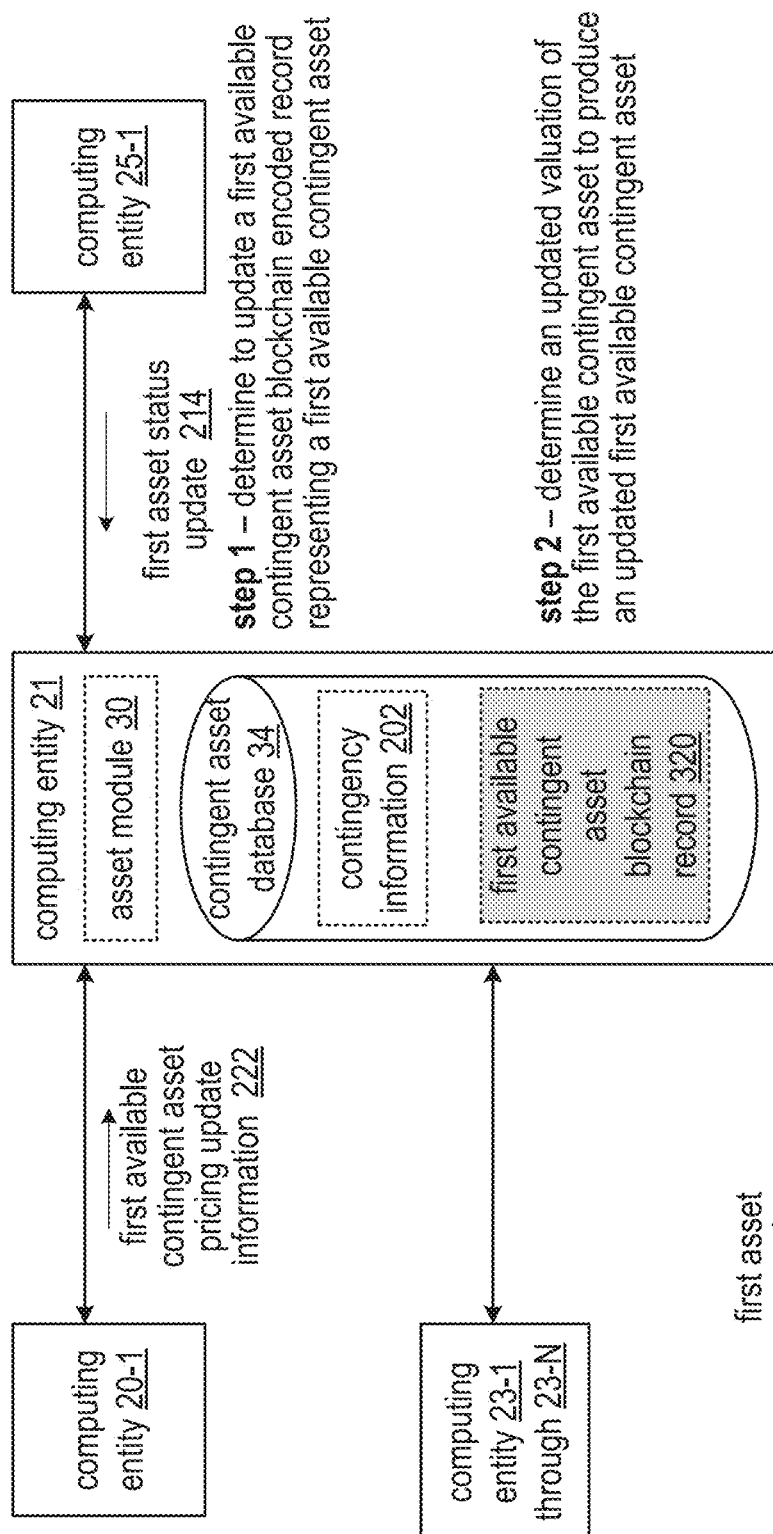
FIGS. 10A-10F are schematic block diagrams of another embodiment of a computing system and a contingent asset risk chart illustrating an example of updating a listing for a contingent asset for sale utilizing a blockchain record in accordance with the present invention.

FIG. 10A illustrates an example method of operation of the updating of the listing of the contingent asset for sale utilizing the blockchain record where a first step includes the computing entity 21 determining to update a first available contingent asset blockchain encoded record 320 representing the first available contingent asset of a multitude of available contingent assets. The first available contingent asset assigns a potential first liability of a first payer to a first seller associated with the first available contingent asset. At least a portion of the potential first liability is to be paid by the first payer to the first seller in accordance with contingency information 202 and subsequent to completion of a first asset lifecycle, as illustrated in FIG. 10B, of the first available contingent asset.

The determining to update the first available contingent asset blockchain encoded record includes a variety of approaches. A first approach includes the asset module 30 detecting that an update time frame has elapsed. A second approach includes the asset module 30 interpreting a first asset status update 214 from the computing entity 25-1 (e.g., from the payer). In an embodiment, the first asset status update to 14 includes a status blockchain. A third approach includes the asset module 30 interpreting first available contingent asset pricing update information 222 from the computing entity 20-1 (e.g., from the seller). For instance, the seller requests a higher asking price and more time to sell the first asset.

A fourth approach includes the asset module 30 detecting that value has changed on a pool of related assets. A fifth approach includes the asset module 30 determining that a price change for the first asset is required to hit a desired rate of return. A sixth approach includes the asset module 30 detecting that bids for the first asset are over the asking price by more than a maximum overage threshold level (e.g., suggesting the first asset has been underpriced).

Having determined to update the first available contingent asset blockchain encoded record, a second step of the example method of operation of the updating of the listing of a contingent asset for sale utilizing the blockchain record includes the computing entity 21 determining an updated valuation of the first available contingent asset as depicted at t2 on the risk chart of FIG. 10B to produce an updated first available contingent asset. The determining includes the asset module 30 reassessing the risk associated with the first asset and recalculating the value of the first available contingent asset based on one or more of a new estimate of the probability of payer approval, an updated expected payment, updated expected payment timing, an updated expected rate of return, recent bid prices for the first asset, and recent bid-ask spreads for other pools of similar assets.

Figure 10C:
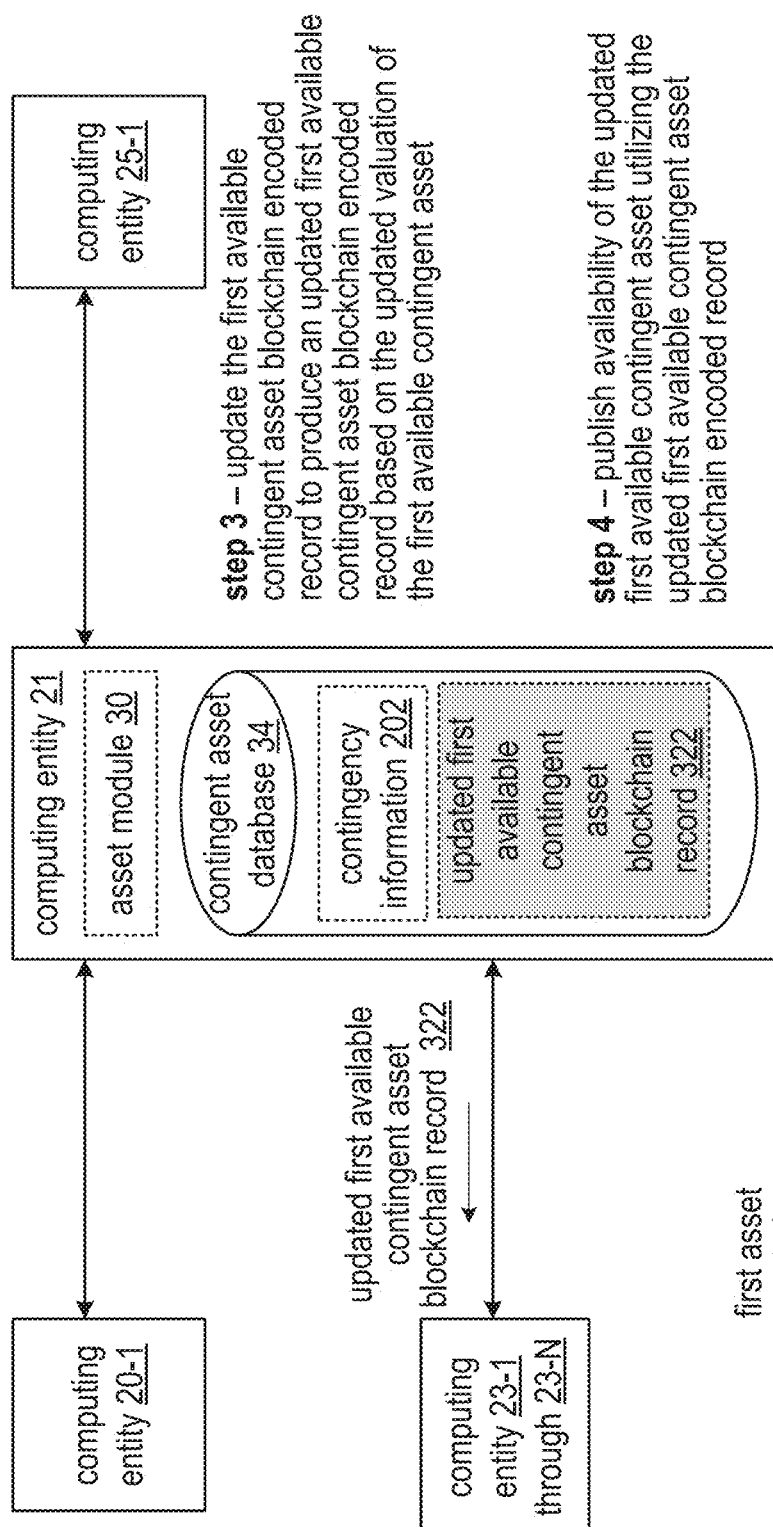

FIG. 10C further illustrates the example method of operation of the updating of the listing of the contingent asset for sale utilizing the blockchain record where, having determined the updated valuation of the first available contingent asset, the computing entity 21 updates the first available contingent asset to produce an updated first available contingent asset blockchain record 322 based on the updated valuation of the first available contingent asset. For example, the asset module 30 updates the blockchain record, as discussed with reference to FIG. 9G, of the first available contingent asset to produce the updated first available contingent asset blockchain record 322 utilizing the updated valuation. Alternatively, or in addition to, the asset module 30 updates aspects of the contingency information 202 as a function of the updated valuation.

Figure 10D:
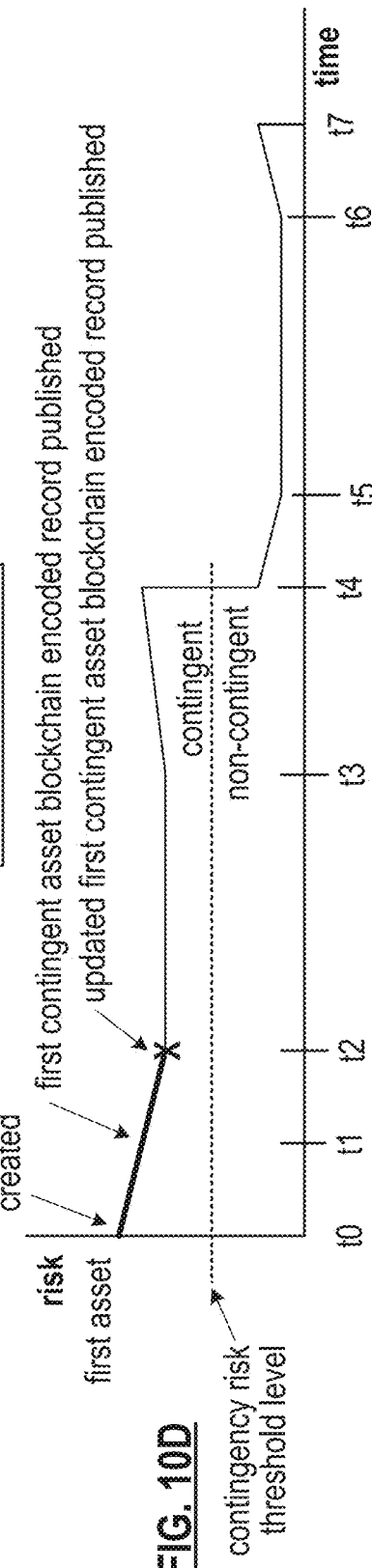

Having updated the first available contingent asset blockchain encoded record, a fourth step of the example method of operation of the updating of the listing of the contingent asset for sale utilizing the blockchain record includes the computing entity 21 publishing availability of the updated first available contingent asset to a plurality of other computing entities 23-1 through 23-N (e.g., to buyers) as illustrated in FIG. 10D utilizing the updated first available contingent asset blockchain record 322. The publishing includes the asset module 30 performing one or more of generating an exchange listing utilizing that includes the updated first available contingent asset blockchain record 322, posting the exchange listing on an exchange, and sending the updated first available contingent asset blockchain record 322 to a plurality of other computing entities (e.g., to the computing entities 23-1 through 23-N).

Figure 10E:
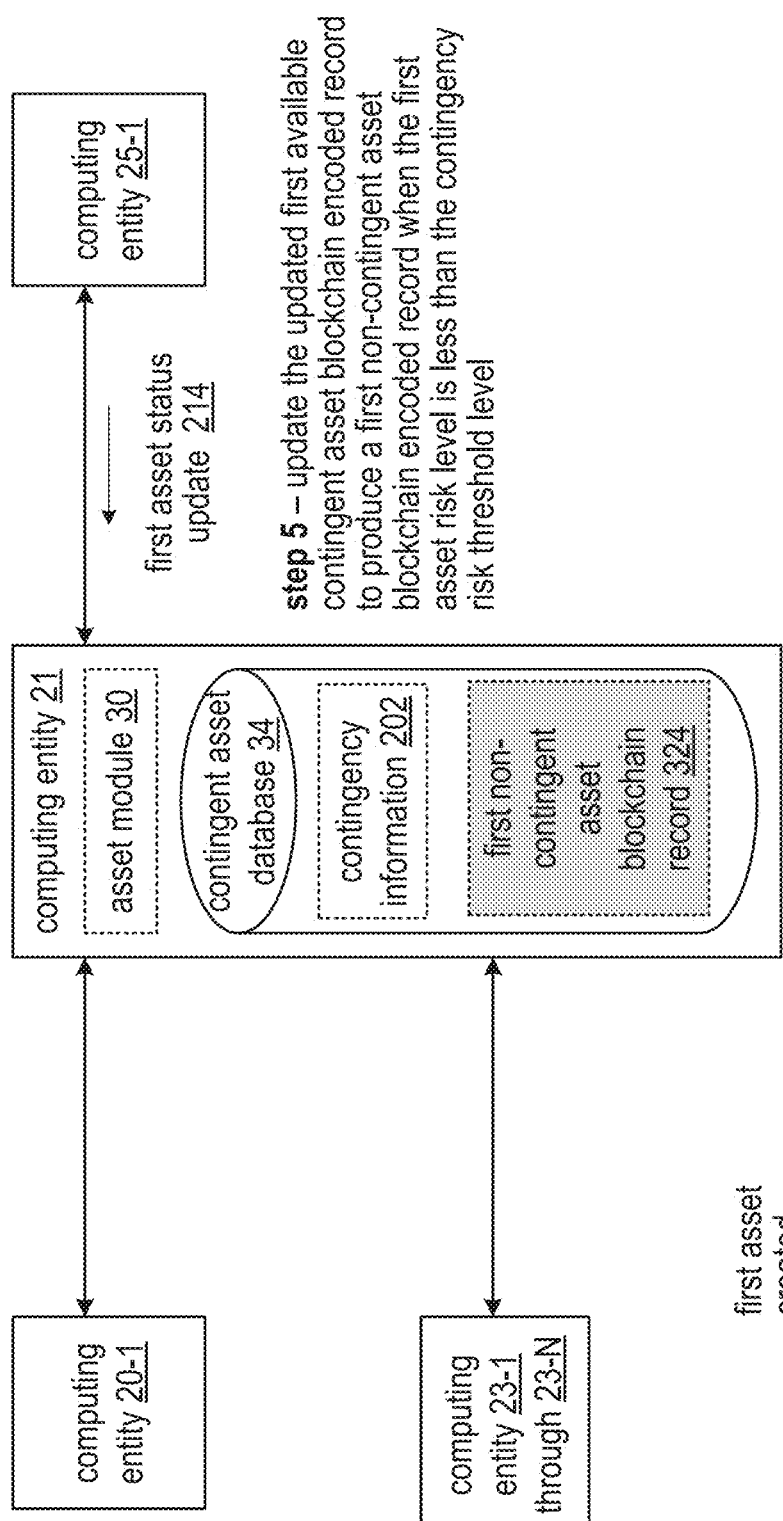
Figure 10F:
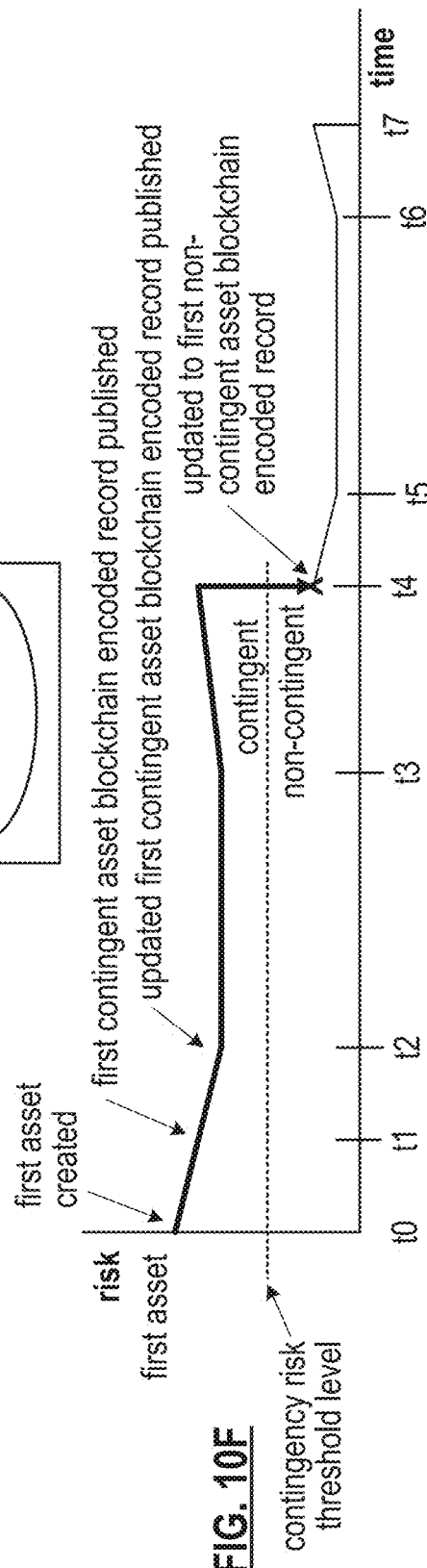

FIG. 10E further illustrates the example method of operation of the updating of the listing of the contingent asset for sale utilizing the blockchain record where, having published the availability of the updated first available contingent asset, the computing entity 21 updates the updated first available contingent asset blockchain record to produce a first non-contingent asset blockchain record 324 when a first asset risk level of the updated first available contingent asset is less than a contingency risk threshold level. The transitioning to the non-contingent status provides desired certainty for parties associated with ownership of the first asset during and later portion of first asset lifecycle as illustrated in FIG. 10F.

The updating of the updated first available contingent asset to produce the first non-contingent asset blockchain record 324 by the computing entity 21 includes a series of sub-steps. In a first sub-step the asset module 30 obtains status of the first asset (e.g., interpret a first asset status update 214 from the computing entity 25-1). In a second sub-step the asset module 30 reassesses risk information of the contingency information 202 to produce an updated probability of the payer paying the payout at the end of the asset lifecycle even when the payer has approved the payment. A third sub-step includes the asset module 30 modifying status of the blockchain record, as discussed with reference to FIG. 9G, of the first asset to indicate the non-contingent status. A fourth sub-step includes the asset module 30 repricing the first asset when the first asset is still for sale (e.g., at least the portion of the first asset is still for sale during the asset lifecycle). A fifth sub-step includes the asset module 30 publishing a first noncontingent asset blockchain record 302 (e.g., to the computing entities 23-1 through 23-N) when the first asset is still available for sale.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 11A-11H are schematic block diagrams of another embodiment of a computing system and a contingent asset risk chart illustrating an example of executing a sale of a contingent asset to a buyer from a seller utilizing a blockchain record. The computing system includes the computing entity 20-1 of FIG. 1, the computing entity 21 of FIG. 1, computing entities 23-1 through 23-N of FIG. 1, and the computing entity 25-1 of FIG. 1.

Figure 11A:
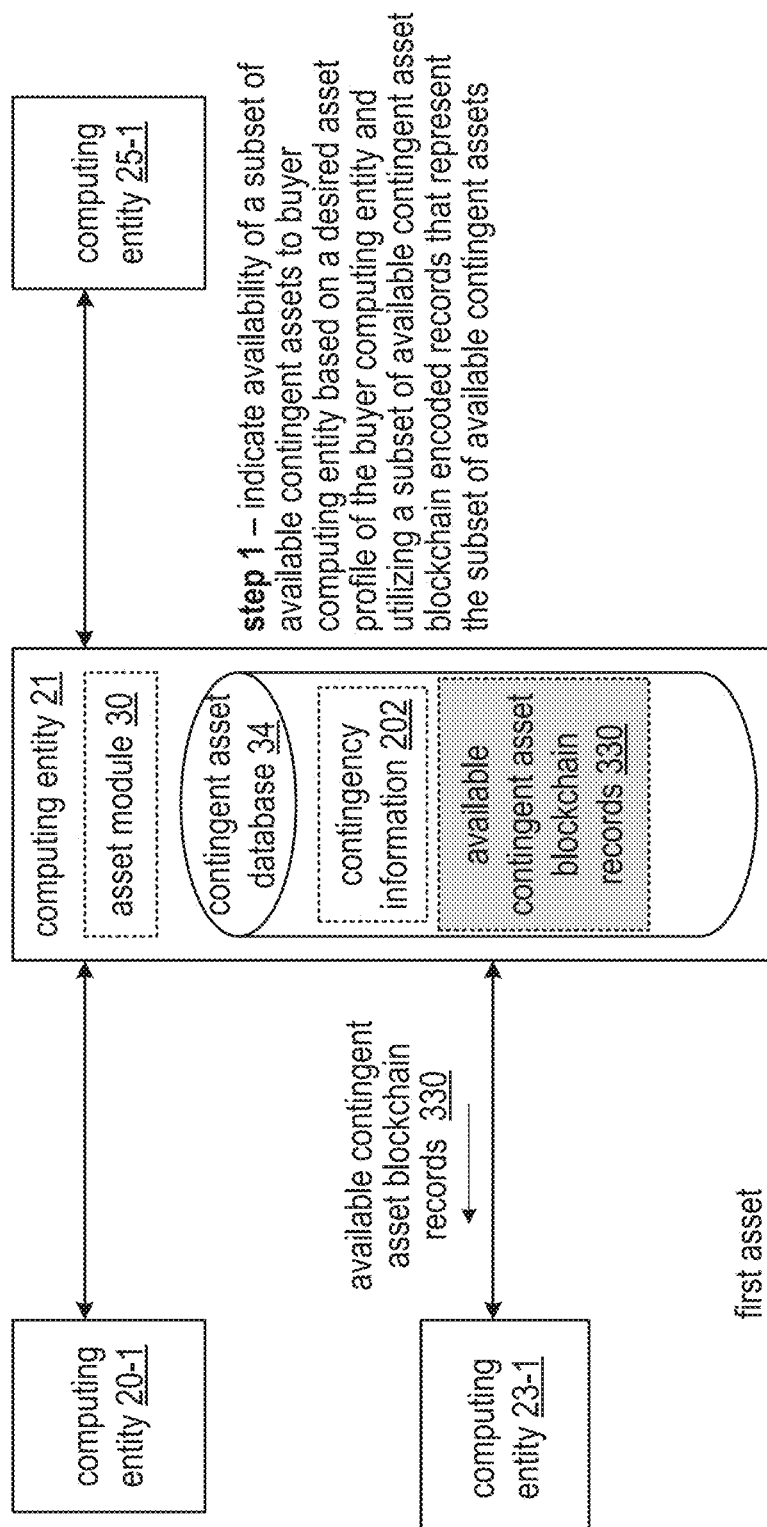
Figure 11B:
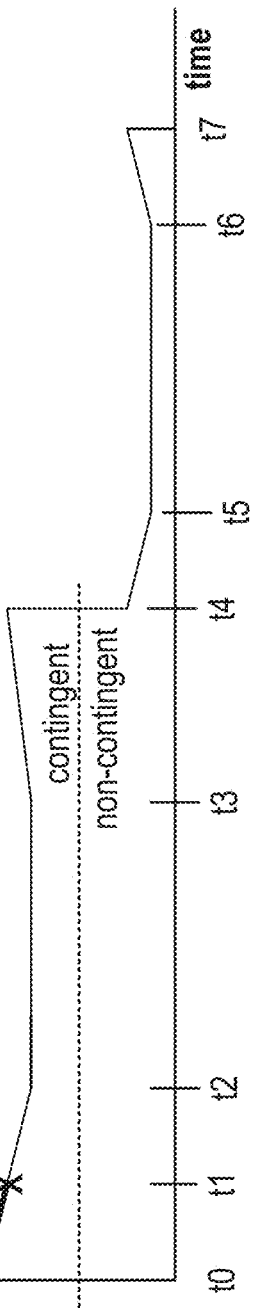

FIG. 11A illustrates an example method of operation of the executing of the sale of the contingent asset to the buyer from the seller utilizing the blockchain record, where a first step includes the computing entity 21 indicating availability of a subset of available contingent assets of a multitude of available contingent assets to the computing entity 23-1 at t1 of the risk chart for the asset lifecycle in FIG. 11B, based on a desired asset profile of the computing entity 23-1 and utilizing a subset of available contingent asset blockchain encoded records that represent the subset of available contingent assets. A first available contingent asset of the subset of available contingent assets assigns a potential first liability of a first payer to a first seller associated with the first available contingent asset. At least a portion of the potential first liability is to be paid by the first payer to the first seller in accordance with contingency information and subsequent to completion of a first asset lifecycle of the first available contingent asset.

The indicating availability of the subset of available contingent assets includes a series of sub steps. A first sub-step includes the asset module 30 identifying assets desired by the computing entity 23-1 (e.g., the buyer) as the subset of available contingent assets. For example, the asset module 30 compares the desired asset profile of the computing entity 23-1 to assets of available contingent asset information 242 to select those assets that substantially satisfy the desired asset profile. A second sub-step includes the asset module 30 generating available contingent asset blockchain records 330 utilizing the selected assets (e.g., recovering individual blockchain records for each of the subset of available contingent assets from the contingent asset database 34). A third sub-step includes the asset module 30 sending the available contingent asset blockchain records 330 to the computing entity 23-1. Alternatively, or in addition to, the asset module 30 publishes the available contingent asset blockchain records 330 on an exchange and/or sends the available contingent asset blockchain records 330 to other computing entities associated with even more buyers.

Figure 11C:
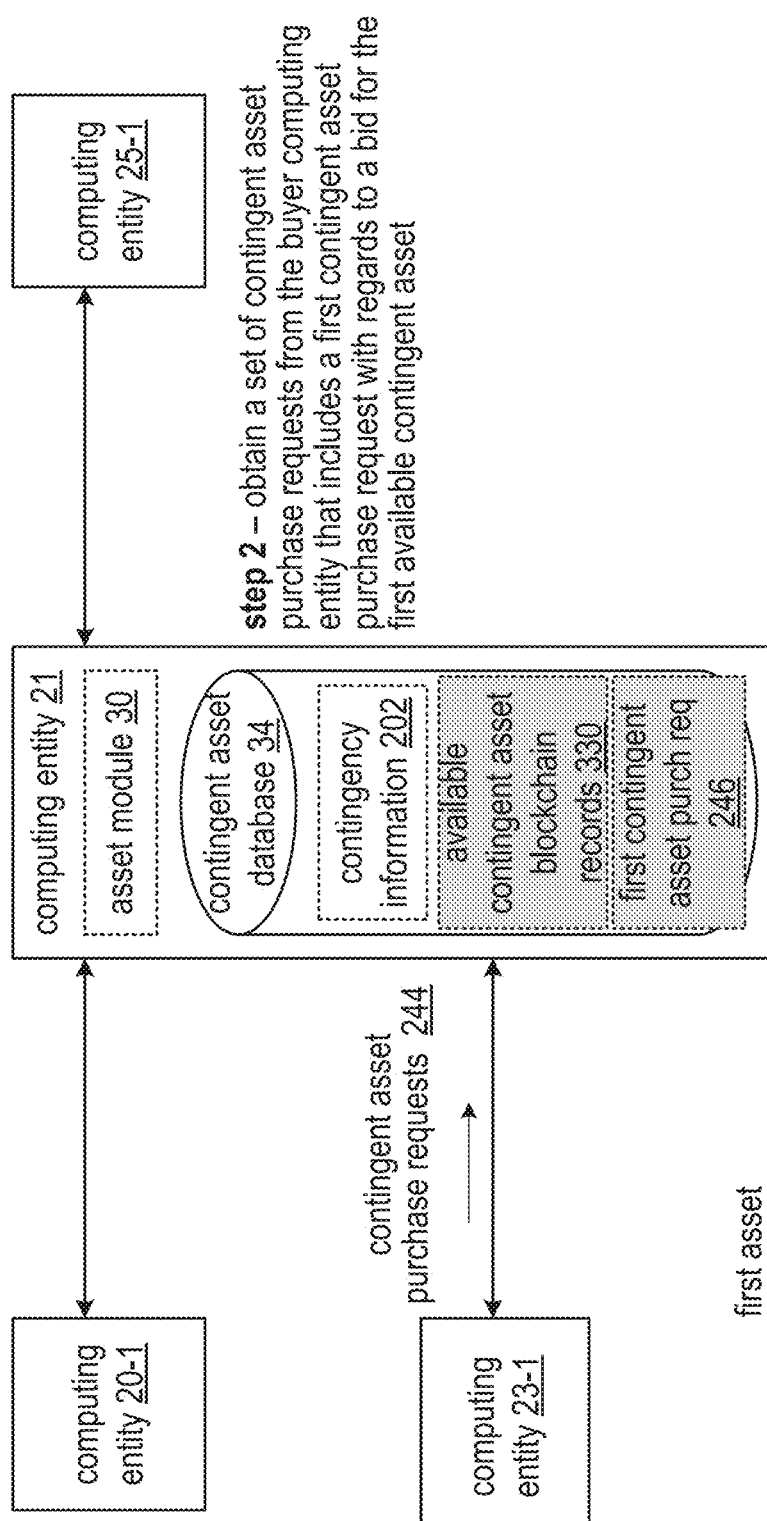
Figure 11D:
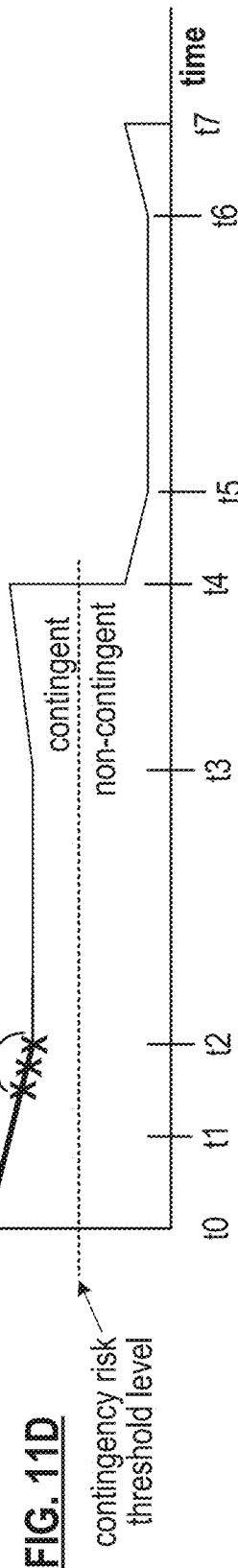

FIG. 11C further illustrates the example method of operation of the executing of the sale of the contingent asset to the buyer from the seller utilizing the blockchain record, where, having indicated the availability of the subset of available contingent assets using the available contingent asset blockchain records 330 to the buyer computing entity, in a second step the computing entity 21 obtains a set of contingent asset purchase requests 244 from the computing entity 23-1 (e.g., the buyer). The set of contingent asset purchase requests 244 includes a first contingent asset purchase request 246 with regards to a bid for the first available contingent asset. The set of contingent asset purchase requests are generated within a purchase timeframe as illustrated near t2 of the timeline of the risk chart of the first asset lifecycle of FIG. 11D.

The first contingent asset purchase request 246 includes one or more of the identifier (ID) of the first asset, an identifier for a corresponding blockchain record, a buyer ID, a bid price for the first asset, a bid price range as a function of one or more conditions (e.g., higher and of the range when risk of the first asset is lower), and settlement information (e.g., an account to debit upon purchase, a credit instrument to utilize for payment, payment timing, etc.). In an embodiment, the contingent asset purchase request 244 includes modified blockchain records for corresponding contingent assets (e.g., to include purchase request content). The conditions of the bid price range include risk, a blockchain record verification requirement (e.g., bid only valid when a corresponding blockchain record can be verified), number of similar assets currently available for sale, number of similar assets currently held by the buyer, number of similar assets associated with the payer that still have an active lifecycle, or any other condition that can reasonably affect pricing to create an efficient market.

The obtaining of the set of contingent asset purchase requests 244 by the computing entity 21 includes a variety of approaches. A first approach includes the asset module 30 issuing a request for a bid message to the computing entity 23-1 (e.g., that includes an indication that assets of the subset of available contingent asset includes assets that substantially satisfies the desired asset profile of the buyer of the computing entity 23-1). A second approach includes the asset module 30 receiving the set of contingent asset purchase request 244 from the computing entity 23-1.

A third approach includes the asset module 30 determining an auto-order outcome based on the desired asset profile of the buyer computing entity. For example, the asset module 30 interprets the desired asset profile to identify the assets to include in auto-generating the contingent asset purchase requests 244 on behalf of the buyer computing entity. A fourth approach includes the asset module receiving one or more contingent asset purchase requests from one or more other computing entities.

Figure 11E:
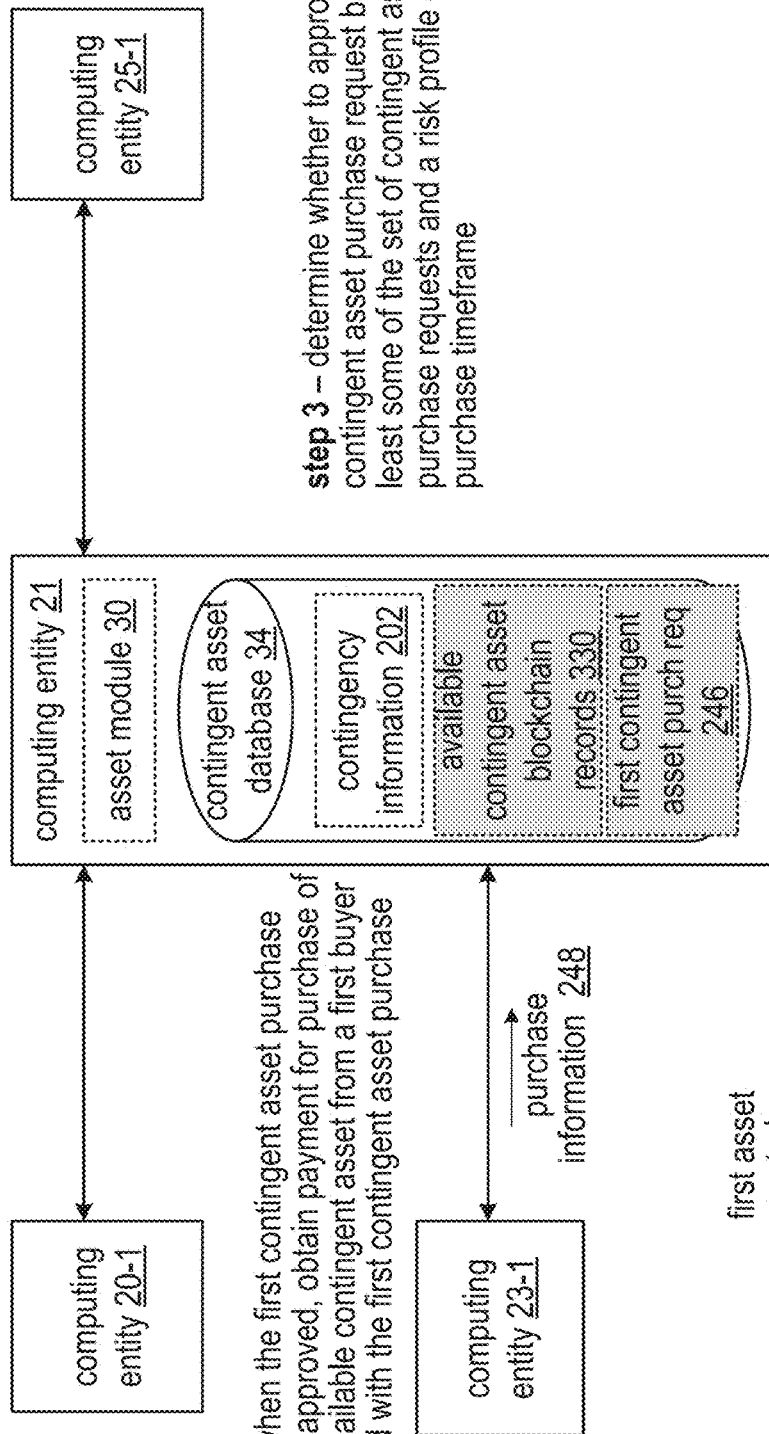
Figure 11F:
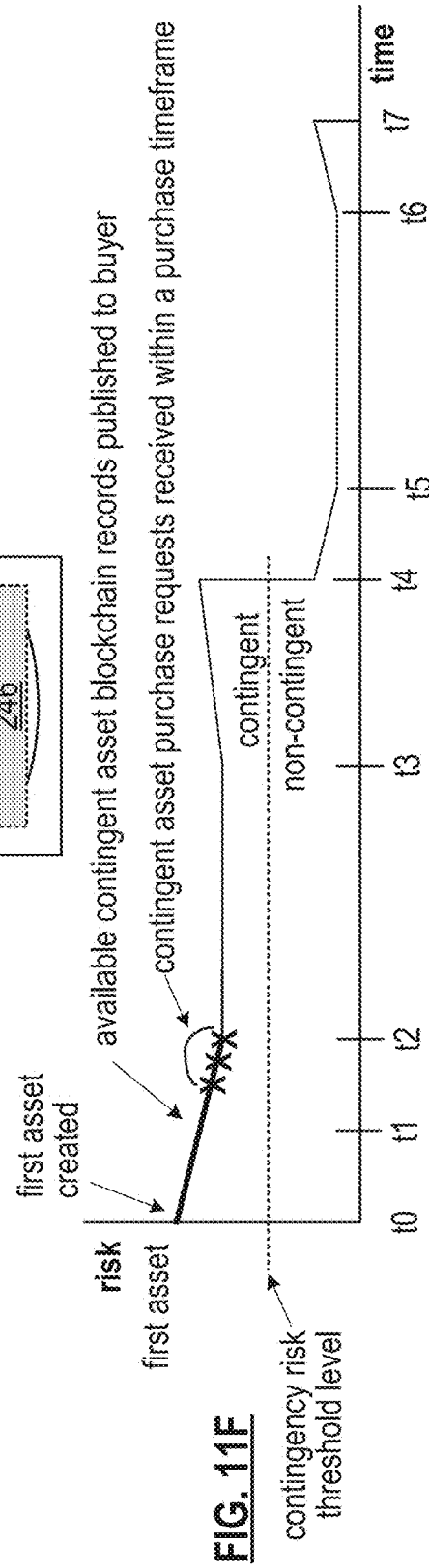

FIG. 11E further illustrates the example method of operation of the executing of the sale of the contingent asset to the buyer from the seller utilizing the blockchain record, where, having obtained the set of contingent asset purchase requests from the buyer computing entity, a third step includes the computing entity 21 determining whether to approve the first contingent asset purchase request 246 based on at least some of the set of contingent asset purchase requests and a risk profile during the purchase timeframe after t2 of the risk chart for the asset lifecycle of FIG. 11F. The asset module 30 determines whether to approve the first contingent asset purchase request 246 based on one or more of verification of a blockchain record associated with the first contingent asset purchase request, face value of the first asset, a listed price by the seller, a minimum acceptable bid price set by the seller, and a bid price from the buyer, a history of bid-ask spreads. The approval determination is further based on one or more of other bid acceptances of the set of contingent asset purchase requests, a risk profile associated with the buyer, the risk level of the asset, an assessment to the impact of the buyer's portfolio, and an assessment of the impact to the available contingent assets.

As an example of the determining whether to approve the first contingent asset purchase request 246, the asset module 30 indicates approval when the risk level of the asset is below a maximum desired asset risk level in the blockchain record has been verified, the risk profile associated with the buyer is below a buyer maximum risk threshold level, and the bid price from the buyer is greater than the minimum acceptable bid price set by the seller. As another example, the asset module 30 indicates disapproval when the risk level of the buyer is greater than the buyer maximum risk threshold level and/or when the blockchain record does not verify. As yet another example, the asset module indicates approval when the risk level of the buyer is greater than the buyer maximum risk threshold level and the bid price from the buyer is greater than the listed price by the seller by more than a minimum difference bid-ask spread level.

When the first contingent asset purchase request is approved, a fourth step of the example method of operation to execute the sale of the contingent asset to the buyer from the seller utilizing the blockchain record includes the computing entity 21 obtaining payment for purchase of the first available contingent asset from a first buyer associated with the first contingent asset purchase request 246. The obtaining of the payment for purchase includes a series of sub-steps. A first sub-step includes the asset module 30 determining an execution price based on the approval. The determining includes one or more of establishing a base selling price at the bid price and making an adjustment associated with risk and/or transaction fees.

A second sub-step includes the asset module 30 issuing a request for payment to the computing entity 23-1, where the request for payment includes the execution price within the blockchain record for the first asset. A third sub-step includes the asset module 30 receiving purchase information 248 from the computing entity 23-1, where the purchase information 248 includes an updated blockchain record including information to execute the sale including payment (e.g., including instructions such as immediate payment and/or deducting payment from an account associated with the buyer).

FIG. 11G further illustrates the example method of operation of the executing of the sale of the contingent asset to the buyer from the seller utilizing the blockchain record, where, having obtained the payment for the purchase of the first available contingent asset, a fifth step includes the computing entity 21 facilitating seller payment utilizing the payment for purchase of the first available contingent asset to complete the purchase as illustrated in the risk chart of the asset timeline of FIG. 11H. The facilitating includes the asset module 30 determining a seller payment amount from the payment for purchase and based on the contingency information 202 (e.g., recourse, fees, etc.). The facilitating further includes the asset module 30 issuing a first available contingent asset payment 250 to the computing entity 20-1 to satisfy payment to the seller. In an embodiment, the first available contingent asset payment 250 includes the blockchain record associated with the first asset to provide payment. Alternatively or in addition to, the asset module 30 updates a seller account with a credit for the seller payment amount.

Having facilitated the seller payment, a sixth step of the example method of operation of the executing of the sale of a contingent asset to the buyer from the seller utilizing the blockchain record includes the computing entity 21 updating the first available contingent asset blockchain encoded record of the subset of available contingent asset blockchain encoded records that corresponds to the first available contingent asset to indicate reassignment the potential first liability of the first available contingent asset from the first seller to an entity associated with the first buyer of the first contingent asset purchase request. For example, the asset module 30 updates the first available contingent asset blockchain record 332 as illustrated in FIG. 9G within the contingent asset database 34 to associate an identifier of the buyer with the first contingent asset. Alternatively, or in addition to, a risk level associated with the buyer is updated within the blockchain record based on the buyer now holding the first contingent asset.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 12A-12D are schematic block diagrams of another embodiment of a computing system and a contingent asset risk chart illustrating an example of facilitating payment from a payer to a buyer for a contingent asset utilizing a blockchain record. The computing system includes the computing entity 20-1 of FIG. 1, the computing entity 21 of FIG. 1, computing entities 23-1 through 23-N of FIG. 1, and the computing entity 25-1 of FIG. 1.

Figure 12A:
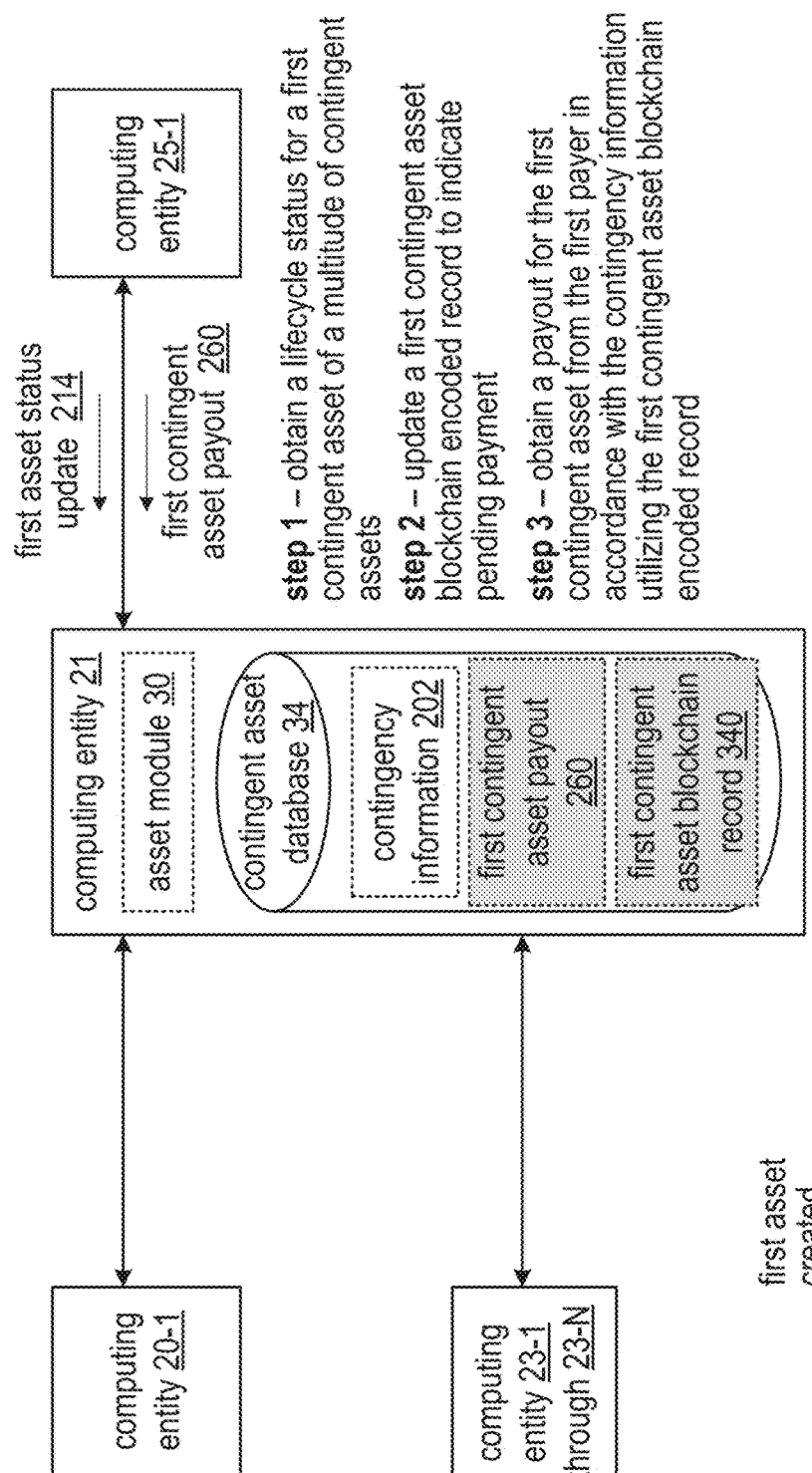
Figure 12B:
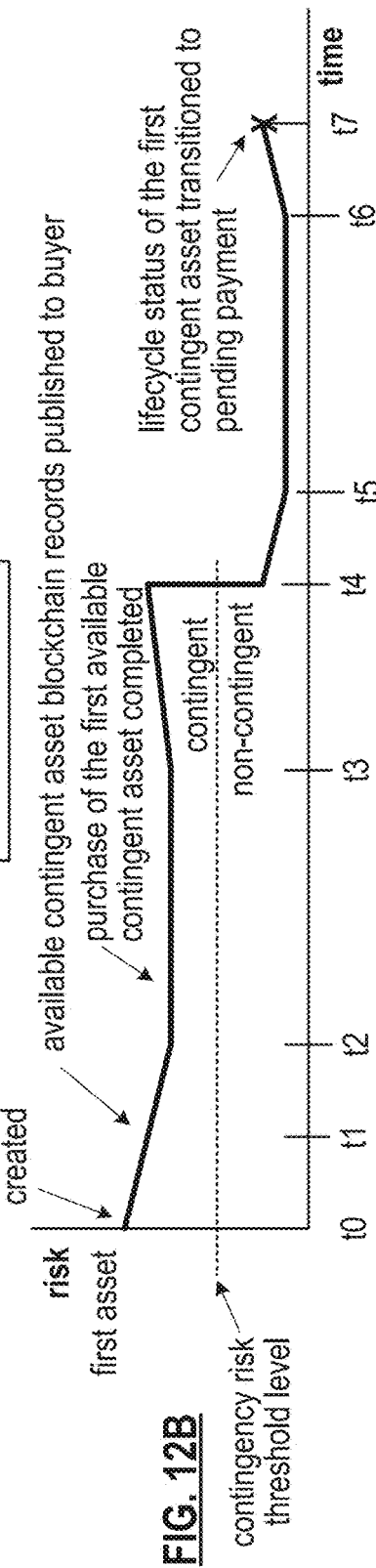

FIG. 12A illustrates an example method of operation of the facilitating payment from the payer to the buyer for the contingent asset utilizing the blockchain record, where a first step includes the computing entity 21 obtaining a lifecycle status for a first contingent asset of a multitude of contingent assets. The first contingent asset assigns a potential first liability of a first payer to an owner entity associated with the first contingent asset. At least a portion of the potential first liability is to be paid by the first payer to the owner entity in accordance with contingency information and subsequent to completion of a first asset lifecycle of the first contingent asset as illustrated in FIG. 12B. The lifecycle status includes pending approval, approval for payment (e.g., pending payment at t7 of FIG. 12B), and rejected.

The obtaining of the lifecycle status for the first contingent asset includes a variety of approaches. A first approach includes the asset module 30 detecting a change in a risk level associated with the first contingent asset. A second approach includes the asset module 30 detecting that a transition time frame has elapsed. A third approach includes the asset module 30 receiving a request for an updated status. A fourth approach includes the asset module 30 issuing a status update request to the computing entity 25-1 (e.g., the payer). A fifth approach includes the asset module 30 interpreting a first asset status update 214 from the computing entity 25-1. In an embodiment the first asset status update to 14 includes a blockchain record associated with the first contingent asset.

Having obtained the lifecycle status for the first contingent asset, when the lifecycle status of the first contingent asset has transitioned to pending payment, a second step of the example method of operation to facilitate payment from the payer to the buyer of the contingent asset utilizing the blockchain record includes the computing entity 21 updating a first contingent asset blockchain encoded record 340 to indicate the lifecycle status of the first contingent asset has transitioned to pending payment. The updating includes the asset module 30 modifying the content of the blockchain record as discussed in FIG. 9G.

Having updated the first contingent asset blockchain encoded record 340, a third step of the example method of operation to facilitate payment from the payer to the buyer of the contingent asset utilizing the blockchain record includes the computing entity 21 obtaining a payout for the first contingent asset from the first payer in accordance with the contingency information 202 an utilizing the first contingent asset blockchain encoded record 340. The obtaining of the payout includes a series of sub-steps. A first sub-step includes the asset module 30 determining an expected payout based on the contingency information 202 and payout information of content of the first contingent asset blockchain record 340. For example, the asset module 30 determines the expected payout to be a committed payout level from the computing entity 25-1.

A second sub-step includes the asset module 30 issuing a payout request to the computing entity 25-1 of the payer, where the asset module 30 modifies the first contingent asset blockchain record 340 to include the expected payout and includes the first contingent asset blockchain record 340 in the payout request. A third sub-step includes the asset module 30 receiving a first contingent asset payout 260 from the computing entity 25-1. In an embodiment, the first contingent asset payout 260 includes a further updated first contingent asset blockchain record that includes payout information. Alternatively, or in addition to, the first contingent asset payout 260 is included in a batch payment from the computing entity 25-1 for a multitude of asset payouts, where a multitude of contingent asset blockchain records include a multitude of payouts.

FIG. 12C further illustrates the example method of operation of the facilitating payment from the payer to the buyer for the contingent asset utilizing the blockchain record, where, when the lifecycle status of the first contingent asset has transitioned to pending payment as illustrated at t7 in FIG. 12D, and having obtained the payout for the first contingent asset from the first payer, a fourth step includes the computing entity 21 determining a payoff for the owner entity based on the payout and the contingency information 202. For example, when the payout is less than a face value, the asset module 30 calculates the payoff to be the payout minus any fees (e.g., a transaction fee). As another example, when the payout is greater than the face value, the asset module 30 calculates the payoff to be the payout minus the fees and further disposes of an overage (e.g., a difference between the payout and the face value) in accordance with the contingency information 202 (e.g., transfer funds to an account associated with an exchange, credit the buyer for a portion of a future purchase, credit the seller for repurchase of a future sale).

Having determined the payoff for the owner entity, a fifth step of the example method of operation of the facilitating payment from the payer to the buyer utilizing the blockchain record includes the computing entity 21 facilitating payment of the payoff to the owner entity. For example, the asset module 30 generates a payment message 262 that includes payment information in accordance with the first contingent asset payout 260. In an embodiment, the asset module 30 generates the payment message 262 to include the first contingent asset blockchain record 340, where the first contingent asset blockchain record 340 includes the payment information. The asset module 30 sends the payment message 262 to the computing entity 23-1 associated with the owner entity. Alternatively, or in addition to, the asset module 30 credits an account associated with the owner entity for the amount of the payoff.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 13A-13F are schematic block diagrams of another embodiment of a computing system and a contingent asset risk chart illustrating an example of updating a listing for a contingent asset for sale utilizing a split blockchain record. The computing system includes the computing entity 20-1 of FIG. 1, the computing entity 21 of FIG. 1, computing entities 23-1 through 23-N of FIG. 1, and the computing entity 25-1 of FIG. 1.

A split blockchain record enables ownership and transfer of ownership transactions to occur for two or more portions (e.g., sub-assets) of a common contingent asset throughout the lifecycle of the contingent asset. For example, a split blockchain record supports two ownership entities. As another example, another split blockchain record supports 1,000 ownership entities of the common contingent asset.

A split blockchain record includes several approaches. A first approach includes utilizing one blockchain record for a corresponding contingent asset, where different content portions of the blockchain record correspond to the different ownership entities. A second approach includes generating a separate new blockchain record for each ownership entity to accompany the original blockchain record for the contingent asset, where content of all of the blockchain records includes references to all other blockchain records associated with the original blockchain record. A third approach includes replacing the original blockchain record with a separate new blockchain record for each ownership entity, where content from the original blockchain record is transferred to each of the separate new blockchain records. A fourth approach includes utilizing the original blockchain record for a first ownership entity and creating a separate new blockchain record for each ownership entity beyond the first ownership entity of a multitude of ownership entities. As is further discussed below, use of the term split blockchain record may refer to any of the approaches.

FIG. 13A illustrates an example method of operation of the updating of the listing of the contingent asset for sale utilizing the split blockchain record where a first step includes the computing entity 21 determining to update a first available contingent asset blockchain encoded record set 400 corresponding to a set of first available contingent sub-assets of a first available contingent asset of a multitude of available contingent assets. The first available contingent asset assigns a potential first liability of a first payer to a first seller associated with the first available contingent asset. At least a portion of the potential first liability is to be paid by the first payer to the first seller in accordance with contingency information 202 and subsequent to completion of a first asset lifecycle, as illustrated in FIG. 13B, of the first available contingent asset. Each first available contingent asset blockchain encoded record of the first available contingent asset blockchain encoded record set 400 is mapped to a corresponding first available contingent sub-asset of the set of first available contingent sub-assets of the first available contingent asset.

The determining to update the first available contingent asset blockchain encoded record set 400 includes a variety of approaches. A first approach includes the asset module 30 detecting that an update time frame has elapsed. A second approach includes the asset module 30 interpreting a first asset status update 214 from the computing entity 25-1 (e.g., from the payer). In an embodiment, the first asset status update to 14 includes a status blockchain. A third approach includes the asset module 30 interpreting first available contingent asset pricing update information 222 from the computing entity 20-1 (e.g., from the seller). For instance, the seller requests a higher asking price for each sub-asset. As another instance, the seller requests that more sub-assets be created.

A fourth approach includes the asset module 30 detecting that value has changed on a pool of related assets. A fifth approach includes the asset module 30 determining that a price change for the first asset is required to hit a desired rate of return. A sixth approach includes the asset module 30 detecting that bids for a majority of the sub-assets are under corresponding asking prices by more than a maximum underage threshold level (e.g., suggesting the set of first available contingent sub-assets has been overpriced).

Having determined to update the first available contingent asset blockchain record set 400, a second step of the example method of operation of the updating of the listing of a contingent asset for sale utilizing the split blockchain record includes the computing entity 21 determining an updated valuation of each first available contingent sub-asset of the set of first available contingent sub-assets of the first available contingent asset to produce an updated set of first available contingent sub-assets and an updated first available contingent asset as depicted at t2 on the risk chart of FIG. 13B. The determining includes the asset module 30 reassessing the risk associated with the first asset and recalculating the value of each sub-asset based on one or more of a percentage of the sub-assets that have been sold, a new estimate of the probability of payer approval, an updated expected payment, updated expected payment timing, an updated expected rate of return, recent bid prices for the first asset, and recent bid-ask spreads for other pools of similar assets.

Figure 13C:
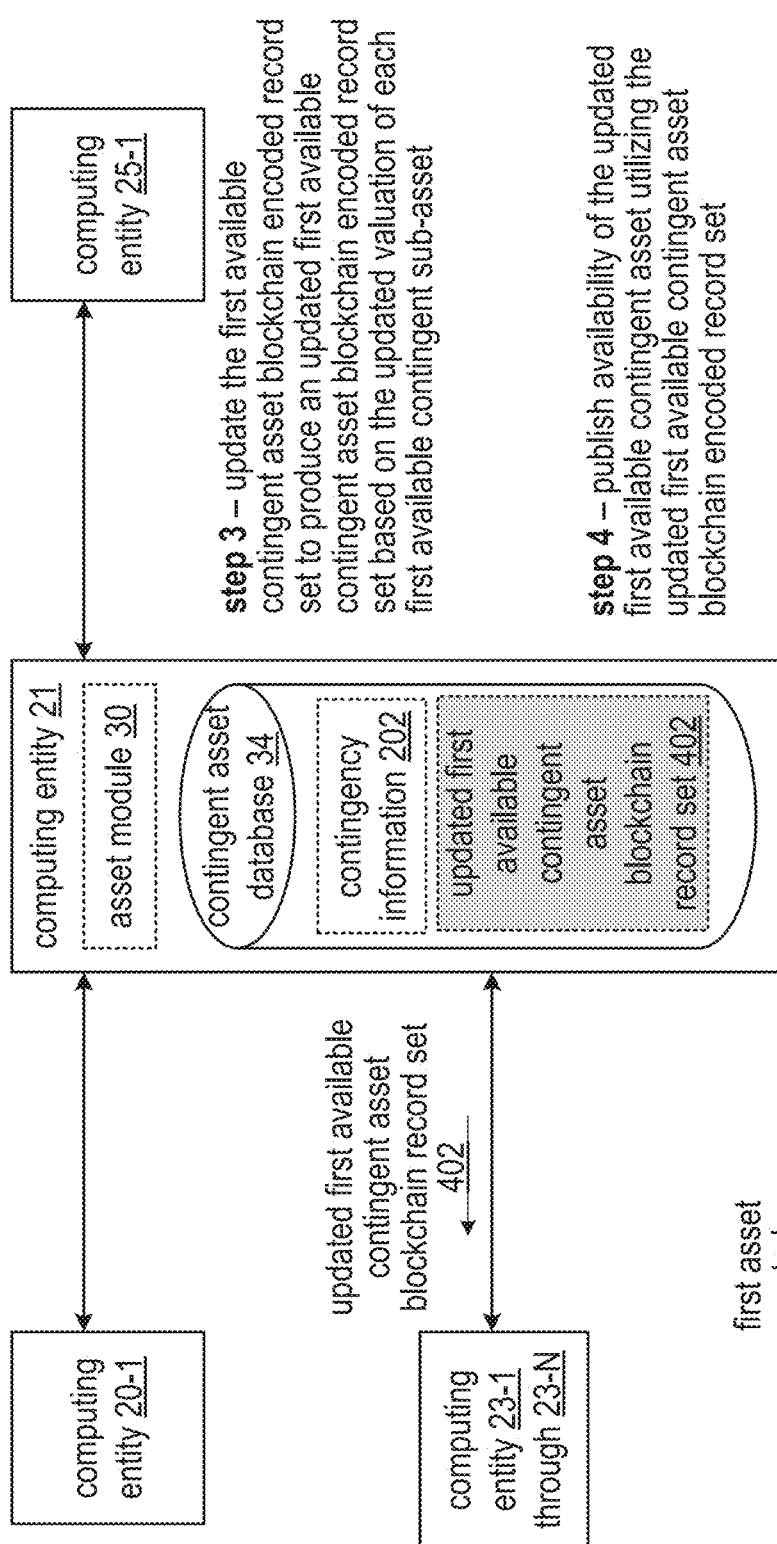

FIG. 13C further illustrates the example method of operation of the updating of the listing of the contingent asset for sale utilizing the split blockchain record where, having produced the updated set of first available contingent sub-assets and the updated first available contingent asset, a third step includes the computing entity 21 updating the first available contingent asset blockchain encoded record set to produce an updated first available contingent asset blockchain encoded record set 402 based on the updated valuation of each first available contingent sub-asset of the set of first available contingent sub-assets. For example, the asset module 30 updates the first available contingent asset blockchain record set 400, as discussed with reference to FIG. 9G, to modify content of each record to indicate the updated valuation of each first available contingent sub-asset. Alternatively, or in addition to, the asset module 30 updates aspects of the contingency information 202 as a function of the updated valuations.

Figure 13D:
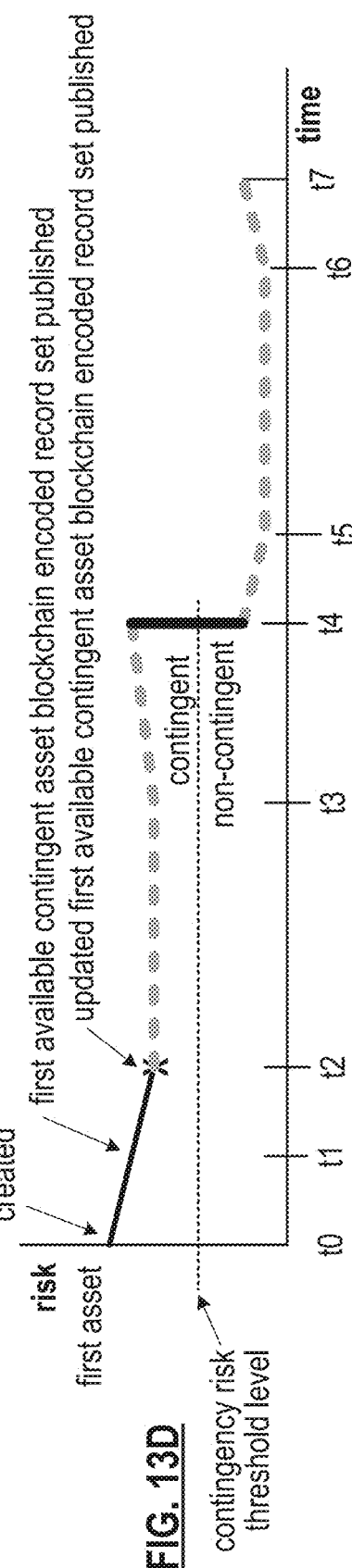

Having produced the updated first available contingent asset blockchain record set 402, a fourth step of the example method of operation of the updating of the listing of the contingent asset for sale utilizing the split blockchain record includes the computing entity 21 publishing availability of the updated first available contingent asset to a plurality of other computing entities 23-1 through 23-N (e.g., to buyers) as illustrated in FIG. 13D utilizing the updated first available contingent asset blockchain record set 402. The publishing includes the asset module 30 performing one or more of generating an exchange listing utilizing that includes the updated first available contingent asset blockchain record set 402, posting the exchange listing on an exchange, and sending the updated first available contingent asset blockchain record set 402 to a plurality of other computing entities (e.g., to the computing entities 23-1 through 23-N).

Figure 13E:
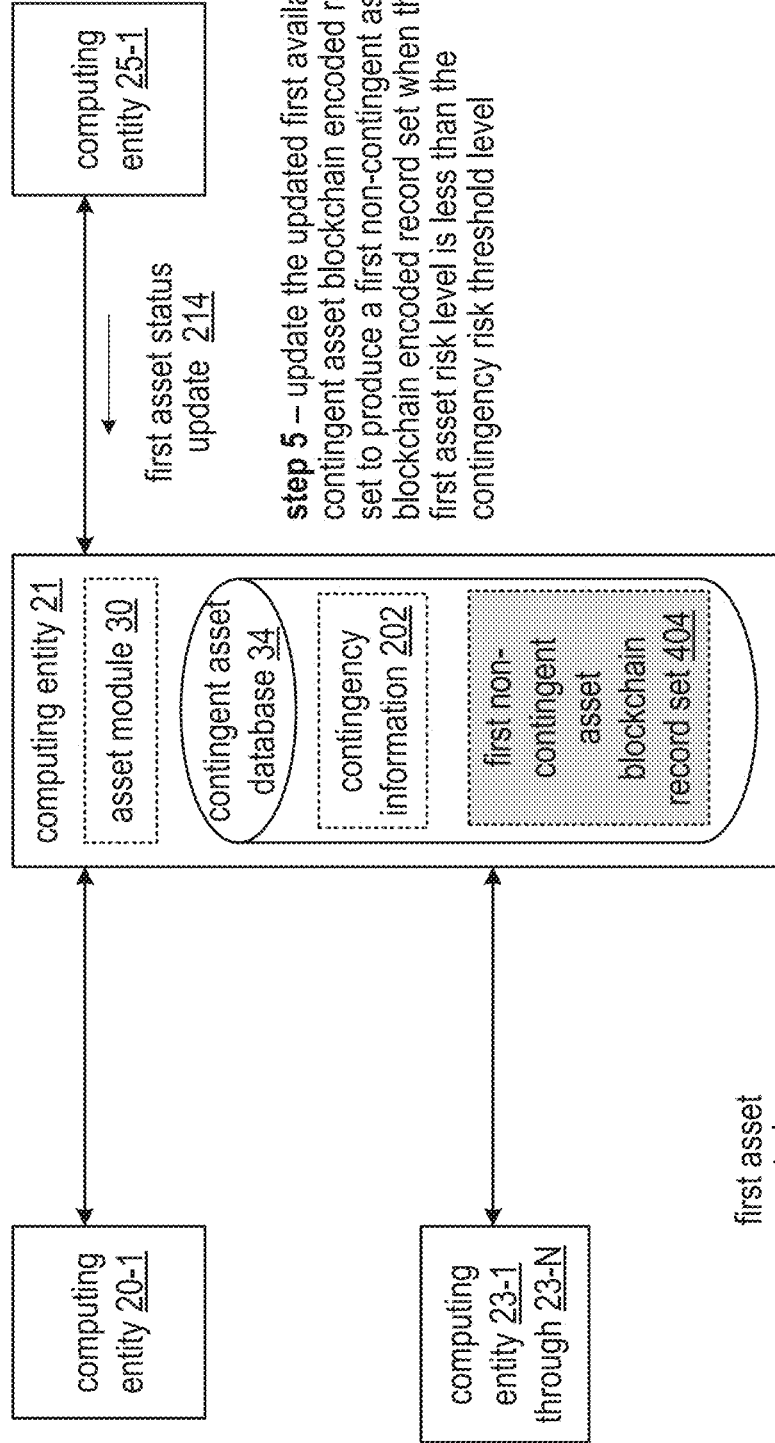
Figure 13F:
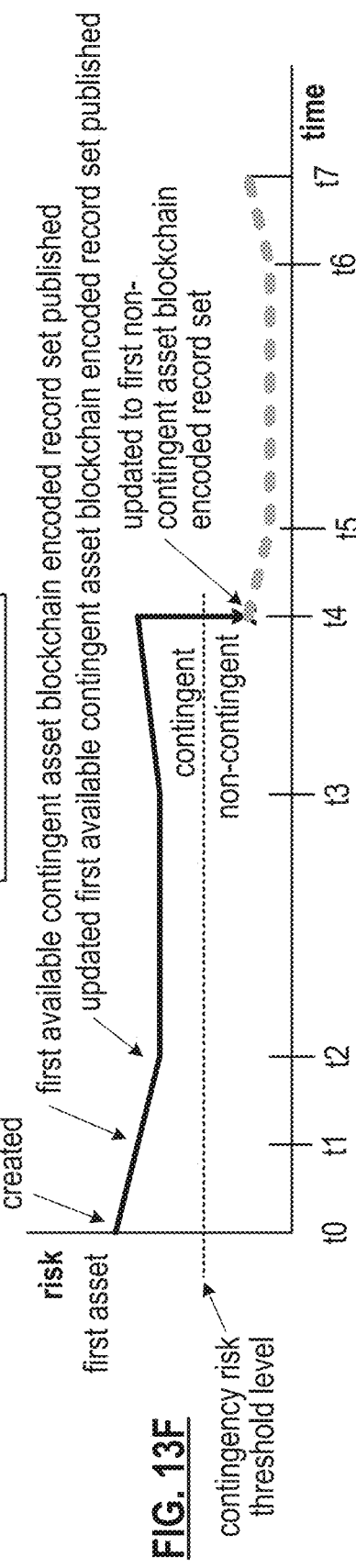

FIG. 13E further illustrates the example method of operation of the updating of the listing of the contingent asset for sale utilizing the split blockchain record where, having published the availability of the updated first available contingent asset, the computing entity 21 updates the updated first available contingent asset blockchain encoded record set to produce a first non-contingent asset blockchain encoded record set 404 when a first asset risk level of the updated first available contingent asset is less than a contingency risk threshold level. The transitioning to the non-contingent status provides desired certainty for parties associated with ownership of the portions of the first asset throughout the first asset lifecycle as illustrated in FIG. 13F.

The updating of the updated first available contingent asset to produce the first non-contingent asset blockchain record set 404 by the computing entity 21 includes a series of sub-steps. In a first sub-step the asset module 30 obtains status of the first asset (e.g., interpret a first asset status update 214 from the computing entity 25-1). In a second sub-step the asset module 30 reassesses risk information of the contingency information 202 to produce an updated probability of the payer paying the payout at the end of the asset lifecycle even when the payer has approved the payment. A third sub-step includes the asset module 30 modifying status of the blockchain record, as discussed with reference to FIG. 9G, of the first asset (e.g., and sub-assets) to indicate the non-contingent status. A fourth sub-step includes the asset module 30 repricing at least some of the sub-assets of the first asset when the first asset is still for sale (e.g., at least the portion of the first asset is still for sale during the asset lifecycle, setting a proportionally higher price for larger portions). A fifth sub-step includes the asset module 30 publishing the first non-contingent asset blockchain record set 404 (e.g., to the computing entities 23-1 through 23-N) when at least some of the first asset is still available for sale.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

FIGS. 14A-14H are schematic block diagrams of another embodiment of a computing system and a contingent asset risk chart illustrating an example of executing a sale of a portion of a contingent asset to a buyer from a seller utilizing a split blockchain record. The computing system includes the computing entity 20-1 of FIG. 1, the computing entity 21 of FIG. 1, computing entities 23-1 through 23-N of FIG. 1, and the computing entity 25-1 of FIG. 1.

FIG. 14A illustrates an example method of operation of the executing the sale of the portion of the contingent asset to the buyer from the seller utilizing the split blockchain record, where a first step includes the computing entity 21 indicates availability of a subset of available contingent assets of a multitude of available contingent assets to the computing entity 23-1 at tl of the risk chart for the asset lifecycle in FIG. 14B, based on a desired asset profile of the computing entity 23-1 and utilizing a plurality of available contingent asset blockchain encoded record sets 500 that represent the subset of available contingent assets. Each available contingent asset blockchain encoded record of a corresponding available contingent asset blockchain encoded record set is mapped to a corresponding available contingent sub-asset of an available contingent asset of the subset of available contingent assets.

A first available contingent asset of the subset of available contingent assets assigns a potential first liability of a first payer to a first seller associated with the first available contingent asset. At least a portion of the potential first liability is to be paid by the first payer to the first seller in accordance with contingency information and subsequent to completion of a first asset lifecycle of the first available contingent asset. Each first available contingent asset blockchain encoded record of a first available contingent asset blockchain encoded record set is mapped to a corresponding first available contingent sub-asset of a set of first available contingent sub-assets of a first available contingent asset.

The indicating availability of the subset of available contingent assets includes a series of sub-steps. A first sub-step includes the asset module 30 identifying assets desired by the computing entity 23-1 (e.g., the buyer) as the subset of available contingent assets. For example, the asset module 30 compares the desired asset profile of the computing entity 23-1 to assets of the available contingent asset blockchain record sets 500 and/or of assets listed in the contingent asset database 34 to select those assets that substantially satisfy the desired asset profile. A second sub-step includes the asset module 30 generating the available contingent asset blockchain record sets 500 utilizing the selected assets (e.g., recovering individual blockchain records for each of the subset of available contingent assets from the contingent asset database 34). A third sub-step includes the asset module 30 sending the available contingent asset blockchain record sets 500 to the computing entity 23-1. Alternatively, or in addition to, the asset module 30 publishes the available contingent asset blockchain record sets 500 on an exchange and/or sends the available contingent asset blockchain record sets 500 to other computing entities associated with even more buyers as illustrated at tl of the risk chart for the asset lifecycle in FIG. 14B.

FIG. 14C further illustrates the example method of operation of the executing of the sale of the portion of the contingent asset to the buyer from the seller utilizing the split blockchain record, where, having indicated the availability of the subset of available contingent assets using the available contingent asset blockchain record sets 500 to the buyer computing entity, in a second step the computing entity 21 obtains a set of contingent asset purchase requests 244 from the computing entity 23-1 (e.g., the buyer). The set of contingent asset purchase requests 244 includes a first contingent asset purchase request 246 with regards to a bid for a portion of the first available contingent asset. The set of contingent asset purchase requests are generated within a purchase timeframe as illustrated near t2 of the timeline of the risk chart of the first asset lifecycle of FIG. 14D.

The first contingent asset purchase request 246 includes one or more of the identifier (ID) of the first asset, an identifier of the portion of the first asset, an identifier for a corresponding blockchain record, a buyer ID, a bid price for the portion of the first asset, the bid price for combinations of two or more portions, a bid price in a strike price for a first right purchase option on one or more portions, a bid price and a strike price for at least one put option on the portion if purchased, a bid price range as a function of one or more conditions (e.g., higher and of the range when risk of the first asset is lower), and settlement information (e.g., an account to debit upon purchase, a credit instrument to utilize for payment, payment timing, etc.). In an embodiment, the contingent asset purchase request 244 includes modified blockchain records for portions of corresponding contingent assets (e.g., to include purchase request content). The conditions of the bid price range include risk, a blockchain record verification requirement (e.g., bid only valid when a corresponding blockchain record can be verified), number of portions of similar assets currently available for sale, number of portions of similar assets currently held by the buyer, number portions of similar assets associated with the payer that still have an active lifecycle, or any other condition that can reasonably affect pricing to create an efficient market.

The obtaining of the set of contingent asset purchase requests 244 by the computing entity 21 includes a variety of approaches. A first approach includes the asset module 30 issuing a request for a bid message to the computing entity 23-1 (e.g., that includes an indication that assets of the subset of available contingent asset includes portions of assets that substantially satisfies the desired asset profile of the buyer of the computing entity 23-1). A second approach includes the asset module 30 receiving the set of contingent asset purchase request 244 from the computing entity 23-1.

A third approach includes the asset module 30 determining an auto-order outcome based on the desired asset profile of the buyer computing entity. For example, the asset module 30 interprets the desired asset profile to identify the portions of assets to include in auto-generating the contingent asset purchase requests 244 on behalf of the buyer computing entity. A fourth approach includes the asset module receiving one or more contingent asset purchase requests from one or more other computing entities.

FIG. 14E further illustrates the example method of operation of the executing of the sale of the portion of the contingent asset to the buyer from the seller utilizing the split blockchain record, where, having obtained the set of contingent asset purchase requests from the buyer computing entity, a third step includes the computing entity 21 determining whether to approve the first contingent asset purchase request 246 based on at least some of the set of contingent asset purchase requests and a risk profile during the purchase timeframe after t2 of the risk chart for the asset lifecycle of FIG. 14F. The asset module 30 determines whether to approve the first contingent asset purchase request 246 based on one or more of verification of a blockchain record associated with the portion of the first contingent asset purchase request, face value of the first asset, a listed price by the seller for the portion, a minimum acceptable bid price set by the seller, and a bid price from the buyer, a history of bid-ask spreads. The approval determination is further based on one or more of other bid acceptances of the set of contingent asset purchase requests, a risk profile associated with the buyer, the risk level of the asset, an assessment to the impact of the buyer's portfolio, and an assessment of the impact to the available contingent assets.

As an example of the determining whether to approve the first contingent asset purchase request 246, the asset module 30 indicates approval when the risk level of the asset is below a maximum desired asset risk level in the corresponding blockchain record has been verified, the risk profile associated with the buyer is below a buyer maximum risk threshold level, and the bid price from the buyer is greater than the minimum acceptable bid price set by the seller for the portion. As another example, the asset module 30 indicates disapproval when the risk level of the buyer is greater than the buyer maximum risk threshold level and/or when the corresponding blockchain record does not verify. As yet another example, the asset module indicates approval when the risk level of the buyer is greater than the buyer maximum risk threshold level and the bid price from the buyer is greater than the listed price by the seller by more than a minimum difference bid-ask spread level.

When the first contingent asset purchase request 246 is approved for the portion, a fourth step of the example method of operation to execute the sale of the portion of the contingent asset to the buyer from the seller utilizing the split blockchain record includes the computing entity 21 obtaining payment for purchase of the portion of the first available contingent asset from a first buyer associated with the first contingent asset purchase request 246. The obtaining of the payment for purchase includes a series of sub-steps. A first sub-step includes the asset module 30 determining an execution price based on the approval. The determining includes one or more of establishing a base selling price at the bid price and making an adjustment associated with risk and/or transaction fees.

A second sub-step includes the asset module 30 issuing a request for payment to the computing entity 23-1, where the request for payment includes the execution price within the blockchain record for the portion of the first asset. A third sub-step includes the asset module 30 receiving purchase information 248 from the computing entity 23-1, where the purchase information 248 includes an updated blockchain record including information to execute the sale including payment for the portion (e.g., including instructions such as immediate payment and/or deducting payment from an account associated with the buyer).

FIG. 14G further illustrates the example method of operation of the executing of the sale of the portion of the contingent asset to the buyer from the seller utilizing the split blockchain record, where, having obtained the payment for the purchase of the portion of the first available contingent asset, a fifth step includes the computing entity 21 facilitating seller payment utilizing the payment for purchase of the portion of the first available contingent asset to complete the purchase as illustrated in the risk chart of the asset timeline of FIG. 14H. The facilitating includes the asset module 30 determining a seller payment amount from the payment for purchase and based on the contingency information 202 (e.g., recourse, fees, etc.). The facilitating further includes the asset module 30 issuing a payment for portion of first available contingent asset 502 to the computing entity 20-1 to satisfy payment to the seller. In an embodiment, the payment for portion of first available contingent asset 502 includes the corresponding split blockchain record associated with the portion of the first asset to provide payment. Alternatively, or in addition to, the asset module 30 updates a seller account with a credit for the seller payment amount.

Having facilitated the seller payment, a sixth step of the example method of operation of the executing of the sale of the portion of the contingent asset to the buyer from the seller utilizing the split blockchain record includes the computing entity 21 identifying a selected first available contingent asset blockchain encoded record of the first available contingent asset blockchain encoded record set

500 that corresponds to the portion of the first available contingent asset. For example, the asset module 30 selects a split blockchain record of the available contingent asset blockchain record sets 500 that maps to the portion of the first available contingent asset.

Having identified the first available contingent asset blockchain encoded record that corresponds to the portion, a seventh step of the example method of operation of the executing of the sale of the portion of the contingent asset to the buyer from the seller utilizing the split blockchain record includes the computing entity 21 updating at least some of the first available contingent asset blockchain encoded record set 500 based on the portion of the first available contingent asset to indicate reassignment of at least a portion of the potential first liability of the first available contingent asset from the first seller to an entity associated with the first buyer of the first contingent asset purchase request. For example, the asset module 30 updates the identified first available contingent asset blockchain encoded record (e.g., split blockchain record) as illustrated in FIG. 9G within the contingent asset database 34 to associate an identifier of the buyer with the first contingent asset. Alternatively, or in addition to, a risk level associated with the buyer is updated within the blockchain record based on the buyer now holding the first contingent asset.

The method described above in conjunction with a processing module of any computing entity of the computing system 10 can alternatively be performed by other modules of the computing system 10 of FIG. 1 or by other devices. In addition, at least one memory section that is non-transitory (e.g., a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause one or more computing devices of the computing system 10 to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules, and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computer-implemented method of using a computing infrastructure for utilizing an object distributed ledger, the method comprising:

- issuing, by an object owner computing entity of the computing infrastructure to a marketplace computing entity of the computing infrastructure, one or more of digital records of a set of contingent assets, the one or more of digital records comprising an asset identifier, a lifecycle status indictor, a potential payer liability value, a payer identifier, and a seller identifier of at least one contingent asset of the set of contingent assets, and at least one owner identifier associated with the set of contingent assets;
- identifying, by the marketplace computing entity, an asset authenticity computing entity of the computing infrastructure based on at least one of the asset identifier, payer identifier, and the seller identifier of the at least one contingent asset of the set of contingent assets;
- generating, by the asset authenticity computing entity, authenticity information utilizing the at least one of the asset identifier, the payer identifier, and the seller identifier of the at least one contingent asset of the set of contingent assets from the marketplace computing entity;
- interpreting, by the marketplace computing entity, the authenticity information from the asset authenticity computing entity to produce an authenticity indicator associated with the at least one contingent asset, the authenticity indicator comprising one of an approved status, a pending status, and a disapproved status;
- determining, by the marketplace computing entity, that the authenticity indicator of the at least one contingent asset is the same as the lifecycle status indictor;
- generating, by the marketplace computing entity, a smart contract to indicate availability of the at least one contingent asset to include available terms and the authenticity indicator;
- obtaining, by the marketplace computing entity, a copy of the object distributed ledger;
- hashing, by the marketplace computing entity, the smart contract utilizing a receiving public key of the object distributed ledger to produce a next transaction hash value;
- encrypting, by the marketplace computing entity, the next transaction hash value utilizing a private key of the marketplace computing entity to produce a next transaction signature;
- generating, by the marketplace computing entity, a next block of a blockchain of the object distributed ledger to include the smart contract and the next transaction signature; and
- causing, by the marketplace computing entity, inclusion of the next block in the object distributed ledger.

2. The method of claim 1 further comprising:

- determining, by the marketplace computing entity, a proposed pricing value of the at least one contingent asset based on one or more of a desired sale price value received from the object owner computing entity, and an estimated probability of payer approval that causes the authenticity indicator to include the approved status;
- determining, by the marketplace computing entity, whether the proposed pricing value is acceptable based on a response from the object owner computing entity; and
- establishing, by the marketplace computing entity, the available terms to include the proposed pricing value of the at least one contingent asset when the proposed pricing value is acceptable.

3. A computing infrastructure system, the computing infrastructure system comprising:

- an object owner computing entity comprising a first interface, a first local memory, and a first processor operably coupled to the first interface and the first local memory;
- a marketplace computing entity comprising a second interface, a second local memory, and a second processor operably coupled to the second interface and the second local memory; and
- an asset authenticity computing entity comprising a third interface, a third local memory, and a third processor operably coupled to the third interface and the third local memory;
- wherein the first processor performs functions to:
  - issue, to the marketplace computing entity, one or more of digital records of a set of contingent assets, the one or more of digital records comprising an asset identifier, a lifecycle status indictor, a potential payer liability value, a payer identifier, and a seller identifier of at least one contingent asset of the set of contingent assets, and at least one owner identifier associated with the set of contingent assets;
- wherein the second processor performs functions to:
  - identify the asset authenticity computing entity based on at least one of the asset identifier, payer identifier, and the seller identifier of the at least one contingent asset of the set of contingent assets;
- wherein the third processor performs functions to:
  - generate authenticity information utilizing the at least one of the asset identifier, the payer identifier, and the seller identifier of the at least one contingent asset of the set of contingent assets from the marketplace computing entity; and
- wherein the second processor performs further functions to:
  - interpret the authenticity information from the asset authenticity computing entity to produce an authenticity indicator associated with the at least one contingent asset, the authenticity indicator comprising one of an approved status, a pending status, and a disapproved status;
  - determine that the authenticity indicator of the at least one contingent asset is the same as the lifecycle status indictor;
  - generate a smart contract to indicate availability of the at least one contingent asset to include available terms and the authenticity indicator;
  - obtain a copy of the object distributed ledger;
  - hash the smart contract utilizing a receiving public key of the object distributed ledger to produce a next transaction hash value;
  - encrypt the next transaction hash value utilizing a private key of the marketplace computing entity to produce a next transaction signature;

generate a next block of a blockchain of the object distributed ledger to include the smart contract and the next transaction signature; and cause inclusion of the next block in the object distributed ledger.

4. The computing infrastructure system of claim 3, wherein the second processor performs further functions to:

determine a proposed pricing value of the at least one contingent asset based on one or more of a desired sale price value received from the object owner computing entity, and an estimated probability of first payer approval that causes the authenticity indicator to include the approved status;

determine whether the proposed pricing value is acceptable based on a response from the object owner computing entity; and establish the available terms to include the proposed pricing value of the at least one contingent asset when the proposed pricing value is acceptable.

* * * * *